US010981138B2

(12) United States Patent
Murahara

(10) Patent No.: US 10,981,138 B2
(45) Date of Patent: Apr. 20, 2021

(54) ELECTROCHEMICAL REACTOR USING ION ON/OFF SURFACE SWITCH

(71) Applicant: M Hikari & Energy Laboratory Co., Ltd., Kanagawa (JP)

(72) Inventor: Masataka Murahara, Kanagawa (JP)

(73) Assignee: M Hikari & Energy Laboratory Co., Ltd., Kanagawa (JP)

( * ) Notice: Subject to any disclaimer, the term of this patent is extended or adjusted under 35 U.S.C. 154(b) by 133 days.

(21) Appl. No.: 16/159,131

(22) Filed: Oct. 12, 2018

(65) Prior Publication Data

US 2019/0046945 A1 Feb. 14, 2019

Related U.S. Application Data

(63) Continuation of application No. PCT/JP2017/015029, filed on Apr. 12, 2017.

(30) Foreign Application Priority Data

Apr. 13, 2016 (JP) .............................. JP2016-080210

(51) Int. Cl.
*B01J 19/08* (2006.01)
*C25B 11/03* (2021.01)
(Continued)

(52) U.S. Cl.
CPC .................. *B01J 19/08* (2013.01); *C25B 1/46* (2013.01); *C25B 9/00* (2013.01); *C25B 9/70* (2021.01);
(Continued)

(58) Field of Classification Search
None
See application file for complete search history.

(56) References Cited

U.S. PATENT DOCUMENTS 4,212,714 A 7/1980 Coker et al.
4,214,958 A 7/1980 Coker et al.
(Continued)

FOREIGN PATENT DOCUMENTS

CN 2687584 3/2005
EP 0644227 3/1995
(Continued)

OTHER PUBLICATIONS

Murahara, M. et al., "Wind Force" Save Corn from Ethanolization, Collection of Marine Resources and On-Sea Factory by Wind Power Generation, pp. 10-11, Dec. 25, 2007.
(Continued)

*Primary Examiner* — Harry D Wilkins, III
(74) *Attorney, Agent, or Firm* — Burris Law, PLLC

(57) ABSTRACT

An electrochemical reactor includes an ion ON/OFF surface switch operating as an ionic conductor, which includes a pair of electrodes, an electrolyte aqueous solution present between the pair of electrodes, a water-repellent porous fluororesin membrane disposed such that at least one surface thereof is in contact with the electrolyte aqueous solution and including a plurality of pores communicating with each other and a pressing equipment configured to pressurize the electrolyte aqueous solution. As such, electrolysis, a secondary battery and a capacitor, which uses the water-repellent porous fluororesin membrane as an ion ON/OFF surface switch, can be provided.

19 Claims, 23 Drawing Sheets

(51) Int. Cl.

| | | |
|---|---|---|
| *C25B 13/02* | (2006.01) | |
| *C25B 1/46* | (2006.01) | |
| *H01G 7/00* | (2006.01) | |
| *H01G 9/22* | (2013.01) | |
| *H01M 10/38* | (2006.01) | |
| *H01M 10/36* | (2010.01) | |
| *C25B 9/00* | (2021.01) | |
| *C25B 9/70* | (2021.01) | |
| *H01M 50/409* | (2021.01) | |

(52) U.S. Cl.
CPC .............. *C25B 11/03* (2013.01); *C25B 13/02* (2013.01); *H01G 7/00* (2013.01); *H01G 9/22* (2013.01); *H01M 10/36* (2013.01); *H01M 10/38* (2013.01); *H01M 50/409* (2021.01)

(56) References Cited

U.S. PATENT DOCUMENTS

| | | |
|---|---|---|
| 4,992,156 A | 2/1991 | Silveri |
| 5,687,576 A | 11/1997 | Moriguchi et al. |
| 5,843,297 A | 12/1998 | Schmid et al. |
| 6,117,497 A | 9/2000 | Murahara et al. |
| 6,167,497 A | 12/2000 | Nakatsuka et al. |
| 2004/0263126 A1* | 12/2004 | Hanson .............. H01M 10/488 320/132 |
| 2009/0042066 A1 | 2/2009 | Simon et al. |
| 2010/0051450 A1 | 3/2010 | Murahara |
| 2010/0126875 A1* | 5/2010 | Maekawa ................ C25B 1/245 205/619 |
| 2011/0135565 A1* | 6/2011 | Bingham .................. B01J 7/02 423/657 |
| 2012/0202279 A1 | 8/2012 | Murahara |
| 2012/0292187 A1 | 11/2012 | Kim et al. |
| 2013/0313126 A1 | 11/2013 | Raatschen et al. |
| 2015/0047732 A1* | 2/2015 | Bassler ................ F16K 99/004 137/827 |
| 2015/0292094 A1* | 10/2015 | Swiegers .................. C25B 9/08 204/282 |
| 2016/0149231 A1 | 5/2016 | Melman et al. |
| 2016/0186334 A1 | 6/2016 | Murahara |

FOREIGN PATENT DOCUMENTS

| | | |
|---|---|---|
| JP | S56-5989 | 1/1981 |
| JP | S56-5990 | 1/1981 |
| JP | H06-293837 | 10/1994 |
| JP | H09180714 | 7/1997 |
| JP | 2001284177 | 10/2001 |
| JP | 2002063890 | 2/2002 |
| JP | 2003123808 | 4/2003 |
| JP | 2005253305 | 9/2005 |
| JP | 2006193612 | 7/2006 |
| JP | 2009067644 | 4/2009 |
| JP | 2009181710 | 8/2009 |
| JP | 2009224097 | 10/2009 |
| JP | 2009295789 | 12/2009 |
| JP | 2011184260 | 9/2011 |
| JP | 2011222129 | 11/2011 |
| JP | 2012012261 | 1/2012 |
| JP | 2012030637 | 2/2012 |
| JP | 2013032535 | 2/2013 |
| JP | 2013054987 | 3/2013 |
| JP | 2013138050 | 7/2013 |
| JP | 2013166406 | 8/2013 |
| WO | 2001031724 | 5/2001 |
| WO | 2007080763 | 6/2009 |
| WO | 2015004663 | 1/2015 |
| WO | 2015034088 | 3/2015 |

OTHER PUBLICATIONS

Murahara, M., Consider Renewable Energy, Goodbye to Nuclear Power Plant, p. 14, Nov. 15, 2011.
Okamura, M., Electric Double Layer Capacitor and Power Storage System, pp. 32-33, Mar. 31, 1999.
Extended European Search Report for European Application No. 17782445.5, dated Mar. 24, 2020.
Partial European Search Report for European Application 17785224.5, dated Dec. 5, 2019.
International Search Report for International Application PCT/JP2017/015029, dated Jul. 11, 2017.
Smirnov, Sergei, et al., Water Confinement in Hydrophobic Nanopores. Pressure-Induced Wetting and Drying, American Chemical Society, vol. 4 (9), pp. 5069-5075, 2010.
Murahara, M., et al., Hydrophilic Treatment of Porous PTFE for Intractable Glaucoma Implant Devices, Proceedings of SPIE, vol. 4245, pp. 221-227, 2001.

* cited by examiner

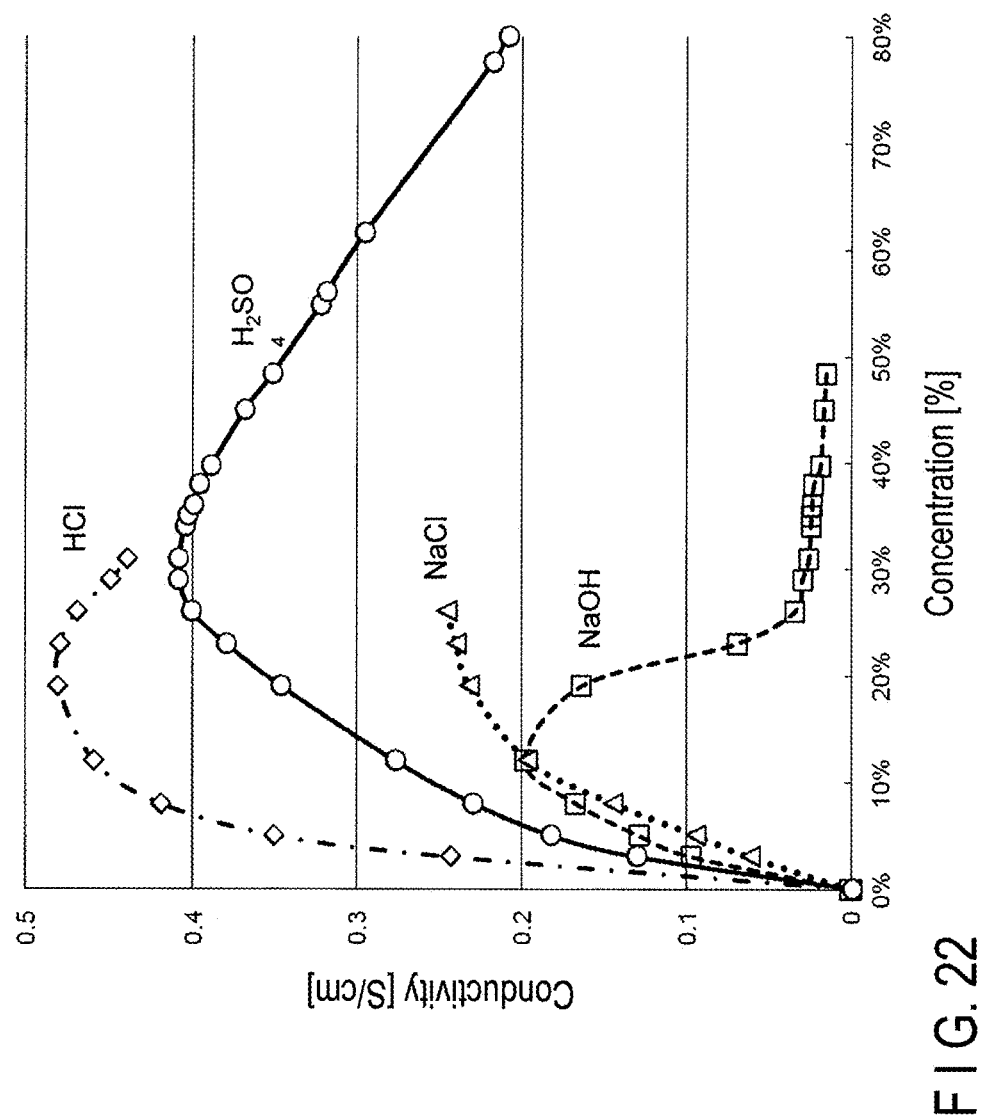
F I G. 22

ELECTROCHEMICAL REACTOR USING ION ON/OFF SURFACE SWITCH

CROSS-REFERENCE TO RELATED APPLICATIONS

This application is a continuation of International Application No. PCT/JP2017/015029, filed Apr. 12, 2017, which claims priority to and the benefit of JP Patent Application No. 2016-080210, filed Apr. 13, 2016. The disclosures of the above applications are incorporated herein by reference.

FIELD

The present disclosure relates to an electrochemical reactor which functions as electrolysis, a secondary battery or a capacitor using a liquid-repellent porous fluororesin membrane as an ion ON/OFF surface switch.

BACKGROUND

The statements in this section merely provide background information related to the present disclosure and may not constitute prior art.

When base metal elements belonging to Groups 1, 2 and 13 of periodic table are brought into contact with water, they are ionized and immediately self-discharge, and generate hydrogen. For this reason, the contacting with water is strictly prohibited, and there is no other production method than the fused salt electrolysis, for electrolysis to deposit these metals. In the batteries of currently practical use, there is no primary or secondary battery which uses an electrolyte aqueous solution of an element Ca, Ba or Sr, which belongs to Group 1 or 2 of the periodic table and reacts violently with water. Or, for Be and Mg of Group 2 or Al of Group 3, there have been some reports on primary batteries, but few reports on secondary batteries. Under these circumstances, there is an increasing expectation for a lithium ion battery using an element of Group 1. Here, a main future subject is how to improve it as a battery which does not start a fire.

It is desired that practical batteries should have a light electrode material, a high electromotive force and further a large discharge capacity. For this reason, elements of Group 1 of the periodic table can be ideal materials for a negative electrode, but it is difficult to avoid self-discharge. The reason why these practical batteries, electrolysis or capacitors cause self-discharge is that the electrolyte aqueous solution, the negative electrode and a positive electrode are all in the same electrolyte. Under these circumferences, it is an urgent matter to develop such a technology that separates an electrolyte and the positive and negative electrodes, inhibits self-discharge, and shuts off the base metal elements belonging to Group 1, 2 or 13 of the periodic table and water from each other.

It is desired that power storage capacitors should be of a large capacitance and quickly chargeable/dischargeable. As a capacitor which meets this demand, electrochemical capacitors are ideal, and examples of which an electric double-layer capacitor, a redox capacitor, and a hybrid capacitor. The disadvantages of these capacitors are high leakage current and high self-discharge. Therefore, it is an urgent matter to develop such a technology to suppress the leakage current.

The self-discharge is a phenomenon that as the metal of the negative electrode dissolves, simultaneously the electron thus generated and hydrogen ion react each other to produce hydrogen, which holds the electrons from moving to the positive electrode plate, thereby blocking the current. Generally, as a method of suppressing self-discharge in an electrolyte aqueous solution, Lee et al., of Samsung Electron Devices, Co. Ltd., disclose in Patent Literature 1 (JP H09-180714 A). The Patent Literature 1 describes a structure comprising a nickel-based porous body on a positive electrode for an alkali storage battery, filled with active material particles containing nickel and an additive, so as to reduce self-discharge. In Patent Literature 2 (JP 2009-181710 A), Shuhei Yoshida et al., of SANYO Electric Co., Ltd., disclose that a method of suppressing self-discharge by setting a form whose actual reaction area does not decrease even if the counter area of the electrode of the alkali storage battery is increased. In Patent Literature 3 (JP 2002-63890 A), Toshio Tanaka et al., of Toyobo Co., Ltd., disclose that a long-life battery in which a separator subjected to treatments for strength, liquid absorptivity, gas permeability and hydrophilicity is used in a layer containing fiber obtained by polyolefin-based resin fiber is subjected to sulfonation, which can achieve less self-discharge and excellent capacitance retention. In Patent Literature 4 (WO 01/031724), Hiroaki Ikeda et al., of SANYO Electric Co., Ltd., disclose that an electrode for lithium battery in which an active material membrane occluded/released lithium, such as a microcrystal silicon thin membrane or an amorphous silicon thin membrane, is provided on a charge collector via an interlayer. The charge collector is an electrode for non-aqueous electrolyte battery, which uses an active material that occludes/releases alkali metals other than lithium, such as sodium and potassium, and alkaline earth metals such as magnesium and calcium. In Patent Literature 5 (JP 2012-12261 A), Nobuki Itoi et al., of Otsuka Chemical Co., Ltd., disclose a method of preparing a lithium battery in which porous lithium titanate is used as an electrode active substance, thereby improving the impregnating ability of the non-aqueous electrolyte and achieving high charge/discharge cycle characteristics. In Patent Literature 6 (JP 2013-54987 A), Takashi Mukai et al., of National Institute of Advanced Industrial Science and Technology (an independent administrative institution) disclose a sodium secondary battery comprising a positive electrode containing a carbon-based positive electrode active material which can occlude/release anions, and a negative electrode containing Sn, Zn, etc., which are negative electrode active materials which can occlude/release Na. Sodium sulfur batteries obtained by melting sodium, conventionally require an atmospheric temperature of 300° C. to form fused salt. Under those circumstances, in Patent Literature 7 (JP 2009-67644 A), Rika Hagiwara et al., of Kyoto University disclose a method of operating the atmospheric temperature between 60 and 130° C. by using a fused salt MFSI of FSI as anion and an alkali metal M as cation.

As to the isolation membrane between an electrolyte and an electrode, Kan KiGwon et al., of SK Innovation Company, Ltd., disclose in Patent Literature 8 (JP 2013-32535 A). The Patent Literature 8 describes that a polyolefin microporous membrane having a pore diameter of 0.1 μm or less is thermally stable and therefore it is suitable as a separator for a high-capacity/high-output battery. In Patent Literature 9 (JP 2011-222129 A), Yasukazu Ino et al., of Nippon Sheet Glass Co., Ltd., disclose that a scale-like inorganic porous membrane of silica, alumina or the like is provided on a positive electrode, a negative electrode or a separator, and thus the performance of a battery can be retained without degrading the ionic conductance. In Patent Literature 10 (JP 2009-224097 A), Yukishige Inaba et al., of Panasonic Incorporated Company disclose that an isolation membrane used for a non-aqueous secondary battery is a thermal-resistant porous membrane containing chlorine, or a multi-layered membrane of a thermal-resistant resin and porous polyolefin, or a multi-layered membrane of a layer including a thermal-resistant resin and fillers, and a porous polyolefin.

As to the use of a water-repellent porous membrane, Kenji Kobayashi et al., of NEC Corp., disclose in Patent Literature 11 (WO 2007/80763). The Patent Literature 11 describes that a fluorine-based water-repellent porous membrane having a porosity of 60 to 90% and an air permeability of 20 seconds or less is used in a solid polymer fuel cell. In each of Patent Literature 12 (JP 2005-253305 A), Patent Literature 13 (U.S. Pat. No. 6,167,497 A) and Patent Literature 14 (EP 0644227 A1), Masataka Murahara et al., who are authors of this application disclose a method of manufacturing a fluorine-based water-repellent porous membrane with a hydrophilic property by irradiating a fluorine-based water-repellent porous membrane with an excimer laser beam in the presence of a compound which includes an atom and a hydrophilic group and having a bond energy therebetween of 128 or more kcal/mol. Further, in Patent Literature 15 (JP H06-293837 A), Masataka Murahara et al., who are authors of this application disclose a method of manufacturing a three-dimensional cell culture element for patients suffering from Parkinson's disease, Alzheimer disease, diabetes, osteomalacia and the like, in which inner pores of a fluorine-based water-repellent porous membrane are substituted with hydrophilic groups by photo-reaction caused by ultraviolet radiation, and dopamine-producing cells, fibrocytes, collagen production-promoting cells, stem cells, nucleus-pulposus cells, insulin-producing cells, etc., are cultured in the inner walls of the pores, which exhibit the hydrophilic properties. Furthermore, in Non patent Literature 1 (Proceeding of SPIE Vol. 4245, P. 221-227 (2001)), Masataka Murahara et al., report that the water-resistant pressure of a water-repellent porous fluorine-based resin membrane with a pore diameter of 3 μm is 1500 Torr, but the insides of the pores are photo-modified to be hydrophilic to lower the water-resistant pressure to 20 Torr from 1500 Torr, and the thus modified membrane is used in an aqueous-humor regulating valve for glaucomatous patients.

Further, as disclosed in Non patent Literature 2 (Electric Double Layer Capacitor and Power Storage System, Nikkan Kogyo Shimbun), an electrolyte used for electrochemical capacitors such as a double layer capacitor, a redox capacitor and a hybrid capacitor is used a strong acid or strong aqueous alkali solution. In Patent Literature 16 (JP 2009-295789 A), Satoru Itabashi of Nisshin Electric Co., Ltd., discloses an electric double layer capacitor including a first electrode, a second electrode, a first separator and a second separator wound around into a flat shape, in which a winding core is provided to increase the surface pressure of both electrodes to a certain level or more, and the internal resistance is suppressed without increasing the thickness of the separators, thus decreasing the leakage current. In Patent Literature 17 (JP 2013-138050 A), Nishimura et al., of NGK Spark Plug Co., Ltd., disclose that the internal resistance is reduced by changing the material of an electrode of a redox capacitor from nickel or stainless steel to aluminum or copper.

Conventional method of avoiding contact between a compound of a base metal element and water is to use a molten salt of the base metal element. A water-free molten salt is an ideal electrolyte liquid. But, in order to make a molten salt, it is necessary to maintain the salt of the base metal element at a temperature higher than or equal to the melting point. Therefore, the amount of consumption of heat source is not negligible. Under these circumstances, it is widely popular to prepare a mixed molten salt by mixing with another metal salt to lower the melting point of the salt. Patent literature 19 (JP 2011-184260 A) by Masataka Murahara, who is an author of this application shows (in FIG. 2 illustrating the relationship between complex salts and melting points thereof, respectively) the relationship between a combination of mixed salts and a melting point thereof. The elements in the state of liquid at ordinary temperature, which exist in the nature, are only mercury and bromine, and the other elements cannot be liquefied at ordinary temperature. If electrolysis can be carried out while electrolyte aqueous solutions of a base metal and a base metal salt are isolated from each other, electrolysis and a practical secondary battery can be realized. The ultimate object of the present disclosure is to develop such an isolation membrane. The necessary and sufficient conditions for the isolation membrane are that the membrane has excellent liquid retention properties for the electrolyte aqueous solution and low electric resistance. In the present disclosure, a fluororesin membrane, which exhibits a water-repellent property to an aqueous solution is adopted to achieve this object. With use of the fluororesin membrane, not only excellent liquid retention properties for electrolyte, but also zero electric resistance can be maintained. Further, a porous membrane is adopted as the fluororesin membrane, ions can pass through the inside thereof. That is, if the electrolyte aqueous solution is pressurized by a pressure equal to the water-resistant pressure of the water-repellent porous fluororesin membrane or higher, an ion-permeable membrane can be realized. The application of the water-resistant pressure serves the role of a mechanical switch for zero electric resistance/conduction.

As described, in electrolysis or charging and discharging of a practical battery or a capacitor, the electrolyte aqueous solution is pressurized up to a pressure equal to the water-resistant pressure, and during storage of charge, it is not pressurized; therefore the liquid retention properties for electrolyte can be maintained. That is, during the storage of charge, the active materials of positive and negative electrodes are in an insulated state, and since the active materials do not react, it is no natural discharge. Further, the material of the isolation membrane is a fluororesin, and therefore it is excellent in alkali resistance, acid resistance, and chemical resistance even under high temperature (about 80° C.). Also, the membrane is excellent in mechanical strength, plasticity and heat-resisting property. Moreover, during charging and discharging, pressure is applied from the electrolyte aqueous solution side, and therefore the membrane is brought into tight contact with the electrode during the operation. It is considered to be the best method for achieving the object to use a water-repellent porous fluororesin membrane as a diaphragm as described above.

In the case of a capacitor, if the dielectric is only an insulator such as oil, the internal resistance between the positive and negative electrodes can be neglected, but when dielectrics and electrically conductive materials constitute equivalent circuits electrically combined in parallel or in series, the internal resistance serves as a leakage current. Particularly, in electrochemical capacitors such as an electric double layer capacitor, a redox capacitor and a hybrid capacitor, the increase in internal resistance by the electrolyte inside of an electrode or between electrodes is inevitable. In addition, in the case of an aqueous electrolyte, the liquid may also leak. Thus, in the present disclosure, in order to prevent the liquid leakage and electric leakage during storage of charge, an electrolyte aqueous solution such as strong acid or strong alkali is enclosed in a bag made of a water-repellent porous fluororesin membrane, and the bag made of the water-repellent porous fluororesin membrane is sandwiched by a pair of electrodes consisting of a positive electrode and a negative electrode. During charging and discharging, the water-resistant pressure of the water-repellent porous fluororesin membrane is applied to bring the surfaces of both electrodes and the electrolyte aqueous solution into contact with each other. Further, an electrically conductive material with voids, such as of metal fibers or carbon fibers, is enclosed together with the electrolyte in the bag of the water-repellent porous fluororesin membrane. With this structure, during charging and discharging in which the electrolyte aqueous solution is being pressurized, the electric resistance between electrolyte aqueous solutions is small, whereas during storage of charge in which the pressurization of the electrolyte aqueous solution is released, the electrolyte aqueous solution in the inner pores of the water-repellent porous fluororesin membrane is removed to evacuate the inside. Thus, it now functions as a low dielectric, and self-discharge is suppressed. On the other hand, during charging and discharging, the pores of the water-repellent porous fluororesin membrane are filled with the electrolyte by the pressurization of the electrolyte aqueous solution, transforming it into electrically conductive. Thus, a high charge is transferred with respect to the electric double layer capacitor or the redox capacitor.

The Non patent Literature 1 discloses that when physiological saline (BSS) is allowed to permeate with pressure to a water-repellent porous fluororesin membrane (ePTFE), the flow of the physiological saline increases when the pressure is higher than or equal to the water-resistant pressure. Note here that the water-resistant pressure is the difference in pressure between both sides of the membrane at the time when the liquid starts to permeate the water-repellent porous fluororesin membrane (ePTFE), and the water-resistant pressure of the water-repellent porous fluororesin membrane (ePTFE) having a diameter of pores of 3 μm and a thickness of 100 μm against physiological saline (BSS) is 300 mmHg. Here, the water-repellent porous fluororesin membrane functions as an insulating membrane when the differential pressure between both sides of the membrane is lower than the water-resistant pressure, and the liquid starts to permeate at the water-resistant pressure, whereas it functions as a conducting membrane as the electrolyte aqueous solution permeates to the membrane when the differential pressure between both sides of the membrane becomes the water-resistant pressure. A main point of the present disclosure is whether or not the electrolyte aqueous solution is pressurized at the water-resistant pressure or higher against the water-repellent porous fluororesin membrane is utilized as a pressure switch for passing of ions. Especially, since fluororesins exhibit water-repellent properties, the aqueous solution does not enter the pores of the porous membrane when the differential pressure between both sides of the membrane is less than the water-resistant pressure. Further, the water-resistant pressure of the water-repellent porous fluororesin membrane may vary depending on the diameter of pores or the salt concentration of the electrolyte. The relationship between the concentration of the electrolyte aqueous solution in a water-repellent porous fluororesin membrane (having a diameter of pores of 3 μm) and the differential pressure between both sides of the membrane is as follows. That is, the water-resistant pressure in fresh water is 430 mmHg; for a sodium chloride concentration of 10%, 330 mmHg; and for that of 20%, 280 mmHg. Thus, as the concentration of the electrolyte aqueous solution is higher, the water-resistant pressure becomes lower. On the other hand, the relationship between the concentration of the electrolyte aqueous solution in a porous fluororesin membrane (having a diameter of pores of 10 μm) and the differential pressure between both sides of the membrane is that the water-resistant pressure in fresh water is 130 mmHg, when the sodium chloride concentration is 1%, 7 mmHg, and when 2%, 50 mmHg; thus the water-resistant pressure is low in these cases. Thus, if the ON/OFF operation of the water-resistant pressure of the water-repellent porous fluororesin membrane is utilized, electrolysis in an electrolyte aqueous solution and a practical battery can be realized.

The "ion on-off switch," which uses a water-repellent porous fluororesin membrane as an ion permeation membrane by a water-resistant pressure, is disclosed in Patent Literature 18 (WO 2015/034088) by Masataka Murahara, who is an inventor of the present disclosure.

SUMMARY

An object of the present disclosure is to find out a method of suppressing reactions and side reactions other than those aimed to occur during electrolysis, charging/discharging of a battery or storage of charge.

Another object is to maintain, in electrolysis or charging a battery, an electrolyte aqueous solution at a saturation solubility at all times in order to increase the electrode deposit, whereas in discharging a battery, positive ions coming out of a negative electrode bind with negative ions in the electrolyte to form a salt with high solubility, and to maintain the solubility of the electrolyte aqueous solution at an unsaturated state at all times.

Another object is to develop a secondary battery formed by using an inexpensive electrode material, which is light in weight, high-speed chargeable, operable safely at ordinary temperature and pressure in long-distance traveling, and fire-risk free, as a battery for electric vehicles.

In one form of the present disclosure, an electrochemical reactor comprising an ion ON/OFF surface switch operating as an ionic conductor, which includes a pair of electrodes, an electrolytic aqueous solution present between the pair of electrodes, a water-repellent porous fluororesin film disposed such that at least one surface thereof being in contact with the electrolytic aqueous solution and having a plurality of pores communicating with each other, and a pressurizing device configured to pressurize the electrolytic aqueous solution is provided. The ion ON/OFF surface switch is configured such that when the electrolyte aqueous solution is pressurized by the pressurizing device, the electrolyte aqueous solution is partially injected into the plurality of pores of the water-repellent porous fluororesin membrane to form a layer of the ionic conductor parallel to the surface of the water-repellent porous fluororesin membrane, and to form an unpenetrated portion of the electrolyte aqueous solution as a compressed gas layer parallel to the surface of the water-repellent porous fluororesin membrane, whereas when the pressurization is released, the compressed gas layer is expanded to restore the water-repellent porous fluororesin membrane into an insulator. Or, the ion ON/OFF surface switch is configured such that when the electrolyte aqueous solution is pressurized by the pressurizing device, the electrolyte aqueous solution is injected into the plurality of pores of the water-repellent porous fluororesin membrane to expel the gas in the pores for substituting with the electrolyte aqueous solution, thereby forming the water-repellent porous fluororesin membrane into an ionic conductor, whereas when the pressurization is released, the electrolyte aqueous solution in the plurality of pores of the water-repellent porous fluororesin membrane is discharged by the gas to restore the water-repellent porous fluororesin membrane as an insulator.

According to the present disclosure, a plurality of reactions which occur by electrochemical reaction can be carried out in separate reaction systems, respectively. In this way, side reactions in the electrochemical reactor can be inhibited. According to this method, pharmaceuticals in a plurality of reaction chambers are aligned in series while they are electrically shut down from each other by isolation membranes, and the isolation membranes can be changed into ionic conductors only when allowing the electrochemical reactions to occur. The present inventor has named this isolation membrane an "ion ON/OFF surface switch." The main part of the "Ion ON/OFF surface switch" is a water-repellent porous fluororesin membrane. In the air or an aqueous solution, the water-repellent porous fluororesin membrane is an insulator. However, when an electrolyte aqueous solution is injected into the water-repellent porous fluororesin membrane, water, which is initially repelled, eventually passes therethrough. The hydraulic pressure at the time of the water passing through is referred to as "water-resistant pressure" of the water-repellent porous fluororesin membrane. In the present disclosure, the chemical reaction chambers are replaced by a plurality of closed electrolytic cells and the closed electrolytic cells are connected in series via the "ion ON/OFF surface switch." When the water-resistant pressure is applied to the electrolyte aqueous solution in each closed electrolytic cell to allow electric current flow this serial circuit, the entire surface of the isolation membrane is turned into an ON state, to start migration of ions between closed electrolytic cells, thus it can carry out the target reactions. In particular, electrolyte aqueous solutions are pressed into a water-repellent porous fluororesin membrane, which is an "ion ON/OFF surface switch," from both sides thereof, both surfaces are brought into contact with each other in a central portion of the isolation membrane. Here, both of the electrolyte aqueous solutions are brought into contact with each other by the same area, and therefore those of the reactions other than the targets can be inhibited. On the other hand, in a battery, the electrolytes or electrodes are electrically insulated from each other at the time except for charging/discharging, and therefore self-discharge does not occur, or diffusion of electrolytes with respect to each other or side reactions do not occur. Here, when oil is enclosed in one electrolytic cell, whereas an electrolyte aqueous solution is enclosed in the other electrolytic cell, and they are subjected to electrolysis, whereby a boundary layer of oil and water is created in the vicinity or the center of the isolation membrane. When electrolysis is carried out using this boundary layer as a virtual electrode, metals such as Li, Na and K can be collected in the oil-side closed electrolytic cell. Further, if the electrolyte aqueous solution is injected by a pressure higher than the water-resistant pressure from both sides of the isolation membrane, a very thin compressed gas layer is formed in the center of the isolation membrane. This compressed gas layer is a capacitor, and when charge is applied to this capacitor, a capacitance-variable capacitor is realized, which contributes to cars or trains as an initial motive power source.

Additional objects and advantages of the present disclosure will be set forth in the description which follows, and in part will be obvious from the description, or may be learned by practice of the present disclosure. The objects and advantages of the present disclosure may be realized and obtained by means of the instrumentalities and combinations particularly pointed out hereinafter. Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which:

FIG. 1 shows an equivalent circuit of a water-repellent porous fluororesin membrane and a principle of an "ion ON/OFF surface switch," and part (A) shows a distribution diagram of an electrolyte aqueous solution inside the water-repellent porous fluororesin membrane, part (B) shows the equivalent circuit of the water-repellent porous fluororesin membrane, and part (C) illustrates a method of measuring the electrostatic capacitance by a Kohlrausch bridge.

FIG. 2 shows an electrostatic capacitance variable capacitor comprising two layers of electrolyte aqueous solutions and one water-repellent porous fluororesin membrane, and part (a) shows the capacitor in a non-charged state, part (b) shows the capacitor when charged, part (c) shows the capacitor in the charge storage state, and part (d) shows the capacitor gradually discharging.

FIG. 3 shows an electrostatic capacitance variable capacitor, and part (A) shows an electrostatic capacitance variable capacitor comprising one layer of an electrolyte aqueous solution and one water-repellent porous fluororesin membrane, part (a) shows a state without a compressed gas layer, part (b) shows a state with a compressed gas layer (a capacitor having a one-fold electrostatic capacitance), part (B) shows an electrostatic capacitance variable capacitor comprising one layer of an electrolyte aqueous solution and two water-repellent porous fluororesin membranes, part (a) shows a state without a compressed gas layer, part (b) shows a state with a compressed gas layer (a capacitor having a ½-fold electrostatic capacitance), part (c) shows a parallel-connected type capacitor of a state without a compressed gas layer, and part (d) shows a parallel-connected type capacitor (a capacitor having a two-fold electrostatic capacitance) of a state with a compressed gas layer.

Figure 16:
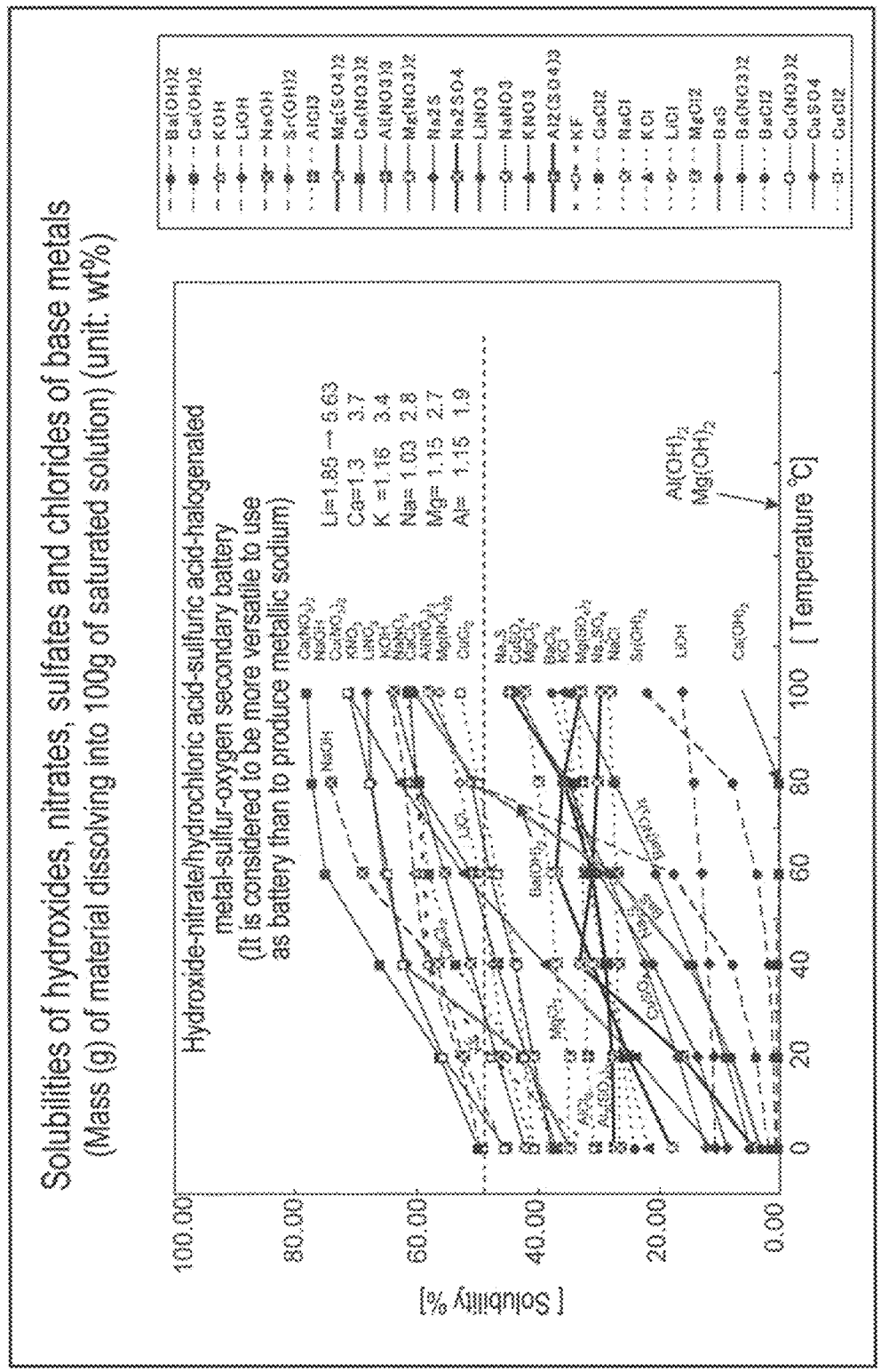

FIG. 16 indicates a solubility (mass of a material which dissolves into 100 g of a saturated solution) (unit: wt %) of each of hydroxides, nitrates, sulfates and chlorides of base metals.

Figure 17:
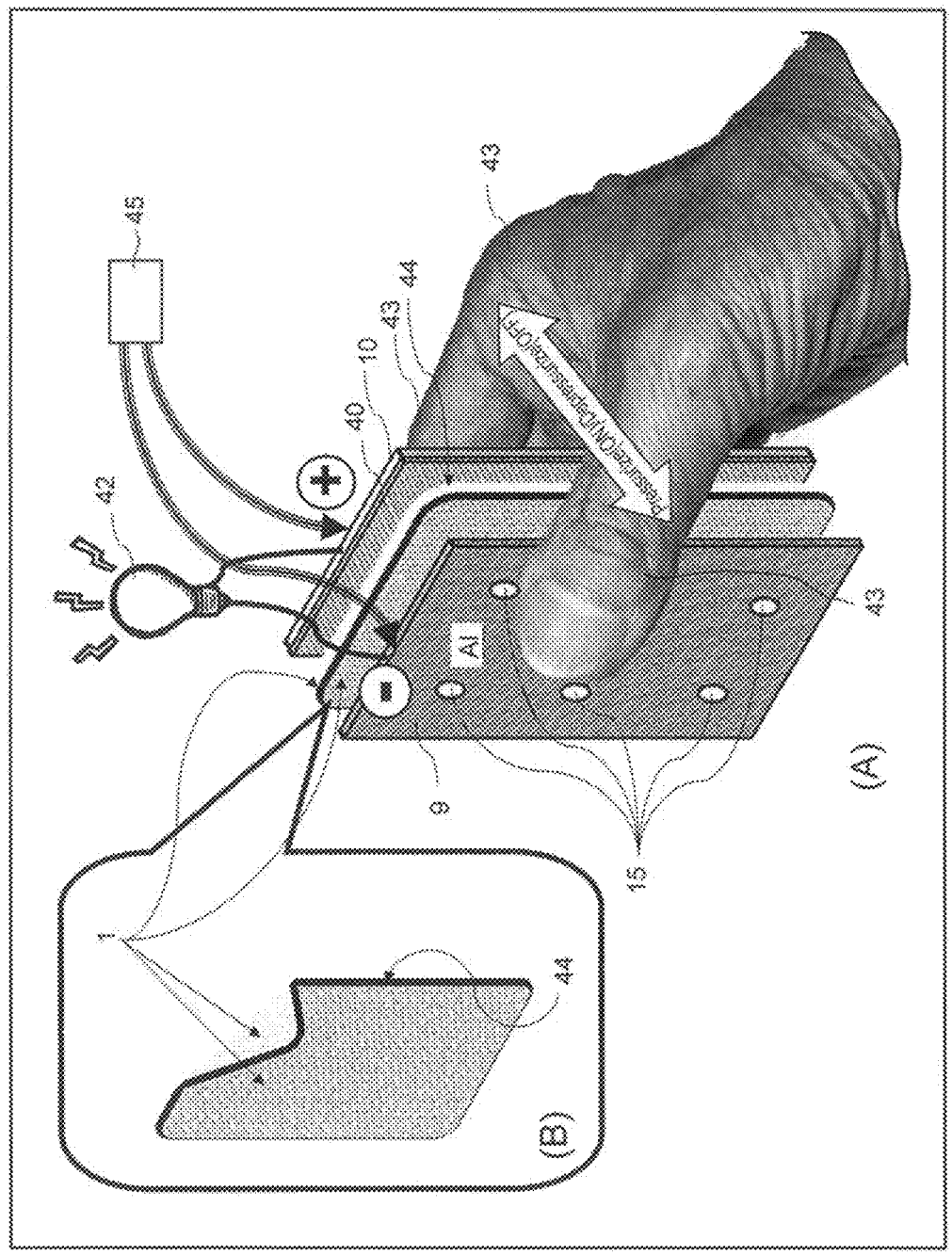

FIG. 17 shows a schematic diagram of an Al/Cu secondary battery which uses a water pillow type (envelope type) electrolyte aqueous solution pack, and part (A) shows a schematic diagram of the electrolyte aqueous solution of the water pillow type electrolyte aqueous solution bag being pressurized, and (B) part shows the water pillow type electrolyte aqueous solution bag.

Figure 18:
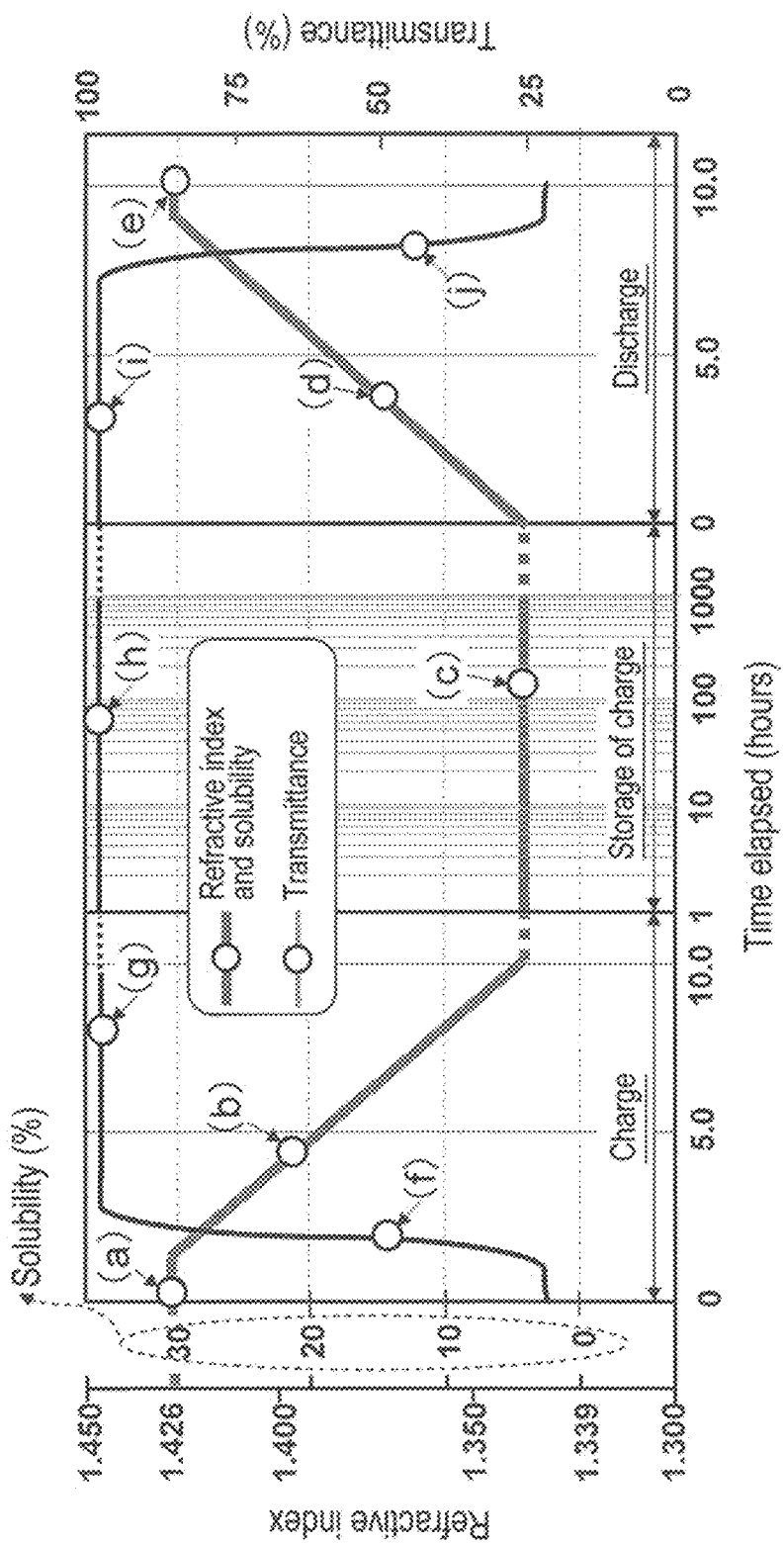

FIG. 18 shows a relationship between the refractive index when charging, storing charge and discharging of an aluminum chloride (AlCl3) aqueous solution and the time elapsed, and also the permeability thereof and the time.

Figure 19:
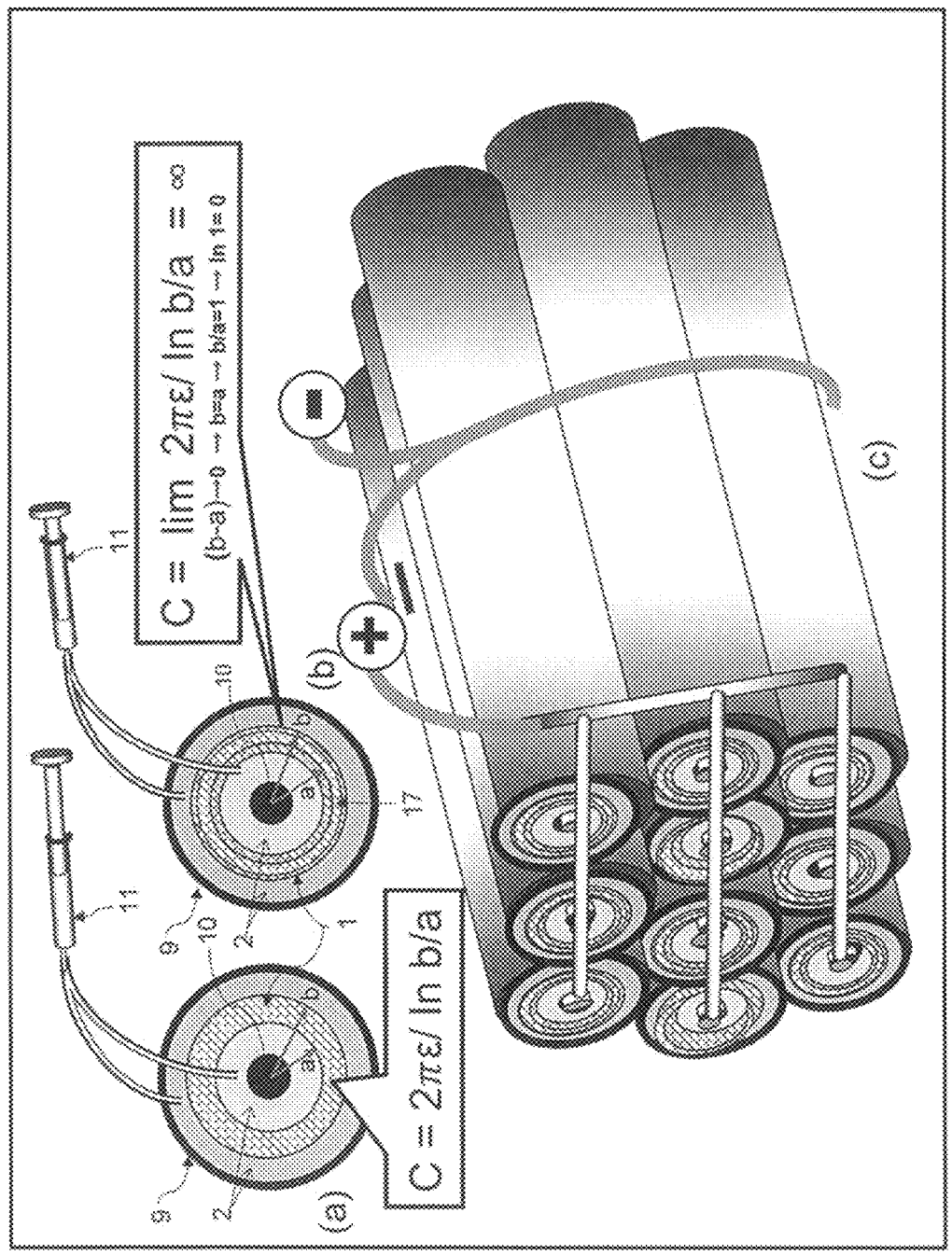

FIG. 19 is a schematic diagram of a cylindrical capacitor using a water-repellent porous fluororesin membrane, and part (a) shows the capacitor in a non-charged state, part (b) shows the capacitor in a charged state and part (c) shows a parallel connected type capacitor.

Figure 20:
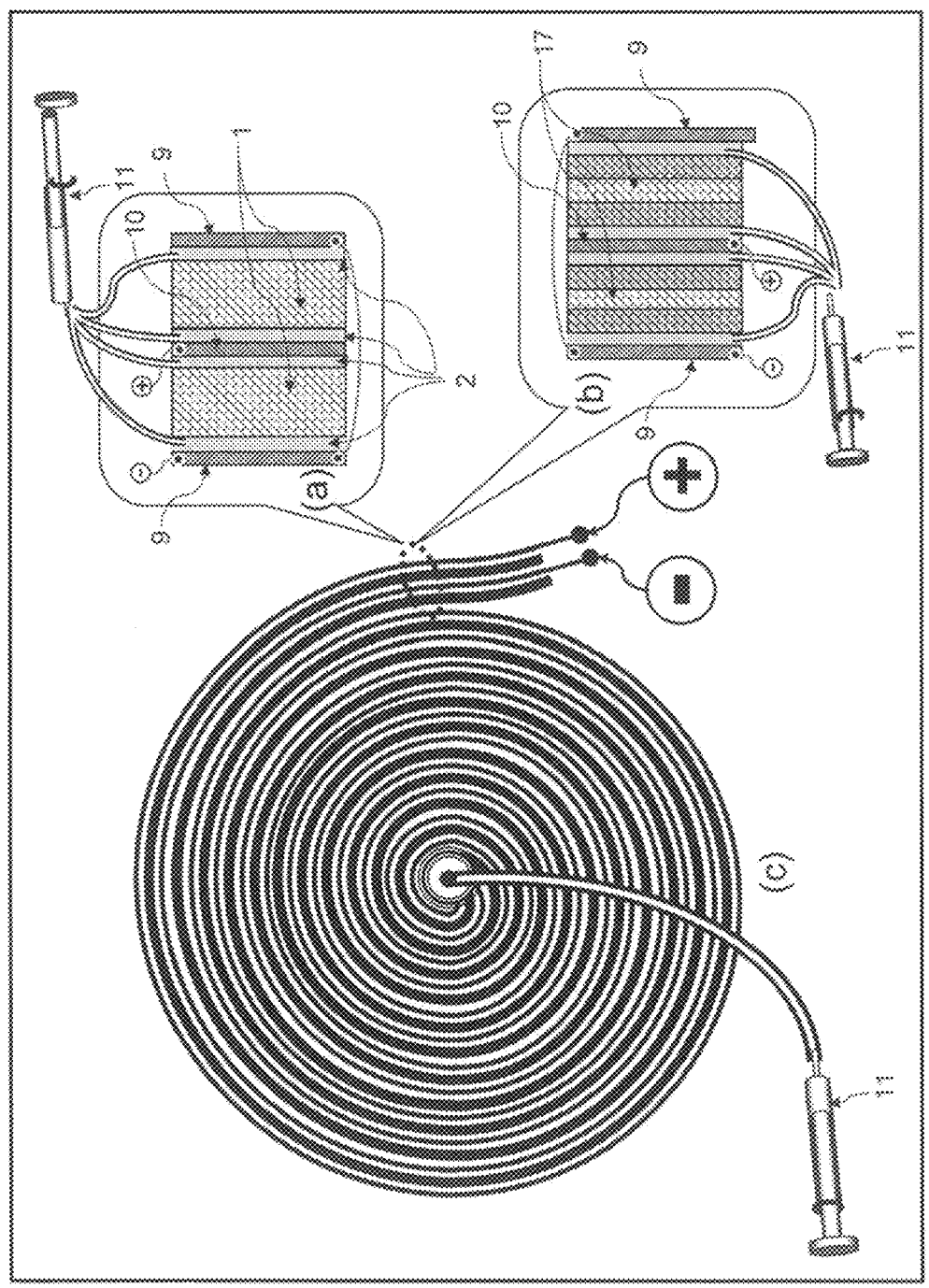

FIG. 20 shows a schematic diagram of a spiral type capacitor using a water-repellent porous fluororesin membrane, and part (a) shows the capacitor in a non-charged state, part (b) shows the capacitor in a charged state and part (c) shows a spiral type capacitor.

Figure 21:
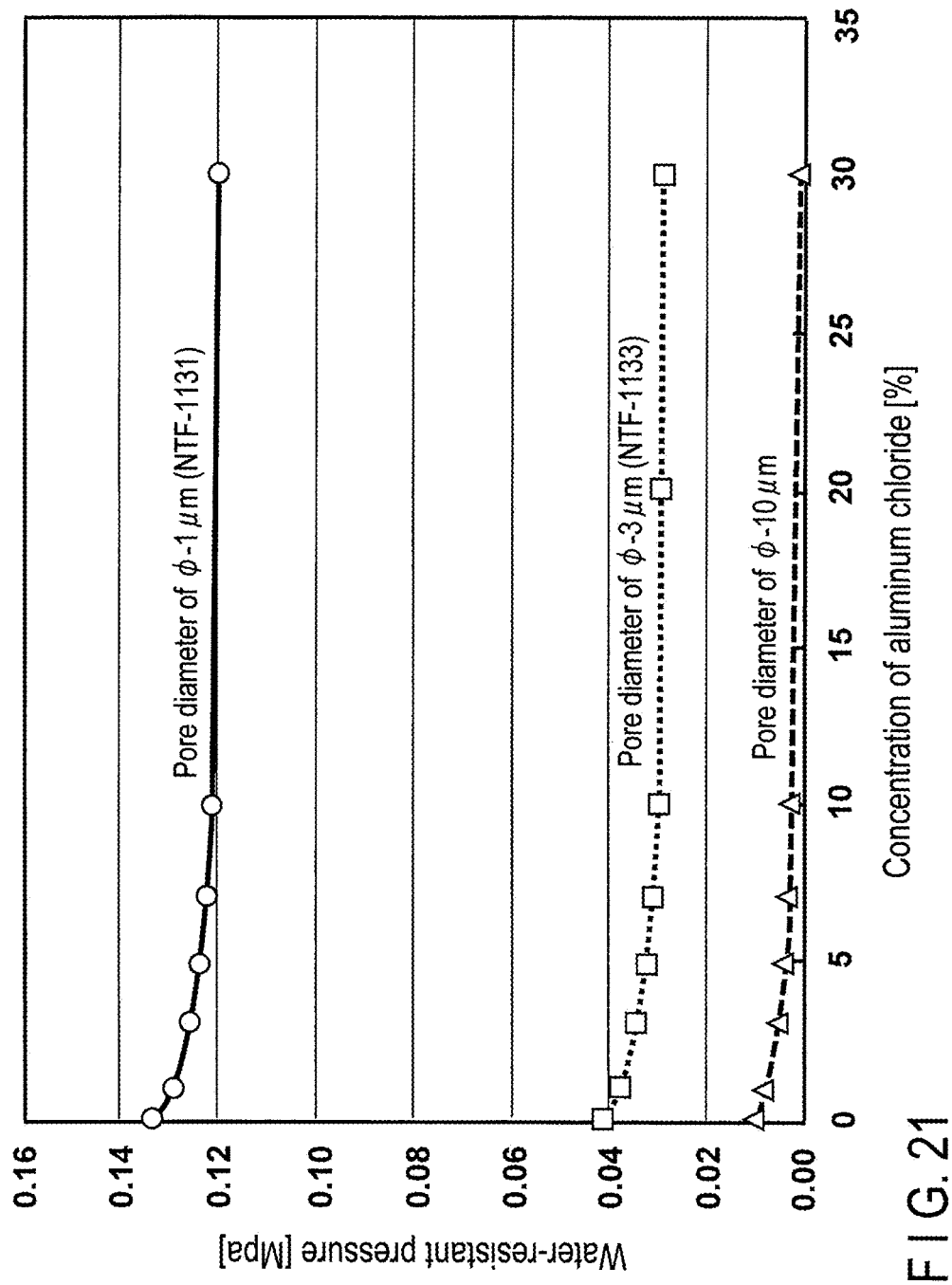

FIG. 21 shows the relationship between the solubility of aluminum chloride and the water-resistant pressure thereof.

FIG. 22 shows the relationship between the concentration of each of sodium hydroxide, salt, sulfuric acid, and hydrochloric acid and the electric conductivity thereof.

Figure 23:
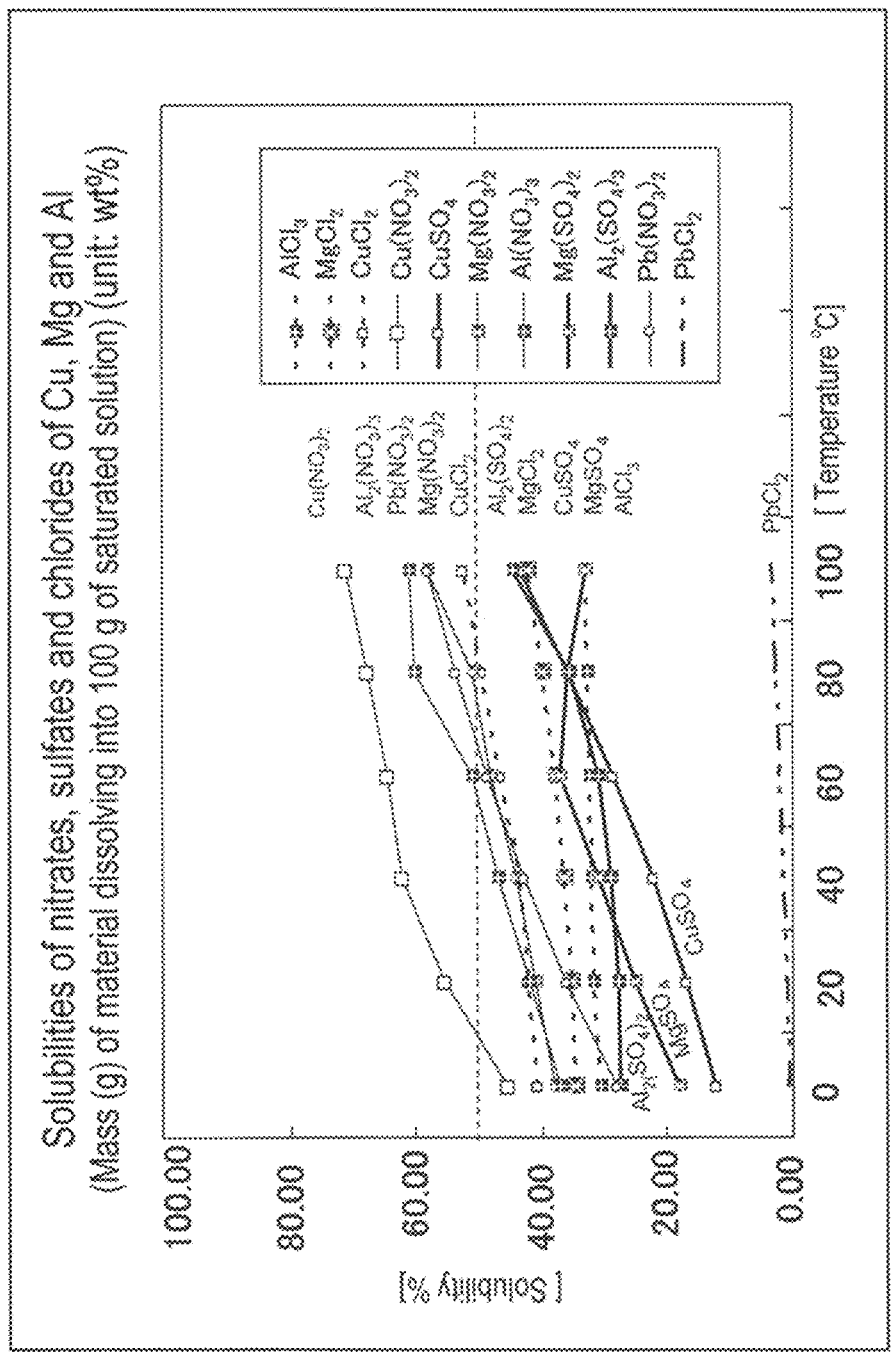

FIG. 23 shows the relationship between the solubility of each of nitrates, sulfates and chlorides of each of Cu, Mg and Al and the temperature.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to suppress reactions other than the target in an electrochemical reaction, a surface switch, which turns on/off the ionic reaction as needed between the electrode and the electrolyte aqueous solution, is required. As the ion ON/OFF surface switch material, the water-repellent porous fluororesin membrane is focused. Pores in the water-repellent porous fluororesin membrane are filled with air. While the air exists therein, an electrolyte aqueous solution is not allowed to enter the inside of the water-repellent porous fluororesin membrane. Therefore, ions cannot pass. Then, if the air is expelled by applying a pressure equivalent to the water-resistant pressure to the electrolyte aqueous solution, the pores are filled with the electrolyte aqueous solution, thereby allowing ions to pass therethrough (an ON state). Here, if the pressure on the electrolyte aqueous solution is released, the air returns spontaneously into the pores of the water-repellent porous fluororesin membrane, thus inhibiting ions from passing therethrough (an OFF state). Based on this mechanism, when a gas exhaust passage or an air capsule is provided outside the region of the electrochemical reaction, located near the water-repellent porous fluororesin membrane, the "ion ON/OFF surface switch," which acts based on "pressurization and depressurization" of the electrolyte aqueous solution, can be achieved.

The teachings of the present disclosure are different from the conventional method to solve the problem in that an "ion on/off switch," which uses a water-repellent porous fluororesin membrane as an isolation membrane, is employed, and an electrolyte aqueous solution is pressurized at the water-resistant pressure to allow ions pass in through the isolation membrane while pressurizing and is released from pressurization to shut down ions from the isolation membrane. The reason why the water-repellent porous fluororesin membrane is able to pass and shut down ions is based on the water-repelling characteristics of fluororesins. The pores in the water-repellent porous fluororesin membrane are filled with air under the atmospheric pressure. Here, if the air in the pores is expelled by applying the hydraulic pressure onto the water-repellent porous fluororesin membrane, the air and water are in place of each other to allow ions to pass through. The hydraulic pressure at which the pores of the water-repellent porous fluororesin membrane are filled with water is defined as the water-resistant pressure. When the pressurization on the electrolyte aqueous solution is less than the water-resistant pressure, the air in the pores blocks the passing through of the electrolyte aqueous solution, and thus the ion passage in the membrane is in the OFF state. On the other hand, if the electrolyte aqueous solution is pressurized at a pressure higher than the water-resistant pressure, the ion passage in the membrane is set in the ON state. Based on the characteristics, the presence of the air (gas) in the pores of the membrane is essential to turn off the "ion on/off switch." In general, when a portion of the water-repellent porous fluororesin membrane is open to atmosphere, the ion passage is turned off under such state where the electrolyte aqueous solution is pressed into the pores of the water-repellent porous fluororesin membrane by the water-resistant pressure to set the ion passage into the ON state and then the pressurization at the water-resistant pressure is released, thereby replacing the electrolyte aqueous solution with air (gas) to set the ion passage into the OFF state. However, if a portion of the water-repellent porous fluororesin membranes is not open to the atmosphere, the OFF state is not recovered. In such a case, if, after termination of the electrochemical reaction, the electrolyte aqueous solution is removed, the pores are filled with air (gas) to recover the OFF state. Therefore, in the present disclosure, even in the case where the water-repellent porous fluororesin membrane cannot be opened to the atmosphere, a portion of the water-repellent porous fluororesin membrane comprises a gas reservoir (microcapsules) or air-releasing openings so that the air (gas) may spontaneously return to the pores when the water-resistant pressure of the electrolyte aqueous solution is released.

On the other hand, the conventional isolation membrane is not able to electrically insulate an electrolyte aqueous solution and an electrode from each other, and it is not possible to completely separate and recover products on the electrode, or to completely inhibit side reactions.

Under these circumstances, in the present disclosure, an independent electrolytic cell is provided for each chemical reaction to suppress the side reactions which may occur at the time of electrolysis or charging of the battery. Then, water-repellent porous fluororesin membranes are provided respectively between these electrolytic cells arranged in series, and the electrolyte aqueous solutions in the electrolytic cells are pressurized at the water-resistant pressure only when to carry out the electrochemical reaction. By this operation, the electrolyte aqueous solutions are brought into contact with each other, and an equilibrium state is created, in which only ions migrate to carry out the electrochemical reaction. On the other hand, while the pressurization is released, the gas (air) returns to the pores of the water-repellent porous fluororesin membranes to insulate the electrolyte aqueous solutions from each other, and therefore diffusion or mixture of the electrolyte aqueous solutions do not occur. In addition, the negative electrode plate and the positive electrode plate are insulated from the electrolyte aqueous solutions, an increase in internal resistance of the battery or self-discharge does not occur.

In order to increase the amount of the deposit in the negative electrode plate during electrolysis or charging of a battery, a heat exchanging jacket is provided on a rear surface of a heat exchange pipe or an electrode in an electrolyte aqueous solution. Thus, warm water is circulated to maintain the liquid temperature of the electrolyte aqueous solution in a range between room temperature and 100° C., thereby achieving high saturation solubility and high electric conductivity. On the other hand, in order not to make a saturated state with metal salt formed when positive ions bond to negative ions in the electrolyte while discharging of the battery, cold water is circulated to the heat exchange pipe provided in the electrolyte aqueous solution. Thus, the liquid temperature is kept at a low temperature in a range of room temperature to 0° C. to maintain low saturation solubility and the amount of positive ions coming out of the negative electrode plate is increased. Further, in the reactions between the electrolyte aqueous solutions of the electrolytic cells arranged in series, those electrolyte aqueous solutions which give positive ions are heated, whereas those electrolyte aqueous solutions which receive positive ions from the reaction systems are cooled by a cooling device or diluted with water. Thus, the amount of deposit of the negative electrode plate product is increased, and high electric current discharge and high-speed charge are realized.

In a secondary battery for electric vehicles, aluminum or magnesium which is an abundant resource and inexpensive as compared to lithium, is used as a material of the negative electrode plate, a copper plate which is extremely high electric conductivity as compared to that of oxygen or sulfur is used as a material of the positive electrode plate, and an aqueous solution of a nitrate, sulfate or chloride, which has high saturation solubility, is used for the electrolyte, and thus high-speed charge and long-distance traveling can be safely operated at ordinary temperature and pressure.

Figure 1:
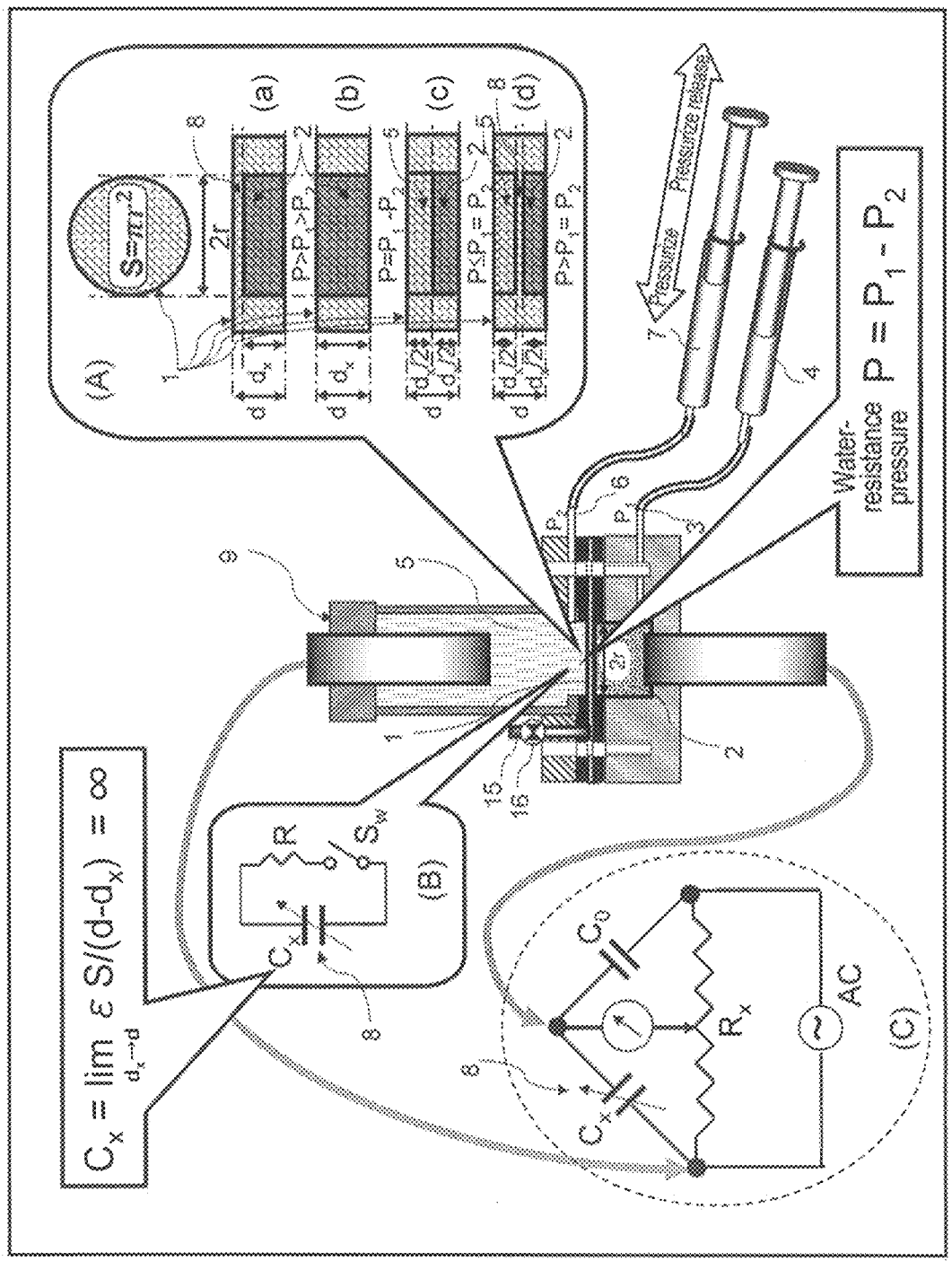

The "water-resistant pressure" is a difference in pressure between both sides of a water-repellent porous fluororesin membrane at which liquid permeates thereof. As shown in FIG. 1, according to a method of measuring the water-resistant pressure, the depth (dx) to which a first electrolyte aqueous solution 2 enters the pores of the water-repellent porous fluororesin membrane 1 is measured by the difference in pressure between a liquid pressure 3 of the first electrolyte aqueous solution 2 and a liquid pressure 6 of a second electrolyte aqueous solution 5. As shown in part (A) of FIG. 1, when the water-repellent porous fluororesin membrane 1 having a radius r, a surface area S and a thickness d is regarded as a dielectric (capacitor) 8, the electrostatic capacitance is given by $C=\varepsilon S/d$ ($\varepsilon$=dielectric constant, $S=\pi r2$=surface area, r=radius and d=thickness). As shown in FIG. 1, part (A)-(a), when the first electrolyte aqueous solution 2 pressurized from one side enters the pores of the water-repellent porous fluororesin membrane 1 in the depth direction by the distance dx, the electrostatic capacitance is given by $Cx=\varepsilon S/(d-dx)$. If further pressurized, the gas in the pores escape to a pinhole (air-releasing opening) 15 as shown in FIG. 1, part (A)-(b), and the first electrolyte aqueous solution 2 reaches the rear surface (thickness d) of the water-repellent porous fluororesin membrane 1 to be brought into contact with the second electrolyte aqueous solution 5 (Sw is turned on in the equivalent circuit of FIG. 1, part (B)). Thus, the water-repellent porous fluororesin membrane 1 becomes a conductive material. In the present disclosure, this phenomenon is utilized as the ion on/off switch, a conductor/insulator switch, and a dielectric/insulator switch, and therefore it is named the "ion ON/OFF membrane." As an escape for the gas (air) in the pores of this water-repellent porous fluororesin membrane 1, an air opening valve 16 is provided to take in/out the gas through the pinhole (air-releasing opening) 15. When the water-repellent porous fluororesin membrane 1 is used as a dielectric, it is used while closing the air opening valve 16. When measuring the water-resistant pressure by using the water-repellent porous fluororesin membrane 1 as a conductor, the air opening valve 16 is opened to maintain an air open state. Further, as shown in FIG. 1, part (B), an equivalent circuit which consists of a combination of an electrostatic capacitance variable capacitor (Cx), a resistance (R) and a switch (Sw) is proposed. Here, the resistance (R) is the electric resistance of the electrolyte aqueous solution entering the pores of the water-repellent porous fluororesin membrane 1, and is given by: the electrostatic capacitance variable capacitor $Cx=\lim[dx \to d]\varepsilon S/(d-dx)=\infty$. In this equivalent circuit, when $Cx=\infty$, it is expressed as the switch (Sw) is in the ON state. The measurement of the electrostatic capacitance variable capacitor $Cx=\lim[dx \to d]\varepsilon S/(d-dx)=\infty$ is performed by using the Kohlrausch bridge of FIG. 1, part (C), and it is measured as the change in electrostatic capacitance of the capacitor (Cx). Simultaneously, the water-resistant pressure of the water-repellent porous fluororesin membrane 1 is obtained by a water-resistant pressure measuring device with the structure in which the water-repellent porous fluororesin membrane 1 is sandwiched between the first electrolyte aqueous solution 2 and the second electrolyte aqueous solution 5. The water-resistant pressure (P) is obtained from the differential pressure between a hydraulic pressure (P1) 3 of the first electrolyte aqueous solution 2 and a hydraulic pressure (P2) 6 of the second electrolyte aqueous solution 5 (that is, P=P1−P2). The water-resistant pressure is determined by the pore diameter of the membrane and the thickness thereof, and therefore when n sheets of membranes of the same type as that of the water-repellent porous fluororesin membrane 1 are used in pile and measured, the water-resistant pressure increases n times.

In the present disclosure, the water-repellent porous fluororesin membrane is used as a material of the isolation membrane to repel not only water naturally but also oil. There are commercially available water-repellent porous fluororesin membranes, which comprise plurality of pores communicating with each other, with various pore diameters 0.1 to 80 μm. As the pore diameter increases, the water-resistant pressure is lowered and the mechanical strength is also lowered, making the water-repellent porous fluororesin membrane easily breakable. Therefore, with a material having a small pore diameter, a hydrophilic group (—OH) can be substituted in the pores by utilizing an ultraviolet photochemical reaction. In the present disclosure, a water-repellent porous fluororesin membrane with a pore diameter of 3 μm, whose water-resistant pressure is, for example, 0.03 to 0.04 megaPascal (MPa), is used.

According to a first form of the present disclosure, the "expelling and drawing-back" of the gas present in the pores of the water-repellent porous fluororesin membrane is utilized as the "ion ON/OFF surface switch," to perform the electrochemical reaction in the electrolyte aqueous solution. When the electrolyte aqueous solution is pressurized at the water-resistant pressure or higher while the gas is sealed in the pores of the water-repellent porous fluororesin membrane in the electrolyte aqueous solution, a compressed gas layer which functions as a ferroelectric is produced in the membrane. On the other hand, when the pressurization on the electrolyte aqueous solution is released, the compressed gas layer expands and the membrane restores itself as an insulator. This dielectric/insulator switching phenomenon is utilized as the electrostatic capacitance variable capacitor. On the other hand, when the gas inside the water-repellent porous fluororesin membrane is released, the gas in the pores and the electrolyte aqueous solution are in place of each other and the membrane becomes conductive. As the gas releasing means, gas capsules or air-releasing openings which communicate with the water-repellent porous fluororesin membrane are provided outside the electrochemical reaction zone. With such a structure, the gas in the membrane is released to the outside of the membrane by the pressurization, and the water-repellent porous fluororesin membrane becomes a conductor. On the other hand, if the pressurization is released, the gas returns into the pores of the membrane spontaneously and the membrane restores itself to an insulator. This conductor/insulator switching phenomenon is applicable to secondary batteries and electrolysis.

According to a second form of the present disclosure, the "dielectric/insulator switching" phenomenon is utilized for an electrostatic capacitance variable capacitor (condenser). In this electrostatic capacitance variable capacitor, the electrolyte aqueous solution is pressurized at the water-resistant pressure or higher, and a very thin compressed gas layer is formed by a gas (air, nitrogen, sulfur hexafluoride or the like) present in the pores of the water-repellent porous fluororesin membrane. Subsequently, charge is applied to this compressed gas layer, and then the pressurization on the electrolyte aqueous solution is released, to store charge on the surface of the gas in the water-repellent porous fluororesin membrane. When discharging, the pressurization on the electrolyte aqueous solution is increased or decreased, and thus the discharge capacity can be controlled. When the compressed gas layer is located in the vicinity of the electrode, one surface of the water-repellent porous fluororesin membrane is brought into tight contact with the electrode plate, and the other surface is in contact with the electrolyte aqueous solution. Thus, electrode plates are arranged on both sides via the electrolyte aqueous solution, to form a capacitor (condenser) between these electrodes. On the other hand, when the compressed gas layer is located in a central portion of the water-repellent porous fluororesin membrane, both surfaces of the water-repellent porous fluororesin membrane are in contact with the electrolyte aqueous solutions, and thus two electrode plates are arranged via these electrolyte aqueous solutions to form a capacitor (condenser) between these electrodes.

In the present disclosure, as shown in FIG. 1, part (B), the water-repellent porous fluororesin membrane is considered to be a capacitor Cx. If the thickness d of the water-repellent porous fluororesin membrane and the press depth of the electrolyte aqueous solution is defined as dx, the press depth dx of the electrolyte aqueous solution serves as a resistor, and a portion of a thickness of (d−dx) of the compressed gas layer serves as a dielectric. Therefore, as to the electrostatic capacitance $Cx=\varepsilon S/(d-dx)$, if d−dx approaches zero, the electrostatic capacitance extremely increases. The electrostatic energy stored in the capacitor C is given by $W=CV2/2$. Therefore, if a high voltage V is applied while the electrostatic capacitance C is high, large energy is stored in the capacitor. Then, when the pressurization on the electrolyte aqueous solution is released, electrostatic energy is stored in the water-repellent porous fluororesin membrane. Here, if the water-resistant pressure or lower is applied again onto the electrolyte aqueous solution, electrostatic energy is discharged from the positive electrode plate and the negative electrode plate. When the hydraulic pressure to be applied to the electrolyte aqueous solution is gradually increased, electrostatic energy increases also in proportion to the hydraulic pressure. This can be used as an electrostatic capacitance variable capacitor (condenser) or a variable electrostatic energy discharger.

In structures of such a capacitor, one is that a sheet of water-repellent porous fluororesin membrane is sandwiched between two electrolyte aqueous solutions to form one capacitor and another is that an electrolyte aqueous solution is sandwiched by two water-repellent porous fluororesin membranes to form two series capacitors.

Figure 2:
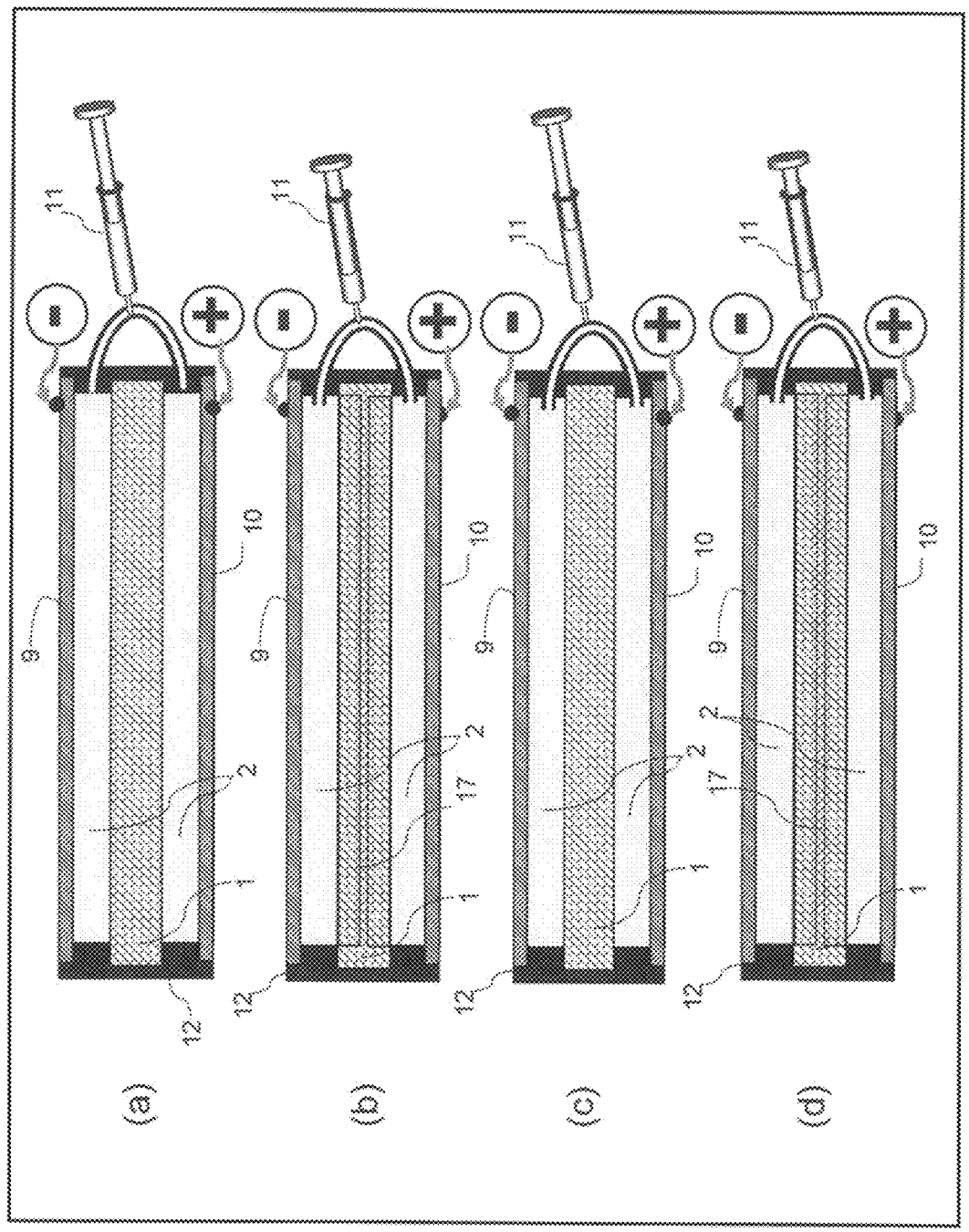

FIG. 2, part (a) shows a structure of a capacitor including a closed electrolyte cell 12 (a closed container) which accommodates a pair of electrode plates (a negative electrode plate 9 and a positive electrode board 10) and one water-repellent porous fluororesin membrane. One water-repellent porous fluororesin membrane 1 is sandwiched between the pair of electrodes (the negative electrode plate 9 and the positive electrode plate 10) and it is arranged parallel to the pair of electrodes and in the center of the closed electrolyte cell 12 in which the electrolyte aqueous solution 2 is enclosed.

As shown in FIG. 2, part (b), when the electrolyte aqueous solution is pressurized with a hydraulic pressure higher than or equal to the water-resistant pressure of the water-repellent porous fluororesin membrane by a liquid pressurizing device 11 (pressurizing device), the electrolyte aqueous solution injects the water-repellent porous fluororesin membrane 1 from both surfaces, and thus the compressed gas layer 17 of the electrostatic capacitance C is formed. If the voltage V is given to this compressed gas layer 17, electrostatic energy W, obtained by $W=CV2/2$, is charged. Here, as shown in FIG. 2, part (c), if the water-resistant pressure is released to expand the compressed gas layer 17, the water-repellent porous fluororesin membrane 1 restores itself as an insulator. At this time, the electrostatic energy W (=CV2/2) is stored in the water-repellent porous fluororesin membrane 1. Then, as shown in FIG. 2, part (d), when if the electrolyte aqueous solution is once again pressurized at the water-resistant pressure or lower, such an electrostatic capacitance variable capacitor is formed that changes the thickness of the compressed gas layer 17 according to the degree of the pressurization, which makes it possible to control the electrostatic energy to be discharged.

Figure 3:
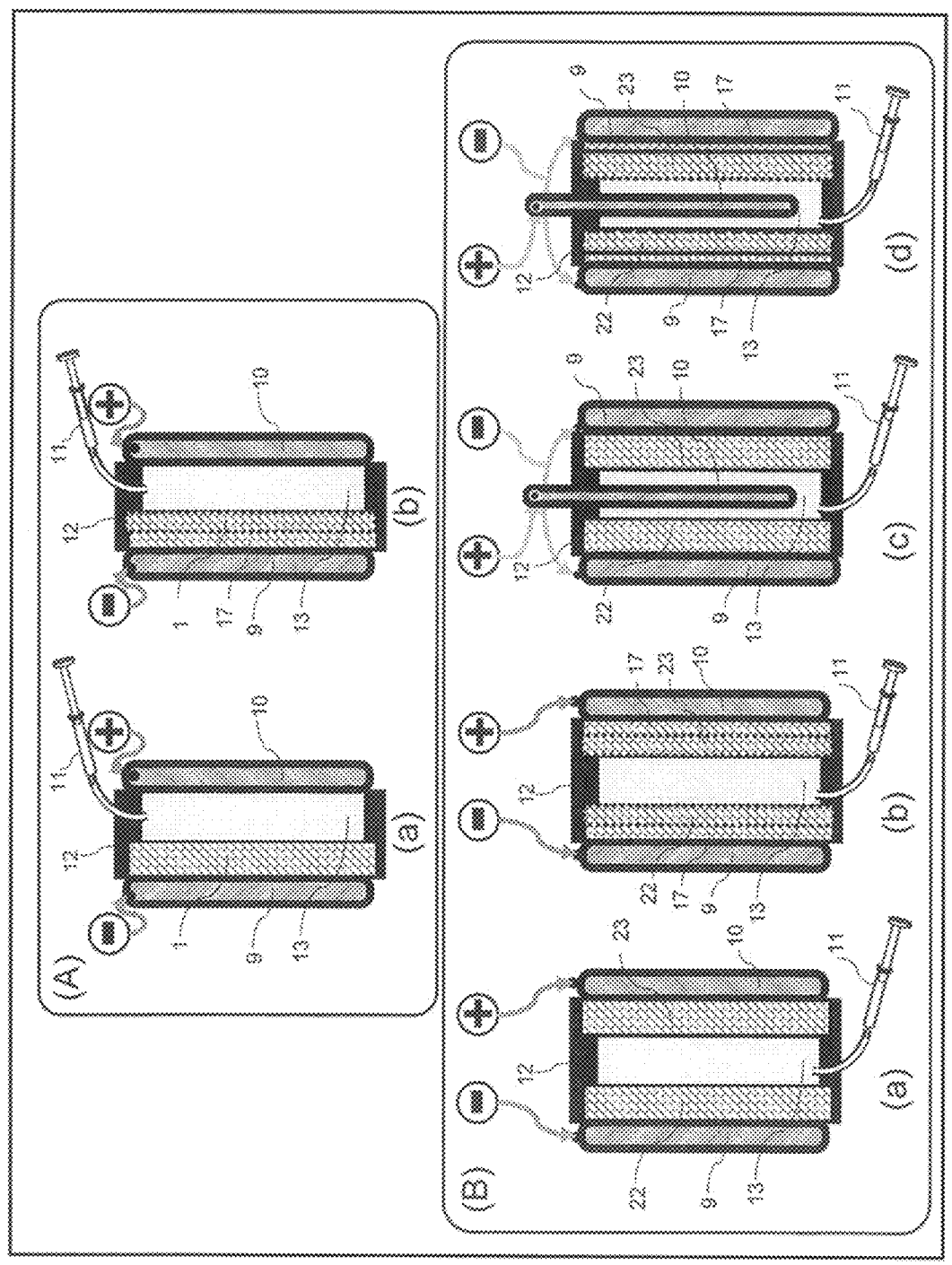

FIG. 3, part (A) shows a capacitor of a structure similar to that of FIG. 2, part (a) except that the water-repellent porous fluororesin membrane 1 is disposed to be in contact with one of the surfaces of the negative electrode plate 9 or of the positive electrode plate 10. As shown in FIG. 3, (A)-(a), one surface of the water-repellent porous fluororesin membrane 1 is in contact with the negative electrode plate 9, and the other surface is in contact with the electrolyte aqueous solution 13. As shown in FIG. 3, (A)-(b), if the electrolyte aqueous solution 13 is pressurized at the water-resistant pressure or higher by the liquid pressure device 11, the gas in the membrane is compressed to form the compressed gas layer 17 in a location of one surface of this water-repellent porous fluororesin membrane 1, which is brought into tight contact with the negative electrode plate 9.

FIG. 3, part (B)-(a, b) shows a capacitor having a structure similar to that of FIG. 3, part (A) except that water-repellent porous fluororesin membranes (first and second water-repellent porous fluororesin membranes 22 and 23) are disposed to be in contact with the surfaces of both the negative electrode plate 9 and the positive electrode plate 10, respectively. As shown in FIG. 3, part (B)-(a, b), when the first and second water-repellent porous fluororesin membranes 22 and 23 are disposed on both surfaces of the electrolyte aqueous solution 13, a series capacitor is formed. But, since this capacitor is connected in series, its electrostatic capacitance is one half. As shown in FIG. 3, part (B)-(c), a parallel-connection capacitor may be constituted. This capacitor comprises two negative electrode plates 9 and 9 opposing each other, first and second water-repellent porous fluororesin membranes 22 and 23 disposed respectively on the surfaces of the two opposing negative electrode plates 9 and 9, an electrolyte aqueous solution 13 disposed between the water-repellent porous fluororesin membranes 22 and 23, and a positive electrode plate 10 disposed in the center of the electrolyte aqueous solution 13 so as to be parallel to the negative electrode plates 9 and 9. Since two capacitors are connected in parallel in this capacitor, the electrostatic capacitance doubles as compared to the capacitor shown in part (B)-(a) of the figure. As shown in FIG. 3, part (B)-(d), the electrolyte aqueous solution 13 is pressurized at the water-resistant pressure or higher, the electrolyte aqueous solution injects the first and second water-repellent porous fluororesin membranes 22 and 23, and the compressed gas layer 17 with the electrostatic capacitance C is formed. If the voltage V is given to this compressed gas layer, the electrostatic energy W, that is, W=2CV2/2=CV2, is charged. Here, when the water-resistant pressure is released, the electrostatic energy, that is, W=CV2, is stored in each of the first and second water-repellent porous fluororesin membranes 22 and 23 connected in parallel. Here, if pressurized again at a hydraulic pressure higher than or equal to the water-resistant pressure, the thickness of the compressed gas layer 17 changes according to the degree of the hydraulic pressure. Thus, it can be used as an electrostatic capacitance variable capacitor which can control the electrostatic energy.

Figure 4:
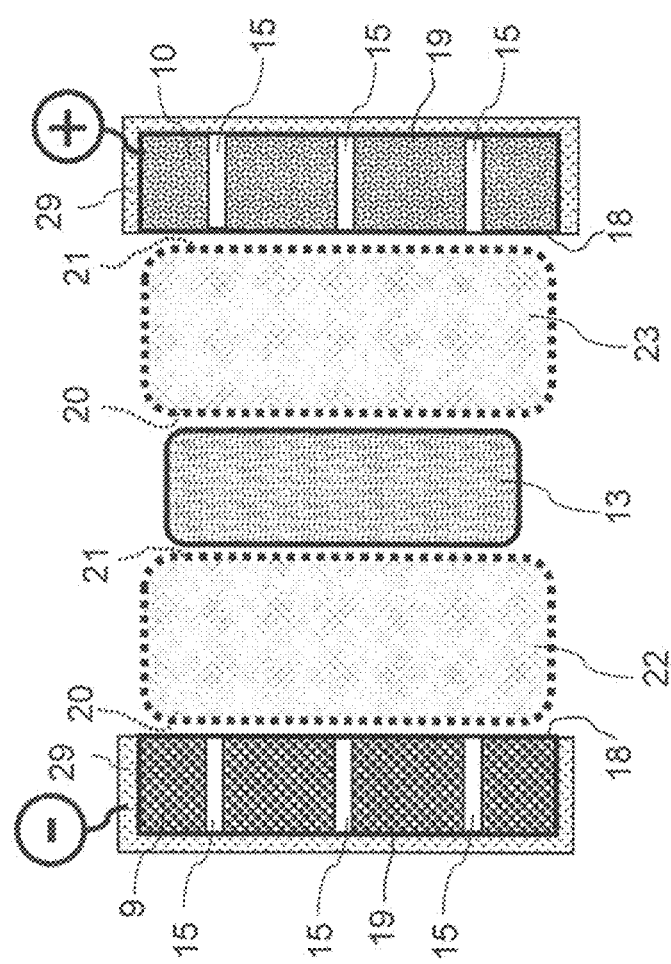
FIG. 4 is a schematic diagram showing a secondary battery comprising a water-repellent porous fluororesin membrane.

A third form of the present disclosure relates to a secondary battery comprising a water-repellent porous fluororesin membrane. In this secondary battery, electric current is supplied to the positive electrode plate, negative electrode plate and the electrolyte aqueous solution only when charging or discharging, and they are insulated when storing charge in order to reduce side reactions and internal resistance. This secondary battery "expels and draws back" the gas in the pores of the water-repellent porous fluororesin membranes, and utilizes the conductor/insulator switch phenomenon as an ion ON/OFF surface switch. In this secondary battery, the gas in the pores consists of, for example, air or nitrogen. As shown in FIG. 4, a negative electrode plate 9 and a positive electrode plate 10 each comprise pinholes 15 communicating between a first surface 18 and a second surface 19, which make it gas-permeable. The gas-permeable negative electrode plate 9 and positive electrode plate 10 are brought into tight contact with a first main surface 20 of a first water-repellent porous fluororesin membrane 22 and a second main surface 21 of a second water-repellent porous fluororesin membrane 23, respectively. Here, if the electrolyte aqueous solution 13 is pressurized with the water-resistant pressure, the electrolyte aqueous solution 13 is injected into a plurality of pores in the first and second water-repellent porous fluororesin membranes 22 and 23. Thus, the gas expelled from the first main surface 20 of the first water-repellent porous fluororesin membrane 22 and the second main surface 21 of the second water-repellent porous fluororesin membrane 23 is released to the pinholes 15 formed in the first surface 18 of the negative electrode plate 9 and the first surface 18 of the positive electrode plate 10. As a result, the first and second water-repellent porous fluororesin membranes 22 and 23 form an ionic conductor. Next, if the pressurization on the electrolyte aqueous solution 13 is released, the gas returns to the first and second water-repellent porous fluororesin membranes 22 and 23 through the pinholes 15 of the negative electrode plate 9 and the positive electrode plate 10. As a result, the first and second water-repellent porous fluororesin membranes 22 and 23 each form an insulator. Since each of the negative electrode plate 9 and the positive electrode plate 10 comprises pinholes or pores, or is a mesh texture or porous, they are gas-permeable. If it is not desirable for the electrode material to be in contact with the air, the surfaces other than the first surfaces 18 of the positive electrode plate 10 and the negative electrode plate 9 are covered by an air protection membrane 29 so as to equalize the pressure in the pinholes or pores with the atmospheric pressure, thus preventing reactions between the air or moisture and base metals such as Li, Na, K, Al and Mg or metal salts such as copper chloride, copper nitrate and copper sulfate.

A fourth form of the present disclosure relates to a secondary battery comprising a water-repellent porous fluororesin membrane. This secondary battery is a base metal/copper secondary battery which especially uses a base metal plate such as aluminum, zinc, nickel or lead, for the negative electrode plate, and uses a copper plate for the positive electrode plate. A battery of this type is, for example, a Daniel battery. In the Daniel battery, a zinc sulfate aqueous solution as an electrolyte aqueous solution on the side of the negative electrode plate, and a zinc plate electrode is inserted therein. On the other hand, a copper sulfate aqueous solution is used as an electrolyte aqueous solution on the side of the positive electrode plate, and a copper plate is inserted therein. The two electrolyte aqueous solutions are isolated from each other generally with a clay plate interposed therebetween. With this structure, copper ions on the side of the positive electrode plate migrate to the negative electrode plate side through the clay plate, and deposit on the zinc plate of the negative electrode plate to form a local battery. Therefore, a secondary battery cannot be formed.

According to the fourth form of the present disclosure, in order to inhibit the direct reaction between the copper plate as the positive electrode plate, and electrolyte aqueous solution during charging/discharging, a solid electrolyte is interposed between the copper plate as the positive electrode plate and the electrolyte aqueous solution. Further, the water-repellent porous fluororesin membrane is provided between the solid electrolyte and the electrolyte aqueous solution to isolate from each other. The solid electrolyte consists of ionic crystals, and is a buffer reaction zone where copper ions are transferred between the copper plate as the positive electrode plate and itself, and negative ions in the electrolyte aqueous solution are transferred therebetween. More specifically, the positive electrode plate is a copper electrode in which base metal layers of a chloride, sulfate or nitrate of copper, are laminated one on another, whereas the negative electrode plate is a base metal plate. The positive electrode plate and the negative electrode plate are isolated from the electrolyte aqueous solution by water-repellent porous fluororesin membranes, respectively. The electrolyte aqueous solution is used a base metal salt aqueous solution consisting of one salt of a chloride, nitrate and or sulfate of a base metal. This secondary battery is charged/discharged while the electrolyte aqueous solution is injected into each of water-repellent porous fluororesin membranes at the water-resistant pressure, and the charge is stored therein while the pressurization is released. Subsequently, if the pressurization on the electrolyte aqueous solution is released, each of the water-repellent porous fluororesin membranes becomes an insulator, and insulates the solid electrolyte on the side of each of the negative electrode plate and the positive electrode plate and the electrolyte aqueous solution from each other, and thus the charge stored state is maintained. The battery is formed with such a structure that with this operation, ionic reactions occur on the positive electrode plate and the negative electrode plate only when charging/discharging.

Figure 5:
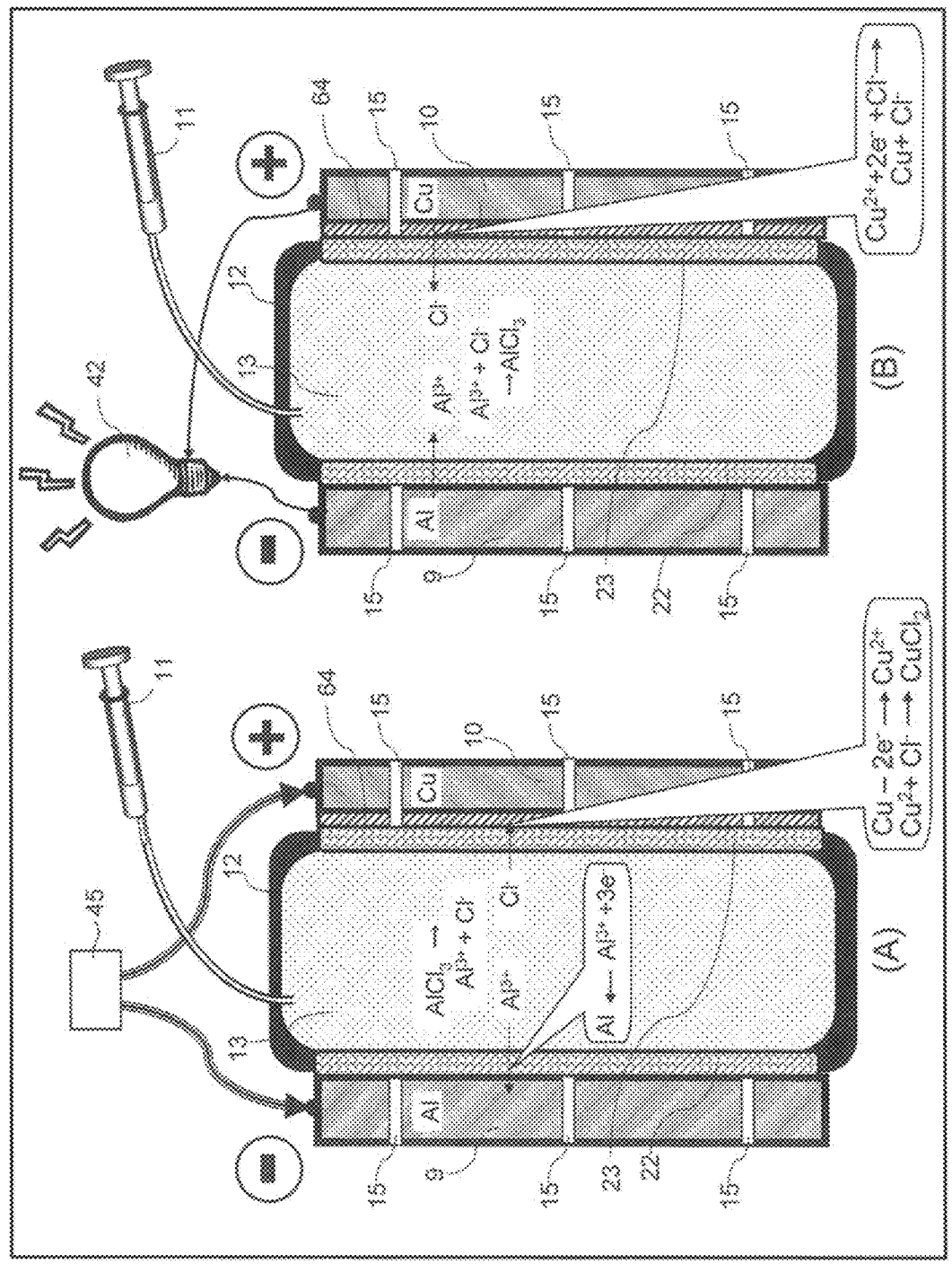
FIG. 5 illustrates a principle of an Al/Cu secondary battery, and part (A) shows migration of electrons and ions when charging, and part (B) shows migration of electrons and ions when discharging.

FIG. 5 is a diagram illustrating a principle of the Al/Cu secondary battery. An electrolyte aqueous solution 13 in a closed electrolyte cell 12 (closed container) is interposed between a negative electrode plate 9 and a positive electrode plate 10. The negative electrode plate 9 and the electrolyte aqueous solution 13 are isolated from each other with a first water-repellent porous fluororesin membrane 22. The positive electrode plate 10 and the electrolyte aqueous solution 13 are isolated from each other with a second water-repellent porous fluororesin membrane 23. An aluminum chloride (AlCl3) aqueous solution is used as the electrolyte aqueous solution 13. The negative electrode plate 9 is an aluminum electrode plate (Al), and the positive electrode plate 10 is a copper electrode plate (Cu) on a surface of which a copper chloride (CuCl2) crystal 64 is laminated. On the copper electrode plate (Cu) on which the copper chloride (CuCl2) crystal 64 is laminated, and also on the aluminum electrode plate (Al), the first and second water-repellent porous fluororesin membranes 22 and 23 are attached, respectively. Each of the negative electrode plate and the positive electrode plate comprises pinholes (air-releasing opening or gas capsules) 15 for "expelling and drawing back" the gas (air) in the first and second water-repellent porous fluororesin membranes 22 and 23. Here, the electrolyte aqueous solution (aluminum chloride aqueous solution) 13 is pressurized at the water-resistant pressure by the liquid pressure device 11 (pressurizing device), and thus the electrolyte aqueous solution 13 is injected into the pores of the first and second water-repellent porous fluororesin membranes 22 and 23. Therefore, the gas (air) in the pores are pushed out to the pinholes 15 of the positive electrode plate 10 and the negative electrode plate 9 to replace the gas with the electrolyte aqueous solution, and thus the first and second water-repellent porous fluororesin membranes 22 and 23 each become an ionic conductor. Subsequently, if voltage is applied from a charging power supply source 45 and thus the charging is started, the copper chloride (CuCl2) crystal 64 is laminated on the copper electrode plate (Cu), and simultaneously, aluminum is deposited on the aluminum electrode plate (Al), thus completing the charging. Then, when the pressurization is released by the liquid pressure device 11, the gas (air) returns to the first and second water-repellent porous fluororesin membranes 22 and 23 from the pinholes (the air-releasing openings, the gas capsules) 15, and thus the first and second water-repellent porous fluororesin membranes 22 and 23 each become an insulator, thereby maintaining the charge storage state. Next, if the electrolyte aqueous solution 13 is pressurized again by the liquid pressure device 11 at the water-resistant pressure or higher, the gas (air) in the first and second water-repellent porous fluororesin membranes 22 and 23 is expelled to the pinholes 15 to start discharging and a load (electric bulb) 42 is turned on. The ionic reactions of this battery in an initial state (1), charging (2), storage of charge (3), and discharging (4) are as follow:

(1) Initial state: a copper plate, which is the positive electrode plate, and an aluminum plate, which is the negative electrode plate are set on both sides of the aluminum chloride (AlCl3) aqueous solution through water-repellent porous fluororesin membranes, respectively. Here, the electrolyte aqueous solution is not yet pressurized by a pressurizing device, and therefore both electrode plates are not in contact with the electrolyte aqueous solution; therefore, no chemical reaction occurs.

(2) To charge: The electrolyte aqueous solution consisting of an aluminum chloride (AlCl3) aqueous solution is pressurized by the pressurizing device to the water-resistant pressure, thus to start charging. Here, the ionic reactions of the aluminum chloride (AlCl3) electrolyte, to which electrons are given from the negative electrode plate, are:

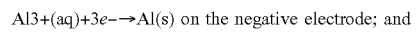

Al3+(aq)+3$e$−→Al(s) on the negative electrode; and

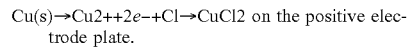

Cu(s)→Cu2++2$e$−+Cl−→CuCl2 on the positive electrode plate.

As the charging progresses, the concentration of the electrolyte aqueous solution becomes lower and eventually reaches the charge limit.

(3) To store charge: all of the chemical reactions stop and the charge stored state is continuously maintained.

(4) To discharge: the electrolyte aqueous solution is pressurized by the pressurizing device at the water-resistant pressure, thereby to start discharge. When aluminum of the negative electrode plate starts to be eluted into the electrolyte, electrons thus emitted move to the positive electrode plate through the load, and electrons are given to copper ions (Cu2+) of copper chloride CuCl2 attached to the surface of the positive electrode plate, thus depositing metallic copper on the positive electrode plate. At the same time, chlorine ions (Cl−) eluted into the electrolyte, and aluminum ions (Al3+) eluted from the negative electrode plate bond together to form aluminum chloride (AlCl3). At the negative electrode plate, Al(s)−3e−→Al3+(aq) takes place, whereas at the positive electrode plate, CuCl2→Cu2++2e−+2Cl−→Cu(s)+2Cl−, and thus the concentration of the electrolyte increases (Al3+(aq)+Cl−→AlCl3).

According to a fifth form of the present disclosure relates to remodeling of a Daniel battery using a negative ion exchange membrane. In the Daniel battery, copper ions of the positive electrode plate side enter the negative electrode plate from the clay plate, and deposit on the zinc plate of the negative electrode plate to form a local battery. Therefore, a secondary battery cannot be formed. Under these circumstances, a secondary battery has been developed using an ion ON/OFF surface switch consisting of a negative ion exchange membrane and a water-repellent porous fluororesin membrane.

Figure 6:
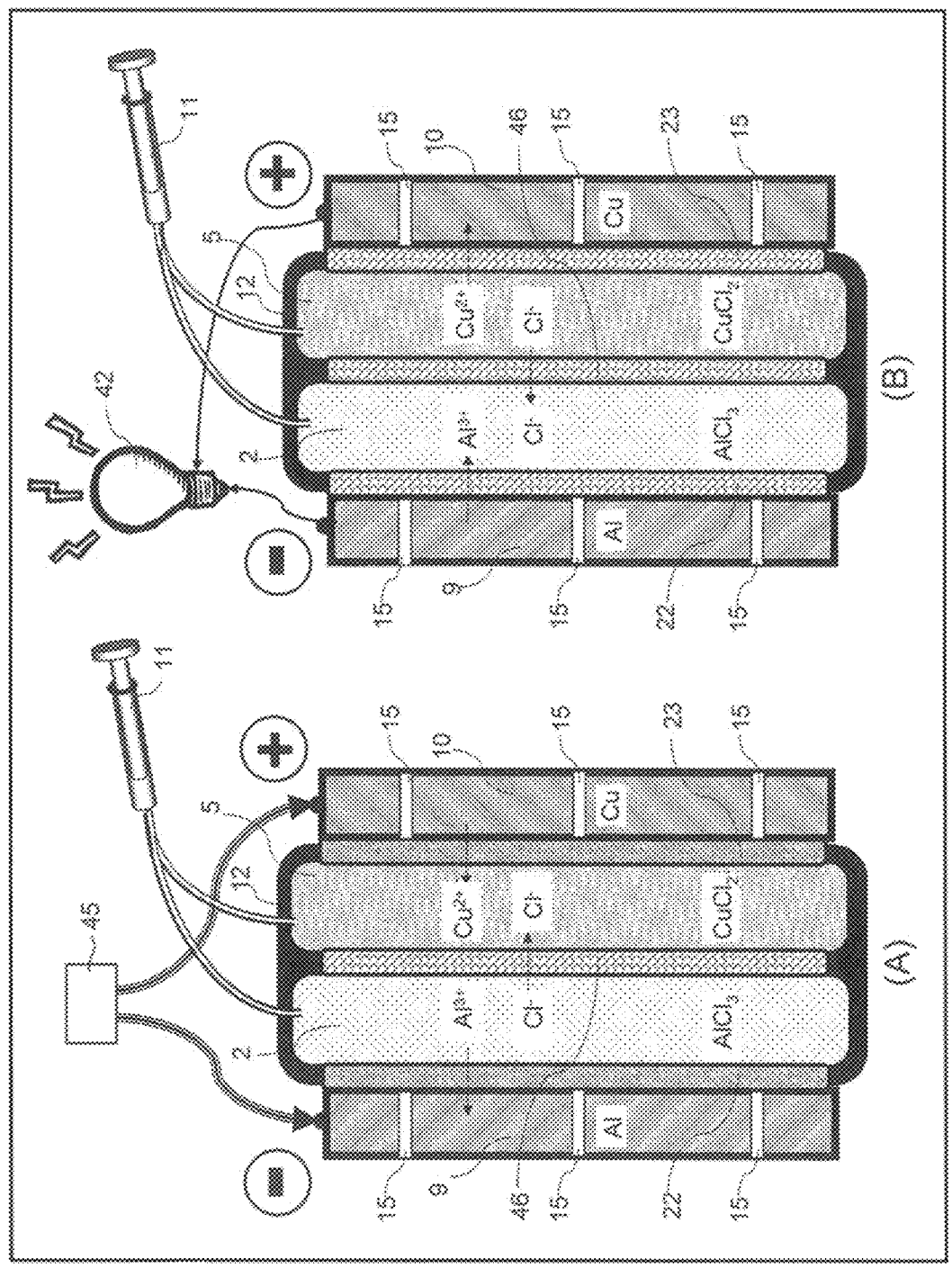
FIG. 6 illustrates a principle of an Al/Cu secondary battery prepared by improving a Daniel battery, and part (A) shows migration of ions when charging, and part (B) shows migration of ions when discharging.

FIG. 6 is a diagram explaining the principle of a remodeled base metal/Cu-Daniel battery, and part (A) is a schematic diagram thereof at charging and part (B) shows that at discharging. The battery shown in FIG. 6 further comprises a negative ion exchange membrane 46 which divides the closed electrolyte cell 12 into a first chamber on a side of the positive electrode plate 10 and a second chamber on a side of the negative electrode plate 9. The first chamber and the second chamber contain a first electrolyte aqueous solution 2 and a second electrolyte aqueous solution 5 different from each other, respectively. The electrolyte aqueous solutions 2 and 5 are electrolyte aqueous solutions containing negative ions of the same type and positive ions of different types. The first electrolyte aqueous solution 2 is a base metal salt aqueous solution of, for example, a chloride, nitrate or sulfate of a base metal. The second electrolyte aqueous solution 5 is a copper salt aqueous solution of, for example, copper chloride, copper nitrate, or copper sulfate. A base metal plate is used for the negative electrode plate 9, whereas a copper electrode plate (Cu) is used for the positive electrode plate 10. The first electrolyte aqueous solution 2 and the second electrolyte aqueous solution 5 are separated as two parts by a negative ion exchange membrane 46. The aluminum electrode plate (Al) and the copper electrode plate (Cu) comprise pinholes 15 formed therein for "expelling and drawing back" the gas (air) in the first and second water-repellent porous fluororesin membranes 22 and 23. Here, if the first and second electrolyte aqueous solutions 2 and 5 are pressurized at the water-resistant pressure by the liquid pressure device 11, the electrolyte aqueous solutions 2 and 5 are injected into the water-repellent porous fluororesin membranes 22 and 23 to make them into ionic conductors. In this state, when voltage is applied from the charging power supply source 45, the charging is started. Then, copper ions (Cu2+) are eluted from the copper electrode plate (Cu) into the copper chloride (CuCl2) aqueous solution, and the concentration of the copper chloride (CuCl2) aqueous solution gradually increases. On the other hand, as to aluminum ions (Al3+) in the aluminum chloride (AlCl3) aqueous solution, metallic aluminum deposits on the aluminum electrode plate (Al) of the negative electrode plate 9, and thus the charging is completed. Here, if the pressurization is released by the liquid pressure device 11, the gas (air) returns from the pinholes 15 into the first and second water-repellent porous fluororesin membranes 22 and 23, and thus each of the first and second water-repellent porous fluororesin membranes 22 and 23 becomes an insulator, thereby to maintain the charge stored state. Then, if the first and second electrolyte aqueous solutions 2 and 5 are pressurized again at the water-resistant pressure by the liquid pressure device 11, the gas in the first and second water-repellent porous fluororesin membranes 22 and 23 is pushed out into the pinholes 15 to make each of the membranes 22 and 23 conductivity. As a result, discharging of the secondary battery is started to light up the load (electric bulb) 42.

A sixth form of the present disclosure relates to a secondary battery comprising a first detecting means and a second detecting means. In this secondary battery, the solubility and the process of recrystallization of the electrolyte aqueous solution, which vary in proportion to the density of electrons flowing during charging/discharging, are measured based on the refractive index and permeability, thereby making it possible to detect the charge limit and discharge limit.

Figure 7:
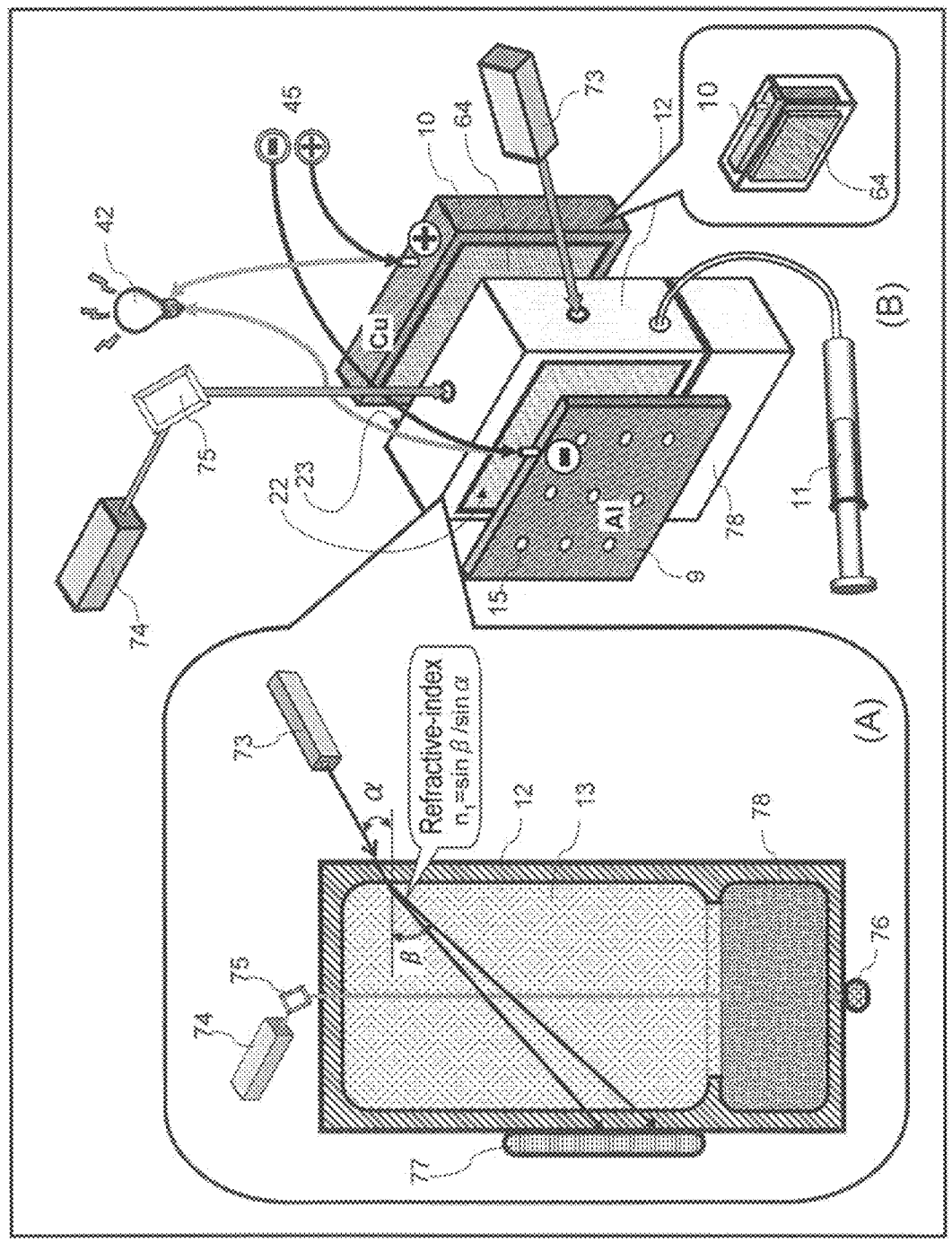
FIG. 7 shows a secondary battery comprising a first detection means and a second detection means, part (A) is a schematic diagram illustrating measurement in refractive-index of an electrolyte aqueous solution, and measurement in change in permeability at the time of recrystallization, and part (B) is a diagram showing an Al/Cu secondary battery in which a measurement laser is installed.

FIG. 7, part (B) is a schematic diagram showing the Al/Cu secondary battery of FIG. 5, with a measuring laser further installed thereon. FIG. 7, part (A) is a diagram illustrating measurement of refractive index of the electrolyte aqueous solution, and measurement of variation in transmittance during recrystallization.

FIG. 7 shows the aluminum/copper secondary battery in which a negative electrode plate 9, a positive electrode plate 10 and an aluminum chloride (AlCl3) aqueous solution in a closed electrolyte cell 12 are respectively isolated from each other with first and second water-repellent porous fluororesin membranes 22 and 23. The secondary battery shown in FIG. 7 comprises a first detection means for detecting the finishing of charging and the discharge limit by measuring the variation in the refractive index of the electrolyte aqueous solution while the secondary battery is being charged, discharged or storing charge with irradiation of laser beam. Further, the secondary battery comprises a second detection means for detecting the recrystallization of the electrolyte aqueous solution by measuring the variation in transmittance of the electrolyte aqueous solution while the secondary battery is being charged, discharged or storing the charge with irradiation of a laser beam. The first detection means measures the variation in refractive index of the aluminum chloride (AlCl3) aqueous solution as the electrolyte aqueous solution 13 during charging, discharging and storing of the charge from the refraction angle of a first semiconductor laser (532 nm) 73 obtained by a linear sensor 77, thereby detecting the finishing of charging and the discharge limit. At the same time, if the electrolyte aqueous solution exceeds its saturation solubility, the variation of the refractive index stops and the recrystallization starts in the aluminum chloride (AlCl3) aqueous solution. When the recrystallization starts, scattering phenomenon occurs in the aluminum chloride (AlCl3) aqueous solution, and therefore the transmittance decreases. The second detection means irradiates a second semiconductor laser beam (650 nm) 74 from an upper portion of the closed electrolyte cell 12 towards a precipitate container 78 down below and the transmission intensity of the light is measured by an optical detector 76. At this time, the amount of the precipitate recrystallized as the aluminum chloride (AlCl3) aqueous solution, which is the electrolyte aqueous solution 13, exceeds its saturation solubility, can be measured from the transmittance, thereby making it possible to predict the discharge capacity.

A seventh from of the present disclosure relates to an electrolyzer which uses a multiple isolation membrane as an ion on-off surface switch. This electrolyzer has such a structure that a plurality of electrolyte cells filled with different kinds of electrolyte aqueous solutions are arranged in series and they are respectively separated with multiple isolation membranes each formed from a plurality of water-repellent porous fluororesin membranes. In order to have the electrochemical reaction to occur with use of the multiple isolation membranes, when the electrolyte aqueous solution is pressurized at the water-resistant pressure from each both sides of the water-repellent porous fluororesin membranes, the gas in each of the water-repellent porous fluororesin membranes cannot be expelled to anywhere, and therefore a gaseous insulating layer is formed in the membranes, thereby stopping the electrochemical reaction. Each of the multiple isolation membranes comprises a gas exhaust/introduction pipe as a channel to release the gas in the water-repellent porous fluororesin membranes to the outside of the electrochemical reaction zone. When the gas exhaust/introduction pipe is release to the atmosphere, or a gas reservoir (microcapsules) communicated to the gas exhaust/introduction pipe is provided and the electrolyte aqueous solution is pressurized, the gas in the multiple isolation membrane and the electrolyte aqueous solution is in place of each other, and thus the membrane becomes a conductor. On the other hand, when the pressurization on the electrolyte aqueous solution is released, the gas is returned into each of the water-repellent porous fluororesin membranes through the gas exhaust/introduction pipe, and each of water-repellent porous fluororesin membranes becomes an insulator. Here, such a multiple isolation membrane is proposed, that uses this "gas expelling and drawing back" operation as a conductor/insulator surface switch.

Figure 8:
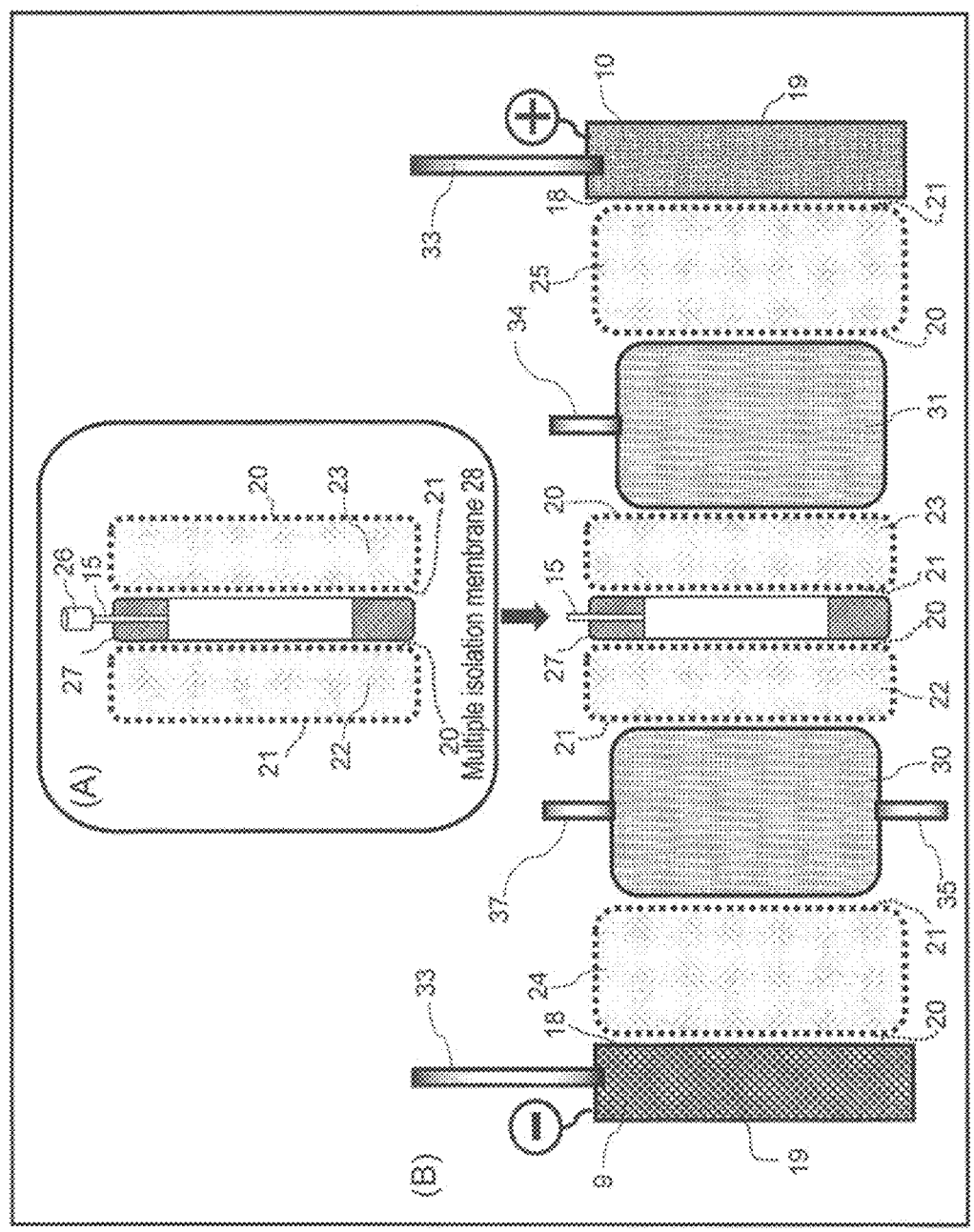
FIG. 8 shows a multiple isolation membrane, and part (A) shows a structural of the multiple isolation membrane, and part (B) shows an arrangement in the multiple isolation membrane.

A multiple isolation membrane 28 is disposed between two closed electrolyte cells (a first electrolyte cell 30 and a second electrolyte cell 31). As shown in FIG. 8, part (A), the multiple isolation membrane 28 has such a structure that a thin frame-shaped gasket 27 is sandwiched between the first water-repellent porous fluororesin membrane 22 and the second water-repellent porous fluororesin membrane 23. In the multiple isolation membrane 28, a first main surface 21 of the first water-repellent porous fluororesin membrane 22 and a second main surface 20 of the second water-repellent porous fluororesin membrane 23 are respectively in contact with the first and second electrolyte cells 30 and 31 which are filled with the electrolyte aqueous solution. The inside of the gasket 27 is communicated with the gas exhaust/introduction pipe 15 whose one end is communicated with a space surrounded the first and second water-repellent porous fluororesin membranes 22 and 23 and with the gasket 27 itself, and thus communicated with the atmosphere to be opened thereto. Or the gas in the first and second water-repellent porous fluororesin membranes 22 and 23 is contained in the gas reservoir (microcapsules) 26 attached to the gas exhaust/introduction pipe 15. Here, if the electrolyte aqueous solution in the first electrolyte cell 30 and the electrolyte aqueous solution in the second electrolyte cell 31 are pressurized at the water-resistant pressure, the electrolyte aqueous solution is injected into each water-repellent porous fluororesin membrane, and thus the first main surface 20 of the first water-repellent porous fluororesin membrane 22 and the second main surface 21 of the second water-repellent porous fluororesin membrane 23 are brought into contact electrically with each other, to become a conductor. When the pressurization on the electrolyte aqueous solutions in the first and second electrolyte cells is released, the gas returns into the gasket 27 and thus the gas is drawn back from the first main surface 20 of the first water-repellent porous fluororesin membrane 22 and the second main surface 21 of the second water-repellent porous fluororesin membrane 23 to fill the inside of the pores with the gas. Thus, the membranes become insulators.

The most important use of the multiple isolation membrane 28 is electrolysis of saline. FIG. 8, part (B) briefly shows the electrolyzer. The electrolyzer includes a negative electrode plate 9, a third water-repellent porous fluororesin membrane 24, a first electrolyte cell 30, a multiple isolation membrane 28, a second electrolyte cell 31, a fourth water-repellent porous fluororesin membrane 25 and a positive electrode plate 10 connected in series in this order. Water is supplied to the first electrolyte cell 30 and saline is supplied to the second electrolyte cell 31. The electrolyte cells 30 and 31 are pressurized at the water-resistant pressure and electrolytic voltage is applied thereto, to carry out electrolysis. By this electrolysis, hydrogen gas can be collected from a produced gas recovery pipe 33 of the negative electrode plate 9, sodium hydroxide from a base metal soda recovery opening 35 of the first electrolyte cell 30, and gaseous chlorine from the produced gas recovery pipe 33 of the positive electrode plate 10.

An eighth form of the present disclosure relates to an electrolyzer which employs the multiple isolation membrane described above. In this form, alkali-metal-salt aqueous solutions of, for example, an alkali metal chloride, alkali metal sulfate, or alkali metal nitrate are electrolyzed to produce alkali metal hydroxide and hydrogen on a negative electrode plate, and hydrochloric acid, sulfuric acid, nitric acid or oxygen on a positive electrode plate. A conducting agent on the negative electrode plate side is, for example, alkali metal hydroxide.

Figure 9:
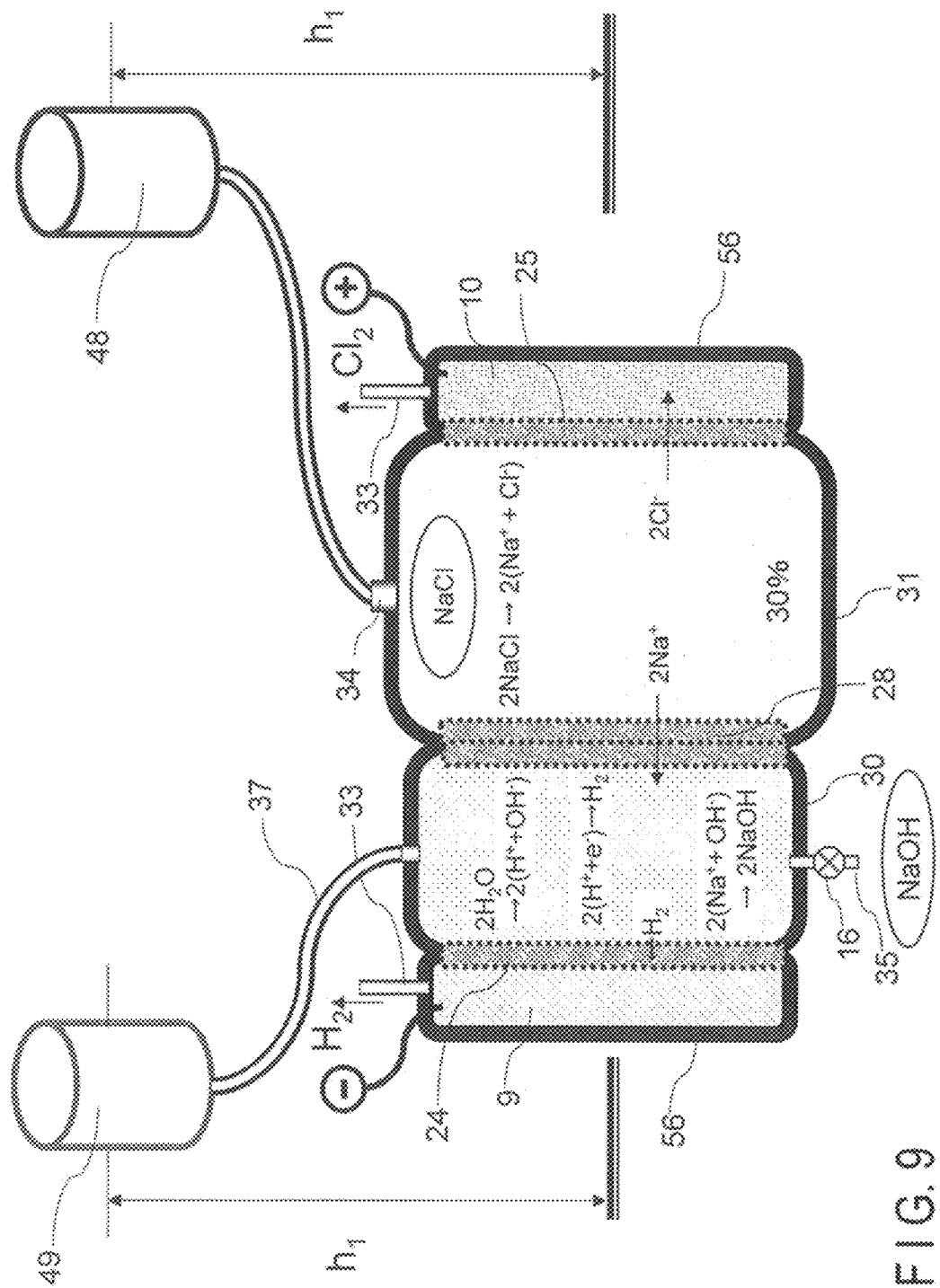
FIG. 9 shows a sodium-hydroxide generating device which employs the multiple isolation membrane.

FIG. 9 shows a device of producing sodium hydroxide by electrolysis of salt. This device comprises a first electrolyte cell 30 and a second electrolyte cell 31 both in a closed state and disposed adjacent to each other. The first and second electrolyte cells 30 and 31 are isolated from each other with the multiple isolation membrane 28 described above. The first electrolyte cell 30 and a produced gas recovery chamber 56 on a side of the negative electrode plate 9 are adjacent to each other and isolated with a third water-repellent porous fluororesin membrane 24. The second electrolyte cell 31 and a produced gas recovery chamber 56 on a side of the positive electrode plate 10 are adjacent to each other and isolated with a fourth water-repellent porous fluororesin membrane 25. The produced gas recovery chamber 56 of the negative electrode plate 9 and the produced gas recovery chamber 56 of the first and second electrolyte cells 30 and 31 and the positive electrode plate 10, are connected in series. Water and an electrolyte aqueous solution are contained in the first and second electrolyte cells 30 and 31, respectively.

Within the produced gas recovery chamber 56 on the side of the negative electrode plate 9, the negative electrode plate 9 (carbon or nickel) of a mesh texture or in a porous state is located therewithin, provided with a gas (hydrogen) recovery opening and having gas permeability. Within the produced gas recovery chamber 56 on the side of the positive electrode plate 10, the positive electrode plate 10 (carbon) of a mesh texture or in a porous state is located therewithin, provided with a gas (chlorine) recovery opening and having gas permeability. The first electrolyte cell 30 on the side of the negative electrode plate 9 is an electrolytic tub for water and sodium hydroxide is added therein as a conducting agent, to produce a sodium hydroxide aqueous solution by electrolysis, whereas the produced gas recovery chamber 56 on the side of the negative electrode plate 9 produces hydrogen gas. The second electrolyte cell 31 is an electrolysis tub for saline, and gaseous chlorine is produced in the produced gas recovery chamber 56 on the side of the positive electrode plate 10. While electrolyzing, fresh water is supplied to the first electrolyte cell 30 from a water supply source (pressure head) 49 located at a potential head h1, to apply the water-resistant pressure on the first electrolyte cell 30. Similarly, while electrolyzing, 30%-saline is supplied from a saline supply source (pressure head) 48 (pressurizing device) located in the potential head h1 to apply the water-resistant pressure of the second electrolyte cell 31. Here, since the third and fourth water-repellent porous fluororesin membranes 24 and 25, and the first and second water-repellent porous fluororesin membrane of the multiple isolation membrane 28 have the same pore diameter (3 μmφ), the pressurization on the first and second electrolyte cells 30 and 31 may be carried out at the same pressure. Therefore, the potential head pressures of the water supply source 49 and the saline supply source 48 are set at the same height (h1). While charging/discharging, the electrolyte aqueous solutions contained in the electrolyte cells 30 and 31 are pressurized up to the water-resistant pressure, and thus water and the electrolyte aqueous solution are injected into the third and fourth water-repellent porous fluororesin membranes 24 and 25 and the multiple isolation membrane, to make them into conductors. While storing the charge, the pressurization on the water and the electrolyte aqueous solution is released to return the gas into the third and fourth water-repellent porous fluororesin membranes 24 and 25 and the multiple isolation membrane. Thus, the membranes become insulators. By the electrolysis of this device, hydrogen, sodium hydroxide and chlorine can be obtained at high concentration.

A ninth form of present disclosure relates to an electrolyzer further comprising an excimer lamp. Chlorine produced on a positive electrode plate by electrolysis of saline, reacts with water to produce hypochlorous acid. Produced hypochlorous acid is decomposed by photochemical reaction by the excimer lamp, thus producing hydrochloric acid. In electrolysis of salt, generally gaseous chlorine is produced with a positive electrode plate, but the cost for storage and transport of the gas is high. In this form, hydrochloric acid is handled in the form of liquid, and therefore the cost for the storage and transport of the product can be reduced while maintaining the safety. As described, when gaseous chlorine is generated with a positive electrode by electrolyzing a base metal chloride, hydrochloric acid can be produced by the photochemical reaction by the excimer lamp regardless of the substance to be produced with the negative electrode.

Figure 10:
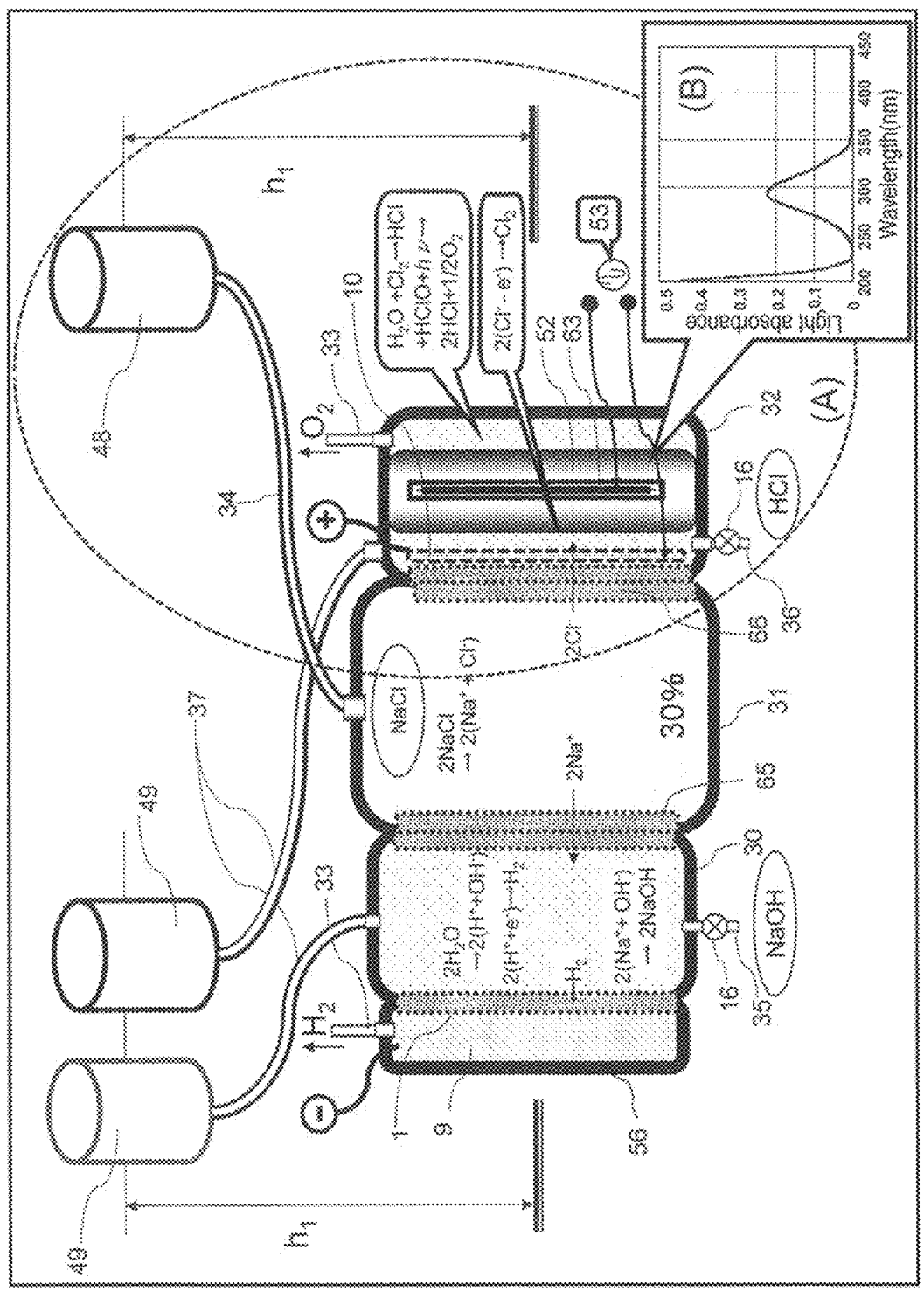
FIG. 10 shows a hydrochloric-acid producing device which employs an excimer lamp, and part (A) shows an arrangement of the excimer lamp and part (B) shows an oscillation wavelength of light of the Xe—Cl excimer lamp.

FIG. 10, part (A) is a diagram schematically showing a device of producing hydrochloric acid by a photochemical reaction caused by light of an excimer lamp. The device shown in FIG. 10, part (A) comprises a first electrolyte cell 30, a second electrolyte cell 31 and a third electrolyte cell 32 all in the closed state and arranged to be adjacent to each other. Between the first and second electrolyte cells 30 and 31, a first multiple isolation membrane 65 having the same structure as that of the multiple isolation membrane 28 described above is disposed. The first multiple isolation membrane 65 comprises a first water-repellent multiple isolation membrane in contact with the inside of the first electrolyte cell 30, and a second water-repellent multiple isolation membrane in contact with the inside of the second electrolyte cell. Between the second and third electrolyte cells 31 and 32, a second multiple isolation membrane 66 having the same structure as that of the multiple isolation membrane 28 described above is disposed. The second multiple isolation membrane 66 comprises a third water-repellent multiple isolation membrane in contact with the inside of the second electrolyte cell 30, and a fourth water-repellent multiple isolation membrane in contact with the inside of the third electrolyte cell. The first electrolyte cell 30 and a produced gas recovery chamber 56 on the side of the negative electrode plate 9 are adjacent to each other, and isolated from each other with a water-repellent porous fluororesin membrane 1 (a fifth water-repellent porous fluororesin membrane). The produced gas recovery chamber 56 on the side of the negative electrode plate 9, and the first, second and third electrolyte cells 30, 31 and 32 are connected in series. In an initial state, water, an electrolyte aqueous solution and water are contained in the first, second, and third electrolyte cells 30, 31 and 32, respectively. The main body of the excimer lamp 52 is immersed in the water of the third electrolyte cell 32. The negative electrode plate 9 is a gas permeable electrode of, for example, a mesh texture and accommodated in the produced gas recovery chamber 56 on the side of the negative electrode plate 9. The positive electrode plate 10 is in the third electrolyte cell 32, and is a gas permeable electrode, for example, a carbon net electrode, disposed tightly on the fourth water-repellent porous fluororesin membrane of the second multiple isolation membrane 66.

With the electrolyzer shown in FIG. 9, in the electrolysis of saline, chlorine is produced in the produced gas recovery chamber 56 on the side of the positive electrode plate 10 by electrolyzing saline. On the other hand, the electrolyzer shown in FIG. 10, part (A), chlorine generated with the positive electrode plate 10 is absorbed into the water and a very small amount of hydrochloric acid thus produced is used as a conducting agent to turn on electricity (alternating current) to the excimer lamp 52 to irradiate, and a comparatively large amount of hypochlorous acid (HClO), generated along with hydrochloric acid, is subjected to photolysis (HClO+hv=HCl+½O2) to produce hydrochloric acid and oxygen. Hydrochloric acid has an absorption band of optical absorption wavelength of 200 nm or less, whereas hypochlorous acid (HClO) has an absorption band of optical absorption wavelength of 200 nm or less and 300 nm (FIG. 10, part (B)). Therefore, the light from the Xe excimer lamp (oscillation wavelength of 306 nm) 52 is not absorbed by hydrochloric acid (HCl), but is absorbed only by hypochlorous acid (HClO) to be photolyzed, thus producing hydrochloric acid (HCl). The excimer lamp 52 used here is of a quartz glass pipe coaxial type, comprising a lamp core electrode 63 at its axial center portion, in which the surface of the quartz glass pipe is excited as a coaxial electrode. Since the surface of the glass pipe is surrounded by a hydrochloric acid aqueous solution, the positive electrode plate 10 is used also as an excimer lamp excitation electrode as one of the pair of electrodes, and excited by the excimer lamp excitation power supply (AC) 53. An electric current is sent to flow through the hydrochloric acid aqueous solution between the surface of the excimer lamp and the positive electrode plate 10, but the electric current is alternating current, and therefore electrolysis of the hydrochloric acid aqueous solution and water does not occur. Thus, the amount of hydrochloric acid produced is not affected. Further, air bubbles are not generated between the electrodes, and therefore the excitation efficiency of the excimer lamp is not affected. The hydrochloric acid produced here is recovered through an inorganic acid recovery opening 36 and oxygen is recovered through the produced gas recovery pipe 33. Here, the water-repellent porous fluororesin membrane 1 and the first and second multiple isolation membranes 65 and 66 are of the same pore diameter (φ-3 μm), the water-resistant pressures of the first, second and third electrolyte cells 30, 31 and 32 are of the same pressure. Therefore, the potential head pressures of the water supply source 49 and the saline supply source 48 are at the same height (h1) for the pressurization to cause electrolysis, and also with the photochemical reaction by the excimer, hydrochloric acid is produced. Note that when charging/discharging, the water and the electrolyte aqueous solution accommodated in the respective electrolyte cells 30, 31 and 32 are pressurized up to the water-resistant pressure to inject the water and electrolyte aqueous solution into the water-repellent porous fluororesin membrane 1 and the multiple isolation membranes 65 and 66, respectively, to make them into conductors. When storing the charge, the pressurization on the water and the electrolyte aqueous solution is released, and thus the gas returns to the water-repellent porous fluororesin membrane 1 and the multiple isolation membranes 65 and 66, to make them into insulators.

A tenth form of the present disclosure relates to a water electrolyzer which employs a multiple isolation membrane. With this electrolyzer, water can be electrolyzed under such an environment that a hydraulic pressure equivalent to the water-resistant pressure can be obtained economically and at room temperature, to produce hydrogen and oxygen. Here, the environment equivalent to the water-resistant pressure means that water is directly supplied to the hydrogen generator which is put under the potential head under the water surface of, for example, a lake, sea or a pool, or the generator is directly connected to a tap of the water supply to feed water by utilizing the water pressure, or water is fed from a water tub installed at a height where the potential head is obtained. Here, the expression "at room temperature" concerns with the electrolyte aqueous solution 5 being prepared from a sulfuric acid aqueous solution. In general, caustic soda is used as the conducting agent for the electrolysis of water, but at room temperature (normal temperature), the saturation solubility and electric conductivity are both low. Under these circumstances, the liquid temperature is set to around 80° C. to increase the saturation solubility, and thus the electric conductivity is raised. However, the solubility and electric conductivity of sulfuric acid at room temperature are both higher, it can be used under the water surface of a lake, sea or a pool without having to heat the electrolytic solution. Further, the feature of the present disclosure is that the electrolyte cells each comprise three windows each made from a water-repellent porous fluororesin membrane therearound, and the electrolyte aqueous solution inside each electrolyte cell is completely isolated from the positive electrode plate, negative electrode plate or the other aqueous solutions.

Figure 11:
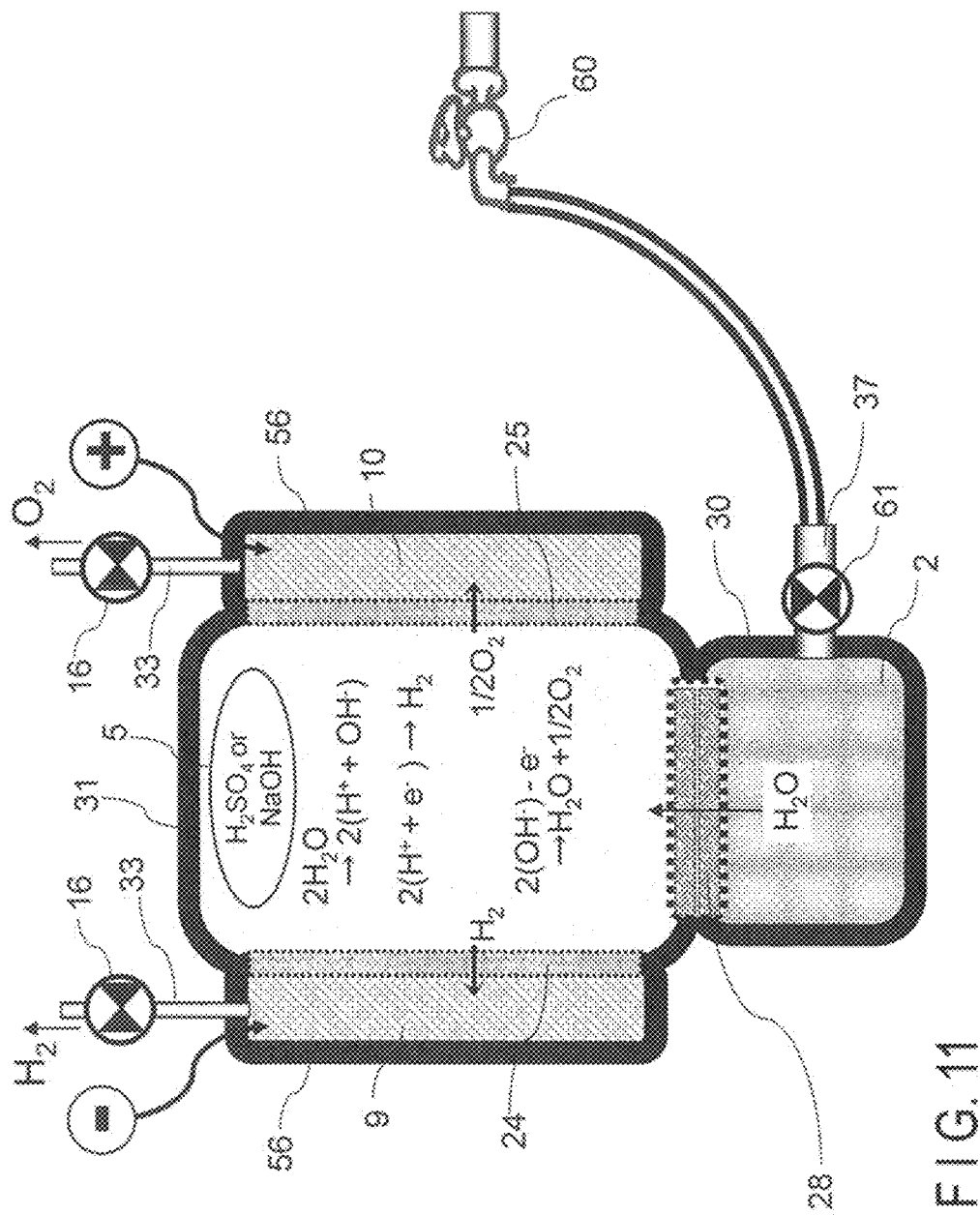
FIG. 11 shows a water electrolyzer which employs the multiple isolation membrane.

FIG. 11 is a schematic diagram showing a water electrolyzer. This device comprises a first electrolyte cell 30 and a second electrolyte cell 31, both in a closed state and arranged to be adjacent to each other. The first and second electrolyte cells 30 and 31 are isolated by a multiple isolation membrane 28. The second electrolyte cell 31 and a produced gas recovery chamber 56 on the side of a negative electrode plate 9 are adjacent to each other, and isolated by a third water-repellent porous fluororesin membrane 24. The second electrolyte cell 31 and a produced gas recovery chamber 56 on the side of a positive electrode plate 10 are adjacent to each other, and isolated by a fourth water-repellent porous fluororesin membrane 25. The produced gas recovery chamber 56 of the negative electrode plate 9, the second electrolyte cell 31 and the produced gas recovery chamber 56 on the side of the positive electrode plate 10 are connected in series. The first electrolyte cell 30 contains water or sea water, which is the first electrolyte aqueous solution 2. The second electrolyte cell 31 contains an about 30%-diluted sulfuric acid aqueous solution, which is the second electrolyte aqueous solution 5. That is, the negative electrode plate 9 and the second electrolyte aqueous solution 5 are isolated from each other by a third water-repellent porous fluororesin membrane 24. The positive electrode plate 10 and the second electrolyte aqueous solution 5 are isolated from each other by a fourth water-repellent porous fluororesin membrane 25. The first electrolyte aqueous solution 2 and the second electrolyte aqueous solution 5 are isolated from each other by a multiple isolation membrane 28. In each produced gas recovery chamber 56, the negative electrode plate 9 and the positive electrode plate 10, which are of a mesh texture and gas permeable, are accommodated.

Here, if an open/close window or open/close valve 61 of the first electrolyte cell 30 is opened and a hydraulic pressure of twice or higher than the water resistance is obtained from the hydraulic pressure supply source (under the water surface of a lake or sea, a water supply system, a reservoir at the head position) 60, the first and second electrolyte aqueous solutions 2 and 5 are injected into the multiple isolation membrane 28 and each of the water-repellent porous fluororesin membrane 24 and 25, to become conductors. In the state, if a voltage higher than the water electrolyzing voltage is applied between the negative electrode plate 9 and the positive electrode plate 10, the electrolysis of the second electrolyte aqueous solution 5 starts. The hydrogen generated with the negative electrode plate 9 is collected from the produced gas recovery pipe 33 without generating air bubbles. Similarly, the oxygen generated with the positive electrode plate 10 is collected from the produced gas recovery pipe 33 without generating air bubbles. If the open/close window or open/close valve 61 provided in the first electrolyte cell 30 is closed, the water supply to the second electrolyte cell 31 from the multiple isolation membrane 28 is stopped. When the third and fourth water-repellent porous fluororesin membranes 24 and 25 are at below water-resistant pressure, the gas returns to the multiple isolation membrane 28 and each of the water-repellent porous fluororesin membranes 24 and 25, to become insulators, and thus the electrolysis stops. Here, if the open/close window or open/close valve 61 of the first electrolyte cell 30 is opened, the electrolysis starts again.

An eleventh form of the present disclosure relates to an electrolyzer which produces metallic sodium from saline. The feature of the present disclosure is that metallic sodium is collected in oil by electrolyzing an aqueous solution with use of a multiple isolation membrane. Since metallic sodium is heavier than the specific gravity of oil, metallic sodium can be recovered in a lower layer portion of the oil. Therefore, unlike refining of metallic sodium by the conventional electrolysis of fused salt, metallic sodium can be produced by electrolysis of an aqueous solution at a temperature of 100° C. or lower without contacting the atmosphere, and thus it is safe.

Figure 12:
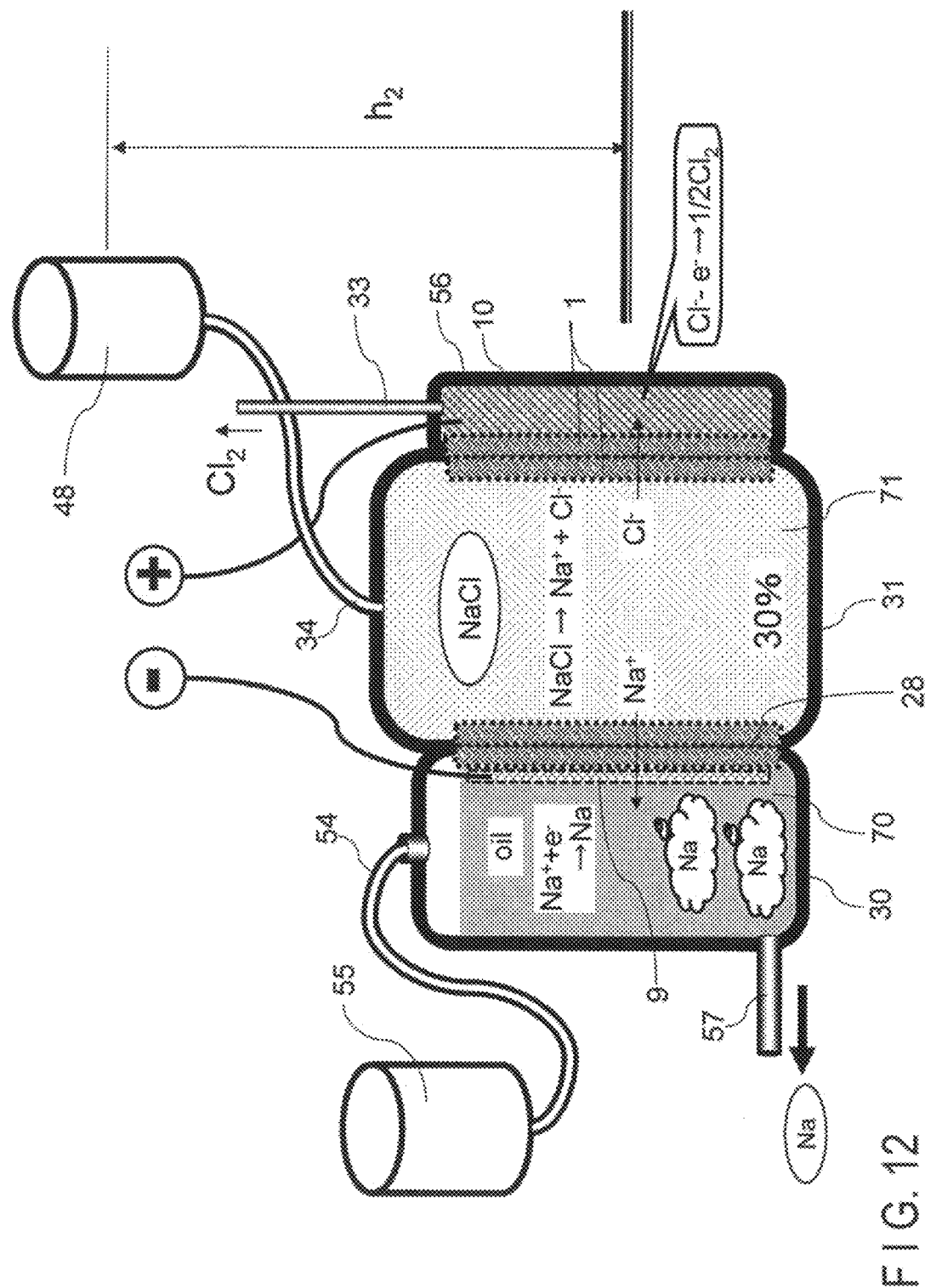
FIG. 12 shows a device of producing metallic sodium in oil by electrolysis of saline using a multiple isolation membrane.

FIG. 12 is a schematic diagram showing a device of producing metallic sodium by electrolysis of saline. This device comprises a first electrolyte cell 30 and a second electrolyte cell 31, both in closed state and arranged to be adjacent to each other. The first and second electrolyte cells 30 and 31 are isolated from each other by the multiple isolation membrane 28 described above. Adjacent to the second electrolyte cell 31, a produced gas recovery chamber 56 on the side of the positive electrode plate 10 is disposed via third water-repellent porous fluororesin membranes 1 and 1 of a double-layered structure, which are stacked one another. These third water-repellent porous fluororesin membranes 1 and 1 have a plurality of pores communicating with each other. The first electrolyte cell 30, the second electrolyte cell 31 and the produced gas recovery chamber 56 on the side of the positive electrode plate 10 are connected in series. The first electrolyte cell 30 contains an oil 70. The second electrolyte cell 31 contains a saline 71 having a concentration of about 30%. That is, the oil 70 in the first electrolyte cell 30 and the saline (30%) 71 in the second electrolyte cell 31 are isolated from each other by the multiple isolation membrane 28. The saline 71 in the second electrolyte cell 31 and the positive electrode plate 10 in the produced gas recovery chamber 56 are isolated from each other by the third water-repellent porous fluororesin membranes 1 and 1 of the double structure. The negative electrode plate 9 is a gas permeable mesh-texture electrode disposed in the oil 70 so as to be in tight contact with the multiple isolation membrane 28 of the first electrolyte cell 30. In order to locate the mesh texture electrode in an interface between the oil 70 and the saline 71, the interface of the saline 71 and the oil 70 is coincided with a contact surface between the multiple isolation membrane 28 and the oil 70 (the interface between the saline and the oil must not be formed inside the multiple isolation membrane 28). Thus, the oil 70 of the first electrolyte cell 30 is not pressurized, but only the saline 71 is pressurized to form the interface between the saline and the oil in the contact surface with the oil 70 of the multiple isolation membrane 28. On the other hand, a gas-permeable porous carbon electrode is used for the positive electrode plate 10 since the gas to be generated with the positive electrode plate 10 is chlorine. Here, the reason for using the third water-repellent porous fluororesin membranes 1 and 1 of the double structure is to equalize with the multiple isolation membrane 28 in terms of the water-resistant pressure (except for the case where a water-repellent porous fluororesin membrane having a water-resistant pressure equivalent to that of the multiple isolation membrane 28 by itself is used).

In the electrolysis by this device, the first electrolyte cell 30 containing the oil 70 is not pressurized, but only the saline (30%) 71 is pressurized at a pressure twice of the water-resistant pressure of the first water-repellent porous fluororesin membrane. Thus, no water head is given to the oil supply cell 55, and there is no pressure difference between the oil 70 of the first electrolyte cell 30 and the oil supply cell 55. On the other hand, in order to pressurize the saline 71 in the second electrolyte cell 31 up to a pressure of twice of the water-resistant pressure, a high potential head h2 is given to the saline supply source 48. When the saline 71 in the second electrolyte cell 31 is pressurized at a pressure of twice of the water-resistant pressure, the saline 71 is injected into the multiple isolation membrane 28 and the third water-repellent porous fluororesin membranes 1 and 1 of the double structure, and thus the membranes become conductive. In this state, when a voltage for the electrolysis of salt is applied between the positive electrode plate 10 and the negative electrode plate 9, metallic sodium is deposited on the lower layer portion of the oil 70 in the first electrolyte cell 30. Thus generated metallic sodium is collected from a metallic sodium recovery opening 57 connected to the lower layer portion of the first electrolyte cell 30. On the other hand, gaseous chlorine is collected from a produced gas recovery pipe 33 of the produced gas recovery chamber 56 on the side of the positive electrode plate 10. Note that if the pressurization on the second electrolyte cell 31 becomes below the water-resistant pressure, the gas returns to the multiple isolation membrane 28 and the third water-repellent porous fluororesin membranes 1 and 1 of the double structure, and they become insulators, thereby stopping the electrolysis.

Figure 13:
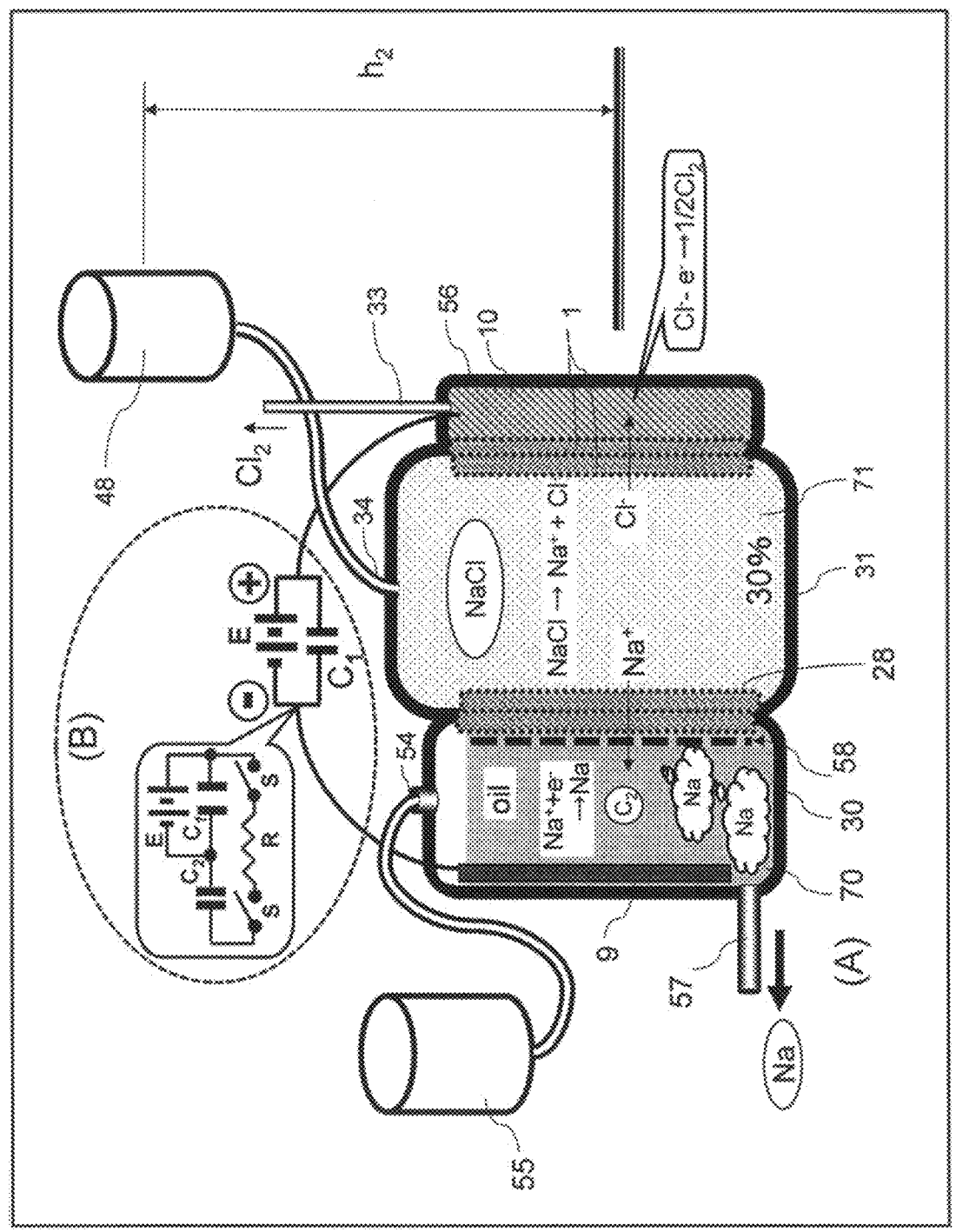
FIG. 13 shows a device of producing metallic sodium in oil by electrolysis of saline using a multiple isolation membrane.

In the electrolyzer shown in FIG. 12, the mesh-structure negative electrode plate 9 installed in tight contact with the multiple isolation membrane 28 of the first electrolyte cell 30 is thick, and therefore the border between the oil and water is comparatively thick. Here, the border needs to be as thin as possible. Here, as in the electrolyzer shown in FIG. 13, part (A), the interface between the water and oil near the surface of the multiple isolation membrane 28 can be regarded as a virtual negative electrode plate 58 (an electrode which does not exist in reality). The oil 70 has a density of 0.8 g/cm3, which is lower than that of water or metallic sodium (0.98). Moreover, the oil 70 can function as a dielectric. As shown in FIG. 13, part (A), a solid negative electrode plate (copper plate) 9 may be disposed on or apart from an inner wall of the first electrolyte cell 30, which opposes the multiple isolation membrane 28. If a DC power source coupled with a capacitor (C1) is connected in parallel between the negative electrode plate 9 and the gas-permeable electrode plate 10 in the produced gas recovery chamber 56 in this state, the charge on the capacitor (C1) is transferred to a capacitor (C2) (equivalent circuit of FIG. 12, part (B)). This capacitor (C2) is the oil 70 between the solid negative electrode plate 9 in the first electrolyte cell 30 and the virtual negative electrode plate 58. Where the capacitor (C2) is charged, a potential difference is created between the virtual negative electrode plate 58 and the positive electrode plate 10 and thus the saline 71 in the second electrolyte cell 31 can be electrolyzed. Thus generated metallic sodium is collected from the metallic sodium recovery opening 57 connected to the lower layer portion of the first electrolyte cell 30. On the other hand, gaseous chlorine is collected from the produced gas recovery pipe 33 of the produced gas recovery chamber 56 on the side of the positive electrode plate 10. The electrolyzer shown in FIG. 13, part (A), as well, functions as the electrolyzer shown in FIG. 12, to produce metallic sodium.

An eleventh form of the present disclosure relates to an electrolyzer which produces metallic sodium from sodium hydroxide. The saturation solubility of saline is 30%, whereas the saturation solubility of sodium hydroxide is 55% at a room temperature and 80% at 80° C. Therefore, as compared to the electrolysis of saline, the electrolysis of sodium hydroxide can produce metallic sodium at high efficiency. The electrolyzer shown in FIG. 14 contains a sodium hydroxide aqueous solution 72 in place of the saline 71 as the electrolyte aqueous solution contained in the second electrolyte cell 31 as compared to the electrolyzer shown in FIG. 12. Moreover, the second electrolyte cell 31 is provided with a heat exchange pipe 67 (heating device) for heating the sodium hydroxide aqueous solution 72, within the tub. The other structures are similar to those of the electrolyzer shown in FIG. 12. The heat exchange pipe 67 is employed to raise the saturation solubility of the sodium hydroxide aqueous solution 72 by heating it, thus increasing the amount of recovery of metallic sodium. Warm water is circulated in the heat exchange pipe 67 to heat the sodium hydroxide aqueous solution to about 80° C. The electrolyzer shown in FIG. 14 as well, similarly functions as the electrolyzer illustrated in FIG. 12, to produce metallic sodium at higher efficiency.

Figure 14:
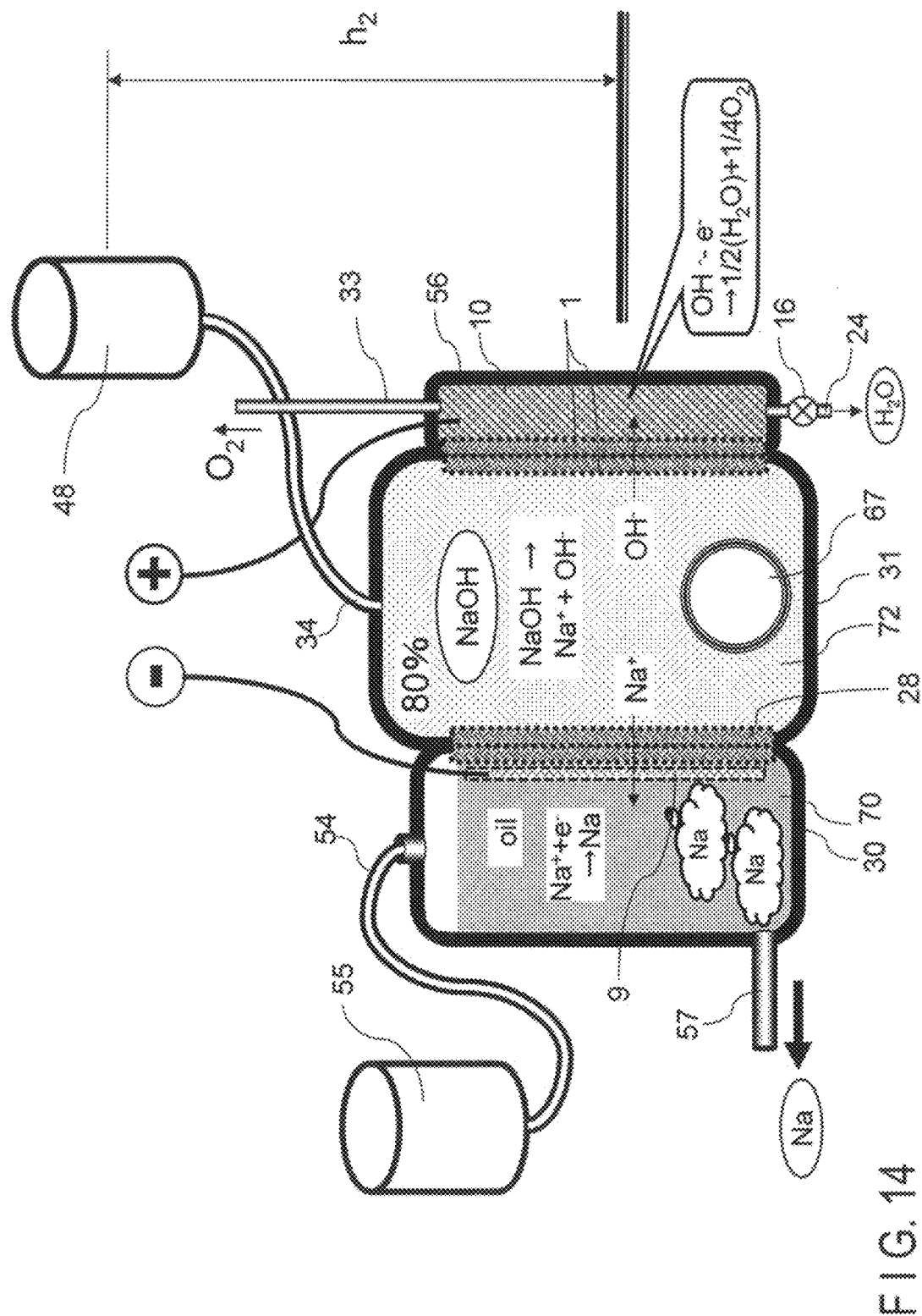
FIG. 14 shows a device of producing metallic sodium in oil by electrolysis of a sodium hydroxide aqueous solution using a multiple isolation membrane.
Figure 15:
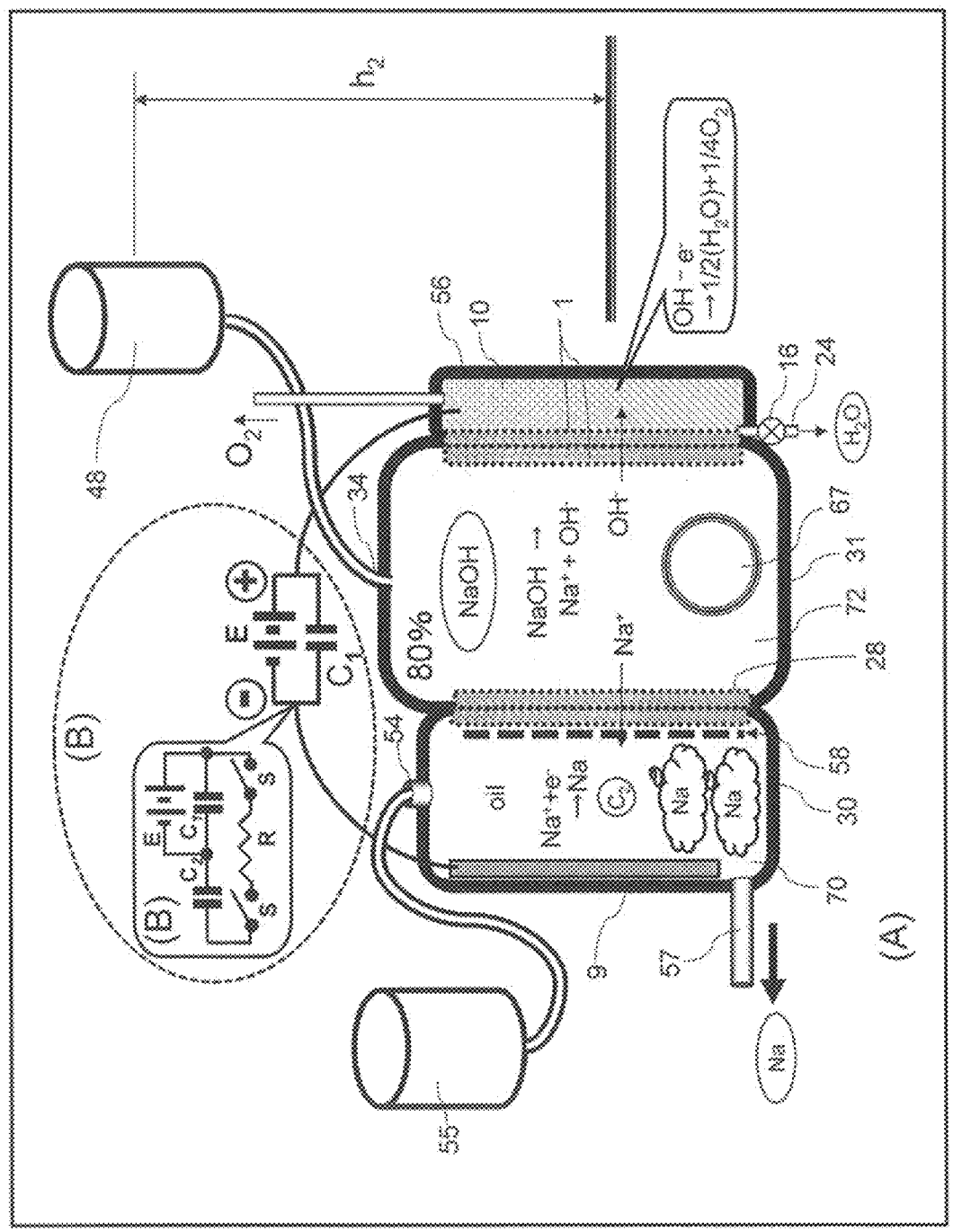
FIG. 15 shows a device of producing metallic sodium in oil by electrolysis of a sodium hydroxide aqueous solution using a multiple isolation membrane.

The electrolyzer shown in FIG. 14 may be configured to comprise a virtual negative electrode plate 58 as in the case of the electrolyzer shown in FIG. 13, part (A). That is, as shown in FIG. 15, part (A), a solid negative electrode plate (copper plate) 9 is disposed on or to be apart from an inner wall of the first electrolyte cell 30, which opposes the multiple isolation membrane 28. In this state, a DC power source coupled with a capacitor (C1) may be connected in parallel between the negative electrode plate 9 and the gas-permeable electrode plate 10 in the produced gas recovery chamber 56, to form an interface between oil and water in the vicinity of the surface of the multiple isolation membrane 28 as the virtual negative electrode plate 58. The electrolyzer shown in FIG. 15, part (A) as well similarly functions as the electrolyzer illustrated in FIG. 13, part (A) to produce metallic sodium at high efficiency.

A twelfth form of the present disclosure relates to a secondary battery of large capacity charge and long-term discharge or an electrolytic method for large capacity deposit, by controlling the electrolytic solubility and temperature of the electrolyte. As shown in FIG. 16, many of nitrates, sulfates and chlorides of base metal elements exhibit high saturation solubilities at high temperatures. In general, if the saturation solubility of the electrolyte aqueous solution is raised on a feeding side of material for the electrolytic product in the electrolysis, or on the side of supplying metal to the negative electrode plate in the charging of the battery, the amount of the positive ion sent to the negative electrode plate can be increased. On the other hand, the saturation solubility is lowered on the producing side of the electrolytic product in the electrolysis, or on the side of the salt formed as positive ion combines with negative ion in the electrolyte in the discharging of the battery, to lower the concentration of the salt product, or water is added to lower the salt concentration. Thus, the amount of positive ion is increased, making it possible to achieve large current discharging, and the amount of product on the negative electrode can be increased in the electrolysis. For example, in the battery, if Al(OH)3, Mg(OH)2, Ca(OH)2, or the like precipitates in the electrolyte aqueous solution, the secondary battery is disabled to be used, and further if an acid is added to dissolve the salt, side reactions are induced. That is, it is desirable that the saturation solubility of the electrolyte aqueous solution on the side where positive ions are given to the reaction system should be high, and the saturation solubility of the electrolyte aqueous solution on the side where positive ions are received should be lower.

As shown in FIG. 16 listing the solubilities of hydroxides, nitrates, sulfates, chlorides and sulfides of base metals, very few salts dissolvable to 100 g of a saturated solution exhibit temperature dependency, but in many salts, the temperature dependency is low at low temperature and high at high temperature. Especially, KNO3 exhibits low as 11% at 0° C., but 71% at 100° C., and thus the temperature gradient of the solubility curve is steep. In general, the temperature gradients of base metal salts are steep, and the solubilities of chlorides and sulfates of base metals are high as compared to those of hydroxide salts of aluminum or magnesium. The solubilities of base metal nitrates are low at low temperature, and high at high temperature, and therefore they are optimal materials for the electrolyte for batteries. By utilizing the characteristics of the salts, when the gradient of the solubility curve of an electrolyte aqueous solution is 0.1 to 1.5%/° C. in a range of 0 to 100° C., the electrolyte aqueous solution on the side where the reaction system gives positive ions to the other reaction system is heated. Or the electrolyte aqueous solution on the side which positive ions are received is cooled by a cooling device or diluted with water. The heating and cooling are carried out simultaneously or only one of these is carried out. Here, even if the electrolyte aqueous solution is saline, which is indispensable in production of sodium hydroxide or metallic sodium, it is important to heat the saline in the electrolysis since the electric conductivity can be improved if the aqueous solution is heated.

A fourteenth form of the present disclosure relates to a method of integrating the above-described multiple isolation membranes by heat seal of fluororesins. As to a closed electrolytic tub including the above-described multiple isolation membranes, a plurality of water-repellent porous fluororesin membranes need to be stacked on one another and the circumference thereof be closed, to form a multiple envelope-shaped sealed bag. But, adhesion of fluororesin is difficult and heat sealing is the simplest way. The melting point of the fluororesin is about 300° C., and also adhesive strength becomes weak if a sealing portion contains air. The water-repellent porous fluororesin membrane contain air in its pores, the air impedes the heat sealing. Therefore, it is difficult to find adhesion conditions in electric heating in the air. Under these circumstances, a heat-sealed material is sandwiched between synthetic quartz glass plates or infrared-transmissive plates, and the heat-sealed material is suctioned to a vacuum. Thus, the air in the water-repellent porous fluororesin membrane is also suctioned and also the synthetic quartz glass plates or infrared-transmissive plates are pressed by the atmospheric pressure. Therefore, the air is cut off, and as irradiated with an infrared radiation under pressurization, the heat sealing can be carried out.

First, when the frame-like gasket of the multiple isolation membrane is formed of fluororesin, a multilayer body having a structure in which the gasket is sandwiched between two water-repellent porous fluororesin membranes, or a multilayer body of two water-repellent porous fluororesin membranes for manufacturing a water pillow type (envelope type) electrolyte aqueous solution sealed bag, is prepared. Next, this multilayer body is sandwiched between two plates at least one of which is infrared-transmissive, and in-betweens of the two plates and the multilayer body are made into the vacuum. Then, an infrared radiation is irradiated from the surface of the infrared transmissive plate under atmospheric pressure. When the fluororesin-made gasket and the two water-repellent porous fluororesin membranes sandwiching the gasket are heat-sealed with each other by the periphery portions in the vicinity of the outer edge, a bag of the multiple isolation membrane or of a plurality of water-repellent porous fluororesin membranes stacked on one another can be produced.

Note that if infrared laser light or sunlight is condensed and applied from the surface of synthetic quartz glass, heat sealing can be completed above 300° C. The laser is a YAG laser, slab laser, glass laser, fiber laser, condensed beam of an infrared lamp or sunlight, or carbon-dioxide-laser light condensed to a spot, and thus the heat sealing is carried out by infrared heating. Note that in the case of carbon dioxide laser, the infrared transmissive plate is a zinc selenide plate.

EXAMPLES

Effective forms of the present disclosure will now be described in detail based on FIGS. 1 to 23.

FIG. 1 shows a water-resistant pressure measuring device of the water-repellent porous fluororesin membrane, which is the basis of the present disclosure regarding the first to fourteenth forms. Fluororesin-made water-repellent porous fluororesin membranes having pore diameters of 1, 3 and 10 μm, respectively, are each sandwiched between glass containers along an up-and-down direction and an electrolyte aqueous solution of similar saturation solubility at room temperature were supplied in the upper and lower containers. The same hydraulic pressure is applied to both the electrolyte aqueous solutions, and the pressure where voltage abruptly becomes ∞ is measured with a Kohlrausch bridge, to be defined as the water-resistant pressure. The electrolyte aqueous solutions are of an aqueous solution of $Ca(NO_3)_2$, NaOH, $Cu(NO_3)_2$, $KNO_3$, $LiNO_3$, KOH, $NaNO_3$, $CaCl_2$, $Al(NO_3)_3$, $Mg(NO_3)_2$, $CuCl_2$, KF, LiCl, $MgCl_2$, $Ba(OH)_2$, $AlCl_3$, $Al_2(SO_4)_3$, $Na_2S$, $CuSO_4$, $BaCl_2$, KCl, $MgSO_4$, $Na_2SO_4$, NaCl, BaS, $Ba(NO_3)_2$, LiOH, $Ca(OH)_2$, $Al(OH)_3$, $Mg(OH)_2$, $Ca(OH)_2$, sulfuric acid, hydrochloric acid or nitric acid.

FIG. 21 illustrates measurement of a water-repellent porous fluororesin membrane having a thickness of 100 μm and a pore diameter (1, 3 or 10 μm) in the water-resistant pressure to the solubility of aluminum chloride (0 to 30%). In the case of the pore diameter of 1 μm (NTF-1131 of NITTO DENKO), for fresh water (solubility of 0%): 0.13 MPa (mega Pascal), and for a solubility of 10% or more: 0.12 MPa. In the case of the pore diameter of 3 μm (NTF-1133 of NITTO DENKO), for fresh water (solubility of 0%): 0.04 MPa, and for a solubility of 10% or more: 0.03 MPa. In the case of the pore diameter of 10 μm, for fresh water (solubility of 0%): 0.01 MPa, and for 10% or more: 0.05 MPa. Therefore, in each of these forms, the water-repellent porous fluororesin membrane with a pore diameter of 3 μm (NTF-1133 of NITTO DENKO), the water resistant pressure of which is 1 atmosphere (0.1 MPa) or less, was adopted.

The dimensions of the water-repellent porous fluororesin membrane used as a sample are: a pore diameter of 3 μm, a thickness of 100 μm and S=3.14 cm2. The gas release valve 16 of the water-resistant pressure measuring device shown in FIG. 1 was closed to form a compressed gas layer 17 (dielectric 8) in a central portion of the water-repellent porous fluororesin membrane 1 as shown in FIG. 1, part (d) in (A). The first and second electrolyte aqueous solutions 2 and 5 to be pressed into the sample were both 5%-saline, and liquid pressure devices 4 and 7 of the first and second electrolyte aqueous solutions were pressurized at the same hydraulic pressure. When not pressured, the electrostatic capacitance was 12 pF, but when pressurized by a pressure of three times the water-resistant pressure, the electrostatic capacitance was 1.15 μF.

Carbon electrodes having a diameter of 5 mm were inserted to the glass containers with an interval of 10 mm, and the electric resistance in a range of 0 to 100° C. was measured with use of a Whiston bridge circuit in which the capacitor is changed to a resistance, for electrostatic capacitance measurement shown in FIG. 1 while observing the point where 1000 Hz AC is set to 0V with a synchroscope, and thus the conductivity of each of $Ca(NO_3)_2$, NaOH, $Cu(NO_3)_2$, $KNO_3$, $LiNO_3$, KOH, $NaNO_3$, $CaCl_2$, $Al(NO_3)_3$, $Mg(NO_3)_2$, $CuCl_2$, KF, LiCl, $MgCl_2$, $Ba(OH)_2$, $AlCl_3$, $Al_2(SO_4)_3$, $Na_2S$, $CuSO_4$, $BaCl_2$, KCl, $MgSO_4$, $Na_2SO_4$, NaCl, BaS, $Ba(NO_3)_2$, LiOH, $Ca(OH)_2$, $Al(OH)_3$, $Mg(OH)_2$, $Ca(OH)_2$, sulfuric acid, hydrochloric acid, nitric acid and the like was measured.

FIG. 22 shows the electric conductivity (S/cm) of each of salt, sodium hydroxide, sulfuric acid and hydrochloric acid at a liquid temperature of 30° C. In the present disclosure, important raw materials in electrolysis of saline to deposit sodium hydroxide and metallic sodium, salt, sodium hydroxide and hydrochloric acid were used as a conducting agent to produce hydrogen, sodium hydroxide and hydrochloric acid, and hydrochloric acid with respect to the surface electrode of the excimer lamp, and sodium hydroxide or sulfuric acid was used for producing hydrogen and oxygen by electrolysis of water. As the conducting agent of the electrolyte aqueous solution, hydrochloric acid exhibited the highest conductivity, 0.47 S/cm at a concentration of 20%; sulfuric acid: 0.41 S/cm at 30%; salt: 0.24 S/cm at 30% and sodium hydroxide: 0.2 S/cm at 10%.

FIG. 16 shows measurement results of the solubility of each of hydroxides, nitrates, sulfates and chlorides of base metals. Glass beakers around which heaters were wound to heat the electrolyte aqueous solutions were used, in which aqueous solutions of $Ca(NO_3)_2$, NaOH, $Cu(NO_3)_2$, $KNO_3$, $LiNO_3$, KOH, $NaNO_3$, $CaCl_2$, $Al(NO_3)_3$, $Mg(NO_3)_2$, $CuCl_2$, KF, LiCl, $MgCl_2$, $Ba(OH)_2$, $AlCl_3$, $Al_2(SO_4)_3$, $Na_2S$, $CuSO_4$, $BaCl_2$, KCl, $MgSO_4$, $Na_2SO_4$, NaCl, BaS, $Ba(NO_3)_2$, LiOH, $Ca(OH)_2$, $Al(OH)_3$, $Mg(OH)_2$, $Ca(OH)_2$, sulfuric acid, hydrochloric acid, nitric acid and the like were fed at various concentrations. The beakers containing the electrolyte aqueous solutions were exposed to helium-Ne laser beam entering there to measure the diffused light by the laser beam and the measurement was carried out in a range of 0 to 100° C. with the point where the diffused light increases taken as the saturation solubility.

FIG. 23 shows measurement results of the solubility of nitrates, sulfates and chlorides of Al, Mg, Pb and Cu in electrolyte aqueous solutions used for Al/Cu, Mg/Cu and Pb/Cu batteries. Glass beakers around which heaters were wound to heat the electrolyte aqueous solutions were used, in which aqueous solutions of $Cu(NO_3)_2$, $Al(NO_3)_3$, $Mg(NO_3)_2$, $CuCl_2$, $MgCl_2$, $AlCl_3$, $Al_2(SO_4)_3$, $CuSO_4$, $MgSO_4$, $Pb(NO_3)_2$, $PbCl_2$ and the like were fed at various concentrations. The beakers containing the electrolyte aqueous solutions were exposed to helium-Ne laser beam entering there to measure the diffused light by the laser beam and the measurement was carried out in a range of 0 to 100° C. with the point where the diffused light increases taken as the saturation solubility.

FIG. 5 shows an Al/Cu secondary battery. As to the material for the negative electrode plate, the discharge capacity per weight was: −4.98 Wh/g for Al whereas −11.73 Wh/g for Li and thus lithium is 2.35 times higher. But, the discharge capacity per mass was: −13.44 Wh/cm2 for Al, whereas −5.87 Wh/cm2 for Li, and thus aluminum is 2.28 times higher than lithium. In view of the amount of resources, the annual production of aluminum is 234 Mtons (megaton), whereas that of lithium is 0.036 Mtons, and thus aluminum is 6,500 times more. For the positive electrode, it is simpler to use metal than using air or oxygen. Therefore, in the Al/Cu secondary battery shown in FIG. 5, copper was used as the positive electrode plate. However, if copper is used as a positive electrode plate, copper ion ($Cu^{2+}$) dissolves into the electrolyte aqueous solution while charging and deposits on the aluminum surface of the negative electrode plate to form a local battery, and thus a secondary battery cannot be formed. Therefore, a layer of copper chloride was applied on the copper surface of the positive electrode plate, and thus an $Al/CuCl_2$ battery in place of an Al/Cu battery was formed. The reason for adopting aluminum chloride ($AlCl_3$) as the electrolyte aqueous solution is that the solubility of aluminum chloride is not substantially temperature-dependent. During charging, when the saturation solubility of the aluminum chloride aqueous solution exceeds 30%, recrystallization starts and precipitates. When discharging, the precipitates supply the electrolyte to the electrolyte aqueous solution, long-term discharge can be achieved. The negative electrode plate 9 and the positive electrode plate 10 each comprise pinholes 15, and therefore if the electrolyte aqueous solution 13 is pressurized, the air in the water-repellent porous fluororesin membranes 22 and 23 is pushed out from the pinholes 15. As a result, the inside of the pores of the water-repellent porous fluororesin membranes are filled with the electrolyte aqueous solution, and thus the membranes become conductors. When the pressurization on the electrolyte aqueous solution 13 is released, the gas returns from the pinholes 15 of the electrode plates 9 and 10 into the pores of the water-repellent porous fluororesin membranes, which become then insulators. A secondary battery which uses the air "expelling and drawing-back" phenomenon as an "ion ON/OFF surface switch" has been developed. In this secondary battery, the electrolyte aqueous solution is pressurized only when charging/discharging, and the pressurization on the electrolyte aqueous solution is released while storing charge; therefore no side reactions occur, or little internal resistance is generated. When an Al/Cu secondary battery containing 80 cc of the electrolyte aqueous solution was prepared as a sample and charged at 15 A for 2 hours, an electromotive force of 2V was obtained and discharge of electric current of 1 A for about 30 hours was achieved. The sample battery was placed in a stored state by releasing the pressurization on the electrolyte aqueous solution and let stand for 1,000 hours, but the decrease in discharge capacity was not observed.

FIG. 6 shows an improvement of the Daniel battery. In the Daniel battery, two kinds of electrolyte aqueous solutions are isolated from each other by a clay plate, and therefore the battery is suitable for discharge. However, in the Daniel battery, copper ion ($Cu^{2+}$) of the electrolyte aqueous solution on the side of the positive electrode plate passes through the clay plate along with time, and the two kinds of electrolyte aqueous solutions are mixed. Note that even if metallic aluminum used as the negative electrode plate is inserted to an aluminum chloride aqueous solution, which is the electrolyte aqueous solution by the side of the negative electrode plate, aluminum does not substantially elute therefrom. On the other hand, shortly after inserting the metallic copper used as the positive electrode plate to the copper chloride aqueous solution, which is the electrolyte aqueous solution on the side of the positive electrode plate, copper elutes immediately.

Under these circumstances, in the present disclosure, both of the electrode plates are isolated from the electrolyte aqueous solutions with water-repellent porous fluororesin membranes, and the both electrode plates are made to be brought into contact with the electrolyte aqueous solutions, respectively only when charging/discharging. Further, if a clay plate is used as an isolation membrane, the copper ion ($Cu^{2+}$) eluting from the positive electrode when charging passes through the clay plate, and deposits on the negative electrode plate (Al), to form a local battery and stop the function of the secondary battery. Here, the two kinds of electrolyte aqueous solutions contain the same negative ion, a negative ion exchange membrane was mounted in place of the clay plate.

As shown in FIG. 6, part (A), when charging, electrons are supplied to $aluminum^{3+}$ ions from the negative electrode plate on the negative electrode plate side, to become metal aluminum, which deposits on the Al plate of the negative electrode plate. On the other hand, in the positive electrode plate side, electron was taken from Cu to become $Cu^{2+}$ ion, and dissolves into the first electrolyte aqueous solution 2. Here, in the second electrolyte aqueous solution 5 on the side of the negative electrode plate, the $aluminum^{3+}$ ion decreases, and excessive Cl− ion thus resulted passes through the negative ion exchange membrane 46 to move to the low-ion-concentration second electrolyte aqueous solution 5 on the side of the positive electrode plate. This Cl− ion bonds to $Cu^{2+}$ ion in the second electrolyte aqueous solution 5 to form $CuCl_2$, thereby increasing the concentration of the second electrolyte aqueous solution 5. On the other hand, when the concentration of the $AlCl_3$ aqueous solution on the side of the negative electrode plate lowers, the pressurization up to the water-resistant pressure on each of the electrolyte aqueous solutions 2 and 5 is released, to finish the charging. When the pressurization on each of the electrolyte aqueous solutions 2 and 5 is released, the secondary battery is placed in the charge storage state. In the secondary battery of the charge storage state, no chemical reactions occur, and the charge storage state is maintained until the pressurization on each of the electrolyte aqueous solution 2 and 5 at the water-resistant pressure is started.

As shown in FIG. 6, part (B), subsequently, each of the electrolyte aqueous solutions 2 and 5 is pressurized at the water-resistant pressure, the discharging of the secondary battery is started. When discharging, aluminum of the negative electrode becomes $aluminum^{3+}$ ion, and elutes into the water in the first electrolyte aqueous solution 2. The generated electron is sent to the positive electrode plate through the load (electric bulb) 42. On the other hand, the $Cu^{2+}$ ion in the second electrolyte aqueous solution 5 on the side of the positive electrode plate receives electron from the positive electrode plate, and deposits as metal Cu on the Cu electrode plate. Here, the $Cu^{2+}$ ion decreases in the second electrolyte aqueous solution 5 of the positive electrode plate 10, and excessive Cl− ion thus resulting moves to the low-ion-concentration first electrolyte aqueous solution 2 on the side of the negative electrode plate 9. Here, Cl− ion bonds to $Al^{3+}$ ion to form $AlCl_3$, and thus the concentration of the electrolyte aqueous solution increases. On the other hand, the concentration of the $CuCl_2$ aqueous solution on the side of the positive electrode plate 10 decreases, and the blue color, characteristic to the $Cu^{2+}$ ion of the second electrolyte aqueous solution 5 becomes pale. By identifying the color of the second electrolyte aqueous solution 5, it is possible to determine that may be in an over-discharging state. Here, if the concentration of the $CuCl_2$ aqueous solution on the side of the positive electrode plate decreases, the flow of electrons decreases to stop discharging. The electromotive force of the Al/Cu battery here was 1.85V.

The inside of the closed electrolyte cell having a capacity of 80 cc was partitioned into two of halves by the negative ion exchange membrane 46 inserted therein. The thus partitioned spaces were filled with $AlCl_3$:40 cc and $CuCl_2$:40 cc, respectively, and thus an Al/Cu secondary battery was prepared. When the Al/Cu secondary battery was charged at 15 A for 2 hours, an electromotive force of 1.85V was obtained and discharge of electric current of 1 A for about 24 hours was achieved. The sample battery was placed in the charge storage state by releasing the pressurization on the electrolyte aqueous solution and let stand for 1,000 hours, but the decrease in discharge capacity was not observed.

In order to produce sodium hydroxide by electrolyzing a saline aqueous solution, a membrane method is widely adopted. With this method, sodium chloride is contained in the generated sodium hydroxide. Further, gaseous chlorine is generated on the positive electrode plate. In the electrolyzer according to this form, saline can be electrolyzed at room temperature without using an ion exchange membrane. The feature of this form is that the multiple isolation membrane 28 is provided between the first and second electrolyte cells 30 and 31. When each of the electrolyte cells 30 and 31 is pressurized at the water-resistant pressure and the saline in the second electrolyte cell 31 is electrolyzed, Na+ ion and chloride ion (Cl−) are produced. On the other hand, when the water in the first electrolyte cell 30 is electrolyzed, hydrogen ion (H+) and hydroxide ion (OH−) are produced. Thus the produced Na+ ion is attracted to the negative electrode plate and passes through the multiple isolation membrane 28 to bond to the hydroxide ion (OH−)

in the first electrolyte cell 30, thus producing sodium hydroxide. The produced hydrogen ion (H+) passes through the third water-repellent fluorine isolation membrane, to become hydrogen gas (H2) in the gas-permeable negative electrode plate 9. Here, air bubbles are not generated on the surface of the negative electrode plate 9, and the hydrogen gas (H2) is collected from the produced gas recovery pipe 33.

Similarly, the produced chloride ion (Cl–) passes through the fourth water-repellent porosity fluorine isolation membrane to become gaseous chlorine (Cl2) in the gas-permeable positive electrode plate 10. Here, air bubbles are not generated on the surface of the positive electrode plate 10, and the gaseous chlorine (Cl2) is collected from the produced gas recovery pipe 33. When the second electrolyte cell 31 having an internal volume of 100 cc is filled with 30%-saline, and electrolysis is carried out at 3V and 5 A for 10 hours at room temperature (25° C.) while supplying saline thereto at all times, about 20 g of sodium hydroxide was obtained.

Moreover, 50%-hypochlorous acid (HClO) and 2%-hydrochloric acid were put into a 200 cc beaker, and a carbon cylindrical electrode was inserted therein together with a Xe—Cl excimer lamp placed in its central axis. The Xe—Cl excimer lamp was subjected to radiation for 60 minutes, and about 30%-concentration hydrochloric acid was obtained.

In the first electrolyte cell 30 having an internal volume of 42 cc and the structure shown in FIG. 11, comprising porous carbon electrodes as the negative electrode plate 9 and the positive electrode plate 10, 30%-sulfuric acid was enclosed. The second electrolyte cell 31 was connected to a tap of the water supply to apply a hydraulic pressure higher than the water-resistant pressure, and electrolysis is carried out at 2V and 5 A. Here, the production of hydrogen and oxygen was observed.

A closed electrolyte cell having an internal volume of 10 cc, comprising a produced gas recovery chamber with one surface to which a net electrode was attached, and another surface to which porous charcoal positive electrode plate was attached, both surfaces being isolated from each other by a water-repellent porous fluororesin membrane, was inserted to a central portion of a 100 cc beaker. The beaker was filled with oil, and 30%-saline was pressed into the closed electrolyte cell at the water-resistant pressure and electrolysis was carried out at 3V and 5 A. It was observed that brown metallic sodium deposited in the oil.

To an Al/Cu secondary battery prepared as a sample from acrylate resin, shown in FIG. 7, 30%-aluminum chloride aqueous solution was enclosed as the electrolyte aqueous solution 13 in the closed electrolyte cell 12 having an internal volume of 80 cc. Green optical semiconductor laser (532 nm) 73 used for refractive-index measurement was obliquely made incident, and red optical semiconductor laser (650 nm) 74 for recrystallization observation was perpendicularly irradiated. While maintaining this state, the electrolyte aqueous solution 13 was pressurized at the water-resistant pressure, to start charging at 2V and 10 A. As shown in FIG. 18, at the beginning, the refractive index of the 30%-solubility aluminum chloride was 1.426 (see point (a)). As an electric current is continuously supplied for charging, the solubility and refractive index lower linearly (see point (b)), and 10 hours after, the solubility lowered to 3% and the refractive index to 1.342, then the charging was stopped. Here, when the water-resistant pressure was released, the refractive index did not change at all for 1,000 hours (see point (c)). This indicates that no side reactions occurred in the charge storage state and this battery is free of internal resistance. Here, when once again the electrolyte aqueous solution 13 was pressurized at the water-resistant pressure and the discharging was started at 10 A, the refractive index increased linearly (see point (d)), and 10 hours after, a saturation solubility of 30% and a refractive index of 1.426 were obtained. Then, the discharging was stopped (see point (e)).

In FIG. 18, the transmittance for observing the degree of recrystallization was 23% when the charging started at the beginning (point (f)), but as the charging progresses, the transmittance increased linearly (point (g)) and reached a transmittance of 98% in 2 hours. Then, the transmittance did not change in the charge storage state (point (h)). Subsequently, when discharging, the transmittance was maintained at 98% for a certain period of time (point (i)). The fact that the transmittance was 98% when discharging indicated that the electrolyte aqueous solution was below the saturation solubility and the discharging was proceeding appropriately. When the discharging was continued, the concentration of aluminum chloride in the electrolyte aqueous solution increased to start the recrystallization, and the transmittance of the laser beam decreased. From these results, it was indicated that this secondary battery is an ideal battery free of side reactions or internal resistance. The recrystallization of the electrolyte aqueous solution means that this secondary battery can be charged at large capacity. To explain, even if recrystallization of the electrolyte aqueous solution progresses by discharging, the recrystallization starts while maintaining the concentration of the electrolyte aqueous solution over the saturation solubility, and therefore long-term discharge can be achieved.

FIG. 17 is a diagram illustrating the principal of a prototype Al/Cu battery. This battery comprises a negative electrode plate 9, a positive electrode plate 10, two water-repellent porous fluororesin membranes 1 and a water pillow type electrolyte aqueous solution sealed bag 44. The water pillow type electrolyte aqueous solution sealed bag 44 is sandwiched by the water-repellent porous fluororesin membranes (of fluororesin) 1, and filled with an aluminum chloride aqueous solution. The water pillow type electrolyte aqueous solution sealed bag 44 is sandwiched between the positive electrode plate 10, which is a copper plate on a surface of which copper chloride (CuCl2) crystal 64 is laminated, and the negative electrode plate 9, which is an aluminum plate. The negative electrode plate 9 and the positive electrode plate 10 each comprise pinholes (air-releasing openings or gas capsules) 15 opened therein for "expelling/drawing back" the gas (air) in the water-repellent porous fluororesin membrane 1. Here, the negative electrode plate 9 and the positive electrode plate 10 are compressed by a pressurizing device (grabbing with fingers) 43, and thus voltage is applied from the charging power supply source 45, to start the charging. When charging, the copper chloride (CuCl2) crystal 64 is laminated on the positive electrode plate 10, and metallic aluminum deposits on the negative electrode plate 9. Here, when the pressurizing device (grabbing with fingers) 43 is released, the gas (air) returns to the water-repellent porous fluororesin membranes (fluororesin) 1 through the pinholes (air-releasing openings, gas capsules) 15, and thus the water-repellent porous fluororesin membranes (fluororesin) 1 become insulators. Thus the charge storage state is maintained. Here, when pressurized again by the pressurizing device (grabbing with fingers) 43, the gas (air) in the water-repellent porous fluororesin membranes (fluororesin) 1 is pushed out to the pinholes (air-releasing openings, gas capsules) 15, and thus discharging is started and the load (electric bulb) 42 is lit.

A prototype Al/Cu secondary battery was prepared, with a water pillow type electrolyte aqueous solution sealed bag (envelope type electrolyte pad) 44 to be filled with a capacity of 5 cc of an electrolyte aqueous solution. When the sample battery was charged at 1.5 A for 1 hour, an electromotive force of 2V was obtained and discharging of an electric current of 1 A for about 15 hours was achieved. The sample battery was placed in a charge storage state by releasing the pressurization on the electrolyte aqueous solution and let stand for 1,000 hours, but the decrease in discharge capacity was not observed.

The multiple isolation membrane 28 or the water pillow type electrolyte aqueous solution sealed bag 44 has a structure in which a plurality of porous fluororesin membranes or at least one porous fluororesin membrane and a fluororesin membrane are stacked one on another. In general, it is difficult to join fluororesins together. Under these circumstances, the feature of the present disclosure is a method of laser-welding fluororesins together in a vacuum. First, a bunch of fluororesin in which a plurality of fluororesin membranes are stacked one on another is sandwiched between two synthetic quartz glass plates. Then, the in-between of the two quartz glass plates is suctioned to a vacuum. Here, while the two quartz glass plates were weighted with the atmospheric pressure, the welded portions of the bunch of the plurality of fluororesin membranes are instantaneously heated by a belt-like beam such as of YAG laser or glass laser from the surface of quartz glass. Or the sample sandwiched between the two quartz glass plates is placed on an X-Y stage, a fiber laser or sunlight is condensed into one point, and the stage is scanned in an enclosing shape. Thus, the enclosed portion is heat-welded. Here, a test was carried out with use of a carbon dioxide laser, in which the fluororesin bunch was sandwiched between plates of one quartz glass sheet and one zinc selenide plate being stacked one on another.

FIGS. 19 and 20 show examples of cylinder capacitors instead of sheet capacitors. As shown in FIG. 19, part (A), the electrostatic capacitance Cx of a cylindrical variable capacitor is given by:

$$Cx = \lim 2\pi\varepsilon/\ln b/a = \infty [b-a \to 0, b=a \to b/a=1 \to \ln 1=0].$$

Here, the negative electrode plate 9 was a nickel plate, the positive electrode 10 was a carbon rod, and the electrolyte aqueous solution 2 was 5%-saline. As shown in FIG. 19, part (b), when a hydraulic pressure at the water-resistant pressure or less is applied to the electrolyte aqueous solution 2, the electrolyte aqueous solution 2 injects the water-repellent porous fluororesin membrane 1 from both sides, to form a compressed gas layer 17, thereby achieving a large electrostatic capacitance. The capacitor shown in FIG. 19, part (c) is a group of such capacitors arranged in parallel to further increase the capacitance.

The spiral capacitor shown in FIG. 20, part (c) is formed by rolling with each other two capacitors coupled in parallel to increase to double the electrostatic capacitance as shown in FIG. 20, part (a). The electrostatic capacitance of a capacitance variable capacitor is given by: $C = \varepsilon S/d$, and therefore to expand the area S, a spiral shape was devised. A test was carried out, using nickel sheets as the electrodes and 5%-saline as the electrolyte aqueous solution. The results indicate that when pressurizing the electrolyte aqueous solution of 0.1 MPa (mega Pascal), the electrostatic capacitance is increased.

INDUSTRIAL AVAILABILITY

The petroleum and coal are limited as to reserve-production ratio in years, and they emit carbon dioxide. On the other hand, the nuclear fuel emits radioactivity. In contrast, hydrogen is limitless in reserve-production ratio and does not emit carbon dioxide or radioactivity. It is a clean fuel, which is friendly also to environment. However, hydrogen itself is light, but the container (cylinder) or occluding alloy which stores hydrogen is excessively heavy, which is not suitable to be transported. Especially, recently, the hydrogen fuel cars are popular, but the fuel-battery vehicles which carry a hydrogen-containing cylinder to use hydrogen as the fuel are exactly cars with a power plant. When the power plant should be left to an electric power company and the power should be charged to the battery, the driving mechanism of a car can be a motor only. The aluminum/copper battery of the present disclosure is a secondary battery which uses an inexpensive electrode material, and is light weight, and rechargeable at high-speed and operable safely in long-distance travel at ordinary temperature and pressure. Further, the electrostatic capacitance variable capacitor can contribute to the energy consumption of vehicles as an initial driving power source when starting from standstill.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the present disclosure is merely exemplary in nature and, thus, variations that do not depart from the substance of the present disclosure are intended to be within the scope of the present disclosure. Such variations are not to be regarded as a departure from the spirit and scope of the present disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. An electrochemical reactor comprising:
    an ion ON/OFF surface switch operating as an ionic conductor, which includes a pair of electrodes, an electrolyte aqueous solution present between the pair of electrodes, a water-repellent porous fluororesin membrane disposed such that at least one surface thereof is in contact with the electrolyte aqueous solution and having a plurality of pores communicating to each other, a pressing means configured to pressurize the electrolyte aqueous solution, and a gas reservoir provided in a portion of the water-repellent porous fluororesin membrane or an air-releasing opening provided outside a electrochemical reaction zone of the water-repellent porous fluororesin membrane,
    the ion ON/OFF surface switch being configured such that when the electrolyte aqueous solution is pressurized by the pressing means, the electrolyte aqueous solution is injected into the plurality of pores of the water-repellent porous fluororesin membrane to expel a gas in the pores for substituting with the electrolyte aqueous solution, thereby forming the water-repellent porous fluororesin membrane into an ionic conductor to conduct between the pair of electrodes, whereas when the pressurization is released, the gas of the gas reservoir is spontaneously drawn back or the gas is spontaneously drawn back through the air-releasing opening into the plurality of pores of the water-repellent porous fluororesin membrane, and the electrolyte aqueous solution in the plurality of pores of the water-repellent porous fluororesin membrane is discharge by the gas to restore the water-repellent porous fluororesin membrane as an insulator.

2. An electrochemical reactor with a capacitor function, comprising: an ion ON/OFF surface switch operating as an ionic conductor, which includes a positive electrode plate and a negative electrode plate, an electrolyte aqueous solution present between the positive electrode plate and the negative electrode plate, a water-repellent porous fluororesin membrane disposed such that at least one surface thereof is in contact with the electrolyte aqueous solution and having a plurality of pores communicating to each other, pressing means configured to pressurize the electrolyte aqueous solution, an air-releasing opening provided outside an electrochemical reaction zone of the water-repellent porous fluororesin membrane, and an air-releasing valve provided to take in/out a gas through the air-releasing opening, the ion ON/OFF surface switch being configured such that when the electrolyte aqueous solution is pressurized by the pressing means after closing the air-releasing valve, the electrolyte aqueous solution is partially injected into the plurality of pores of the water-repellent porous fluororesin membrane to form a layer of the ionic conductor parallel to the surface of the water-repellent porous fluororesin membrane, and to form an unpenetrated portion of the electrolyte aqueous solution as a compressed gas layer which is functioned as a dielectric and is parallel to the surface of the water-repellent porous fluororesin membrane, wherein when the electrolyte aqueous solution is once again pressurized at a water-resistant pressure or lower, an electrostatic capacitance variable capacitor which changes a thickness of the compressed gas layer according to a degree of the pressurization is formed, whereas when the pressurization is released, the compressed gas layer is expanded to restore the water-repellent porous fluororesin membrane into a low dielectric compared with the dielectric.

3. The electrochemical reactor of claim 2, wherein the positive electrode plate and the negative electrode plate are arranged to oppose each other, the electrochemical reactor comprises two water-repellent porous fluororesin membranes each identical to the water-repellent porous fluororesin membrane, the water-repellent porous fluororesin membranes are disposed to be in contact with both of a surface of the positive electrode plate and a surface of the negative electrode plate, and form a portion of a closed container which contains the electrolyte aqueous solution, the water-repellent porous fluororesin membranes interleave the electrolyte aqueous solution to form a series capacitor, and the ion ON/OFF surface switch is configured such that when the electrolyte aqueous solution in the closed container is pressurized by the pressing means after closing the air-releasing valve, the electrolyte aqueous solution is partially injected into the plurality of pores in the water-repellent porous fluororesin membranes to form two layers of the ionic conductor parallel to the surface of the water-repellent porous fluororesin membrane, and to form unpenetrated portions of the electrolyte aqueous solution of the water-repellent porous fluororesin membranes, respectively, located both of the positive electrode plate and the negative electrode plate, as the compressed gas layer which is parallel to the surface of the water-repellent porous fluororesin membranes and functions as a ferroelectric, whereas when the pressurization is released, the compressed gas layer is expanded to restore the water-repellent porous fluororesin membrane into an insulator.

4. An electrochemical reactor with a capacitor function, comprising: an ion ON/OFF surface switch, which includes a positive electrode plate and a negative electrode plate are arranged to oppose each other and constitute a portion of a closed container which contains an electrolyte aqueous solution, a water-repellent porous fluororesin membrane disposed liquid-tightly to separate the electrolyte aqueous solution into two chambers in the closed container, thereby forming one capacitor and having a plurality of pores communicating to each other, a pressing means configured to pressurize the electrolyte aqueous solution, an air-releasing opening provided outside an electrochemical reaction zone of the water-repellent porous fluororesin membrane, and an air-releasing valve provided to take in/out a gas through the air-releasing opening, the ion ON/OFF surface switch being configured such that when the electrolyte aqueous solutions of the two chambers of the closed container are pressurized by the pressing means after closing the air-releasing valve, the electrolyte aqueous solution is partially injected into the plurality of pores in both sides of the water-repellent porous fluororesin membrane to form layers of an ionic conductor parallel to the respective surfaces of the water-repellent porous fluororesin membrane, and to form an unpenetrated portion of the electrolyte aqueous solution as a compressed gas layer, the compressed gas layer being located near a center thereof and being parallel to the surface of the water-repellent porous fluororesin membrane and functioning as a dielectric, whereas when the pressurization is released, the compressed gas layer is expanded to restore the water-repellent porous fluororesin membrane into an insulator.

5. An electrochemical reactor with a secondary battery function, comprising:

an ion ON/OFF surface switch operating as an ionic conductor; and a first detection means; and a second detection means, wherein the ion ON/OFF surface switch includes:

a positive electrode plate and a negative electrode plate disposed opposed the positive electrode, wherein both the positive electrode plate and the negative electrode plate have gas-permeable pinholes, a first water-repellent porous fluororesin membrane disposed on the positive electrode plate and having a plurality of pores communicating to each other, a second water-repellent porous fluororesin membrane disposed on the negative electrode plate and having a plurality of pores communicating to each other, a closed container that contains an electrolyte aqueous solution, at least a portion thereof being formed between the first and second water-repellent porous fluororesin membranes, and a pressing means configured to pressurize the electrolyte aqueous solution, wherein the ion ON/OFF surface switch is configured such that when the electrolyte aqueous solution is pressurized by the pressing means, the electrolyte aqueous solution is injected into the plurality of pores in the first and second water-repellent porous fluororesin membranes to expel a gas in the pores to the positive electrode plate and negative electrode plate each having the pinholes, for substitution with the electrolyte aqueous solution, thereby forming the first and second water-repellent porous fluororesin membranes into ionic conductors, and starting charging/discharging between the positive electrode plate and the negative electrode plate which are interposed the electrolyte aqueous solution and the first and second water-repellent porous fluororesin membranes into the ionic conductor, whereas when the pressurization is released, the gas is drawn back from the positive electrode plate and the negative electrode plate each having the pinholes into the plurality of pores of the first and second water-repellent porous fluororesin membranes, to form the first and second water-repellent porous fluororesin membranes into insulators, to maintain a charge storage state, and wherein the first detection means is configured to detect finishing of charging and a discharge limit by measuring a change in refractive index of the electrolyte aqueous solution by irradiating a first laser beam in the electrolyte aqueous solution, wherein the change in refractive index occurs while charging/discharging and storing a charge between the positive electrode plate and the negative electrode plate opposing each other, which is interposed in the electrolyte aqueous solution in the closed container, and wherein the second detection means is configured to detect recrystallization from a change in transmittance by irradiating a second laser beam to the electrolyte aqueous solution, wherein the recrystallization occurs as a saturation solubility of the electrolyte aqueous solution is exceeded while performing charging/discharging and storing the charge, in ON/OFF of the ion ON/OFF surface switch.

6. The electrochemical reactor of claim 5, wherein the positive electrode plate is formed from a copper plate which is coated with a copper chloride film on a surface located a side of the first water-repellent porous fluororesin membrane, the negative electrode plate is formed from an aluminum plate, and the electrolyte aqueous solution is an aluminum chloride aqueous solution.

7. The electrochemical reactor with the secondary battery function of claim 6 further comprising a heating device for heating the electrolyte aqueous solution for charging, and a cooling device for cooling the electrolyte aqueous solution or water supply means for supplying water for discharging.

8. The electrochemical reactor of claim 5, further comprising a negative ion exchange membrane which divides the closed container into a first chamber on a side of the positive electrode plate and a second chamber on a side of the negative electrode plate, wherein the first chamber on the side of the positive electrode plate and the second chamber on the side of the negative electrode plate contain a first electrolyte aqueous solution and a second electrolyte aqueous solution, respectively, a negative ion in the first and the second electrolyte aqueous solutions is the same and positive ions in the first and the second electrolyte aqueous solutions are different from each other.

9. An electrochemical reactor with an electrolysis function, comprising:

a first electrolyte cell and a second electrolyte cell both in a closed state and disposed adjacent to each other;

a multiple isolation membrane disposed between the first and second electrolyte cells and comprising an ion ON/OFF surface switch operating as an ionic conductor, the multiple isolation membrane comprising a frame-shaped gasket disposed between the first and second electrolyte cells, a first water-repellent porous fluororesin membrane disposed on a surface of the gasket located on a side of the first electrolyte cell and having a plurality of pores communicating with each other, a second water-repellent porous fluororesin membrane disposed on a surface of the gasket located on a side of the second electrolyte cell and having a plurality of pores communicating with each other, and a gas exhaust/introduction pipe with one end in communication with a space surrounded by the gasket and the first and second water-repellent porous fluororesin membranes;

water contained in the first electrolyte cell;

an electrolyte aqueous solution contained in the second electrolyte cell;

a third water-repellent porous fluororesin membrane disposed on a wall of the first electrolyte cell, located on an opposite side to the multiple isolation membrane so as to be in contact with the water, and having a plurality of pores communicating with each other;

a fourth water-repellent porous fluororesin membrane disposed on a surface of the second electrolyte cell, which is located on an opposite side to the multiple isolation membrane, so as to be contact with the electrolyte aqueous solution and having a plurality of pores communicating with each other;

a gas-permeable negative electrode plate disposed on a surface of the third water-repellent porous fluororesin membrane opposite to the surface in contact with the water;

a gas-permeable positive electrode disposed on a surface of the fourth water-repellent porous fluororesin membrane opposite to the surface in contact with the electrolyte aqueous solution; and a pressurizing device for pressurizing the electrolyte aqueous solution and water, the ion ON/OFF surface switch being configured such that when the water and the electrolyte aqueous solution in the first and second electrolyte cells are pressurized by the pressurizing device, the water in the first electrolyte cell is injected into the plurality of pores in the first water-repellent porous fluororesin membrane to expel a gas in the pores, and the electrolyte aqueous solution in the second electrolyte cell is injected into the plurality of pores in the second water-repellent porous fluororesin membrane to expel a gas in the pores such that the first and second water-repellent porous fluororesin membranes function as ionic conductors and the expelled gas is exhausted through the gas exhaust/introduction pipe outside an electrochemical reaction zone, wherein when the pressurization on the water and the electrolyte aqueous solution in the first and second electrolyte cells is released, the gas is returned into the plurality of pores of the first water-repellent porous fluororesin membrane and the plurality of pores of the second water-repellent porous fluororesin membrane through the space from the gas exhaust/introduction pipe, thereby making the first and second water-repellent porous fluororesin membranes function as insulators, and when the water in the first electrolyte cell is pressurized by the pressurizing device, the water in the first electrolyte cell is injected into the plurality of pores of the third water-repellent porous fluororesin membrane to expel a gas in the pores through the gas-permeable negative electrode plate, thereby making the third water-repellent porous fluororesin membrane function as an ionic conductor, and when the electrolyte aqueous solution in the second electrolyte cell is pressurized by the pressurizing device, the electrolyte aqueous solution in the second electrolyte cell is injected into the plurality of pores of the fourth water-repellent porous fluororesin membrane to expel a gas in the pores through the gas-permeable positive electrode plate, thereby making the fourth water-repellent porous fluororesin membrane function as an ionic conductor such that an electrolysis occurs between the positive electrode plate and the negative electrode plate.

10. The electrochemical reactor of claim 9 further comprising a cooling device which is disposed in the first electrolyte cell and is contained in the first electrolyte cell, for cooling the water, or a water supply means which is disposed in the first electrolyte cell, for supplying water thereto and a heating device disposed in the second electrolyte cell, for heating the electrolyte aqueous solution contained in the second electrolyte cell.

11. The electrochemical reactor of claim 9, wherein the frame-shaped gasket of the multiple isolation membrane formed from fluororesins is manufactured by preparing a multilayer body in which the gasket is sandwiched between two water-repellent porous fluororesin membranes, sandwiching the multilayer body by two plates at least one of which is infrared transmissive, evacuating between the two plates and the multilayer body, and irradiating an infrared ray from a surface of the infrared transmissive plate under an atmospheric pressure to heat-weld the fluororesin-made gasket and the water-repellent porous fluororesin membranes sandwiching the gasket with each other at or near the outer circumferential edges thereof.

12. An electrochemical reactor with an electrolysis function, comprising:
   a first electrolyte cell and a second electrolyte cell both in a closed state and disposed adjacent to each other;
   a third electrolyte cell in a closed state and disposed adjacent to the second electrolyte cell;
   a first multiple isolation membrane disposed between the first and second electrolyte cells and comprising a first ion ON/OFF surface switch operating as an ionic conductor, the first multiple isolation membrane comprising a first frame-shaped gasket disposed between the first and second electrolyte cells, a first water-repellent porous fluororesin membrane disposed on a surface of the first gasket located on a side of the first electrolyte cell and having a plurality of pores communicating with each other, a second water-repellent porous fluororesin membrane disposed on a surface of the gasket located on a side of the second electrolyte cell and having a plurality of pores communicating with each other, and a first gas exhaust/introduction pipe with one end in communication with a first space surrounded by the first gasket and the first and second water-repellent porous fluororesin membranes;
   a second multiple isolation membrane disposed between the second and third electrolyte cells and comprising a second ion ON/OFF surface switch operating as an ionic conductor, the second multiple isolation membrane comprising a second frame-shaped gasket disposed between the second and third electrolyte cells, a third water-repellent porous fluororesin membrane disposed on a surface of the second gasket located on a side of the second electrolyte cell and having a plurality of pores communicating with each other, a fourth water-repellent porous fluororesin membrane disposed on a surface of the second gasket located on a side of the third electrolyte cell and having a plurality of pores communicating with each other, and a second gas exhaust/introduction pipe with one end in communication with a second space surrounded by the second gasket and the third and fourth water-repellent porous fluororesin membranes;
   a sodium chloride aqueous solution contained in the second electrolyte cell as an electrolyte aqueous solution;
   water contained in each of the first and third electrolyte cells;
   an excimer lamp disposed in the third electrolyte cell;
   a fifth water-repellent porous fluororesin membrane disposed on a surface of the first electrolyte cell, located on an opposite side to the first multiple isolation membrane so as to be in contact with the electrolyte aqueous solution, and having a plurality of pores communicating with each other;
   a gas-permeable negative electrode plate disposed on a surface of the fifth water-repellent porous fluororesin membrane, opposite to the surface in contact with the water;
   a mesh-texture positive electrode plate disposed on a surface of the fourth water-repellent porous fluororesin membrane, located in the third electrolyte cell; and
   a pressurizing device for pressurizing the electrolyte aqueous solution and the water in the first to third electrolyte cells, respectively,
   the first ion ON/OFF surface switch being configured such that when the water and the electrolyte aqueous solution in the first and second electrolyte cells are pressurized by the pressurizing device, the water in the first electrolyte cell is injected into the plurality of pores in the first water-repellent porous fluororesin membrane to expel a gas in the pores, and the electrolyte aqueous solution in the second electrolyte cell is injected into the plurality of pores in the second water-repellent porous fluororesin membrane to expel a gas in the pores such that the first and second water-repellent porous fluororesin membranes function as ionic conductors and the expelled gas is exhausted through the first gas exhaust/introduction pipe outside a first electrochemical reaction zone, wherein when the pressurization on the water and the electrolyte aqueous solution in the first and second electrolyte cells is released, the gas is returned into the plurality of pores of the first and second water-repellent porous fluororesin membranes through the first space from the first gas exhaust/introduction pipe such that the first and second water-repellent porous fluororesin membranes function as insulators,
   the second ion ON/OFF surface switch being configured such that when the electrolyte aqueous solution and the water in the second and third electrolyte cells are pressurized by the pressurizing device, the electrolyte aqueous solution in the second electrolyte cell is injected into the plurality of pores in the third water-repellent porous fluororesin membrane to expel a gas in the pores, and the water in the third electrolyte cell is injected into the plurality of pores in the fourth water-repellent porous fluororesin membrane to expel a gas in the pores such that the third and fourth water-repellent porous fluororesin membranes function as ionic conductors and the expelled gas is exhausted through the second gas exhaust/introduction pipe outside a second electrochemical reaction zone, wherein when the pressurization on the electrolyte aqueous solution and the water in the second and third electrolyte cells is released, the gas is returned into the plurality of pores of the third and fourth water-repellent porous fluororesin membranes through the second space from the second gas exhaust/introduction pipe, respectively, such that making the third and fourth water-repellent porous fluororesin membranes function as insulators, and when the electrolyte aqueous solution and the water in the second and third electrolyte cells are pressurized by the pressurizing device, and also the water in the first electrolyte cell is pressurized by the pressurizing device, the water in the first electrolyte cell is injected into the plurality of pores of the fifth water-repellent porous fluororesin membrane to expel a gas in the pores through the gas-permeable negative electrode plate, such that the fifth water-repellent porous fluororesin membrane functions as an ionic conductor and an electrolysis occurs between the positive electrode plate and the negative electrode plate, and an excimer lamp light is irradiated from the excimer lamp onto a hypochlorous acid aqueous solution produced in the third electrolyte cell by the electrolysis.

13. The electrochemical reactor of claim 12, wherein when the first frame-shaped gasket of the first multiple isolation membrane and the second frame-shaped gasket of the second multiple isolation membrane is formed from fluororesin, the multiple isolation membrane is manufactured by preparing a multilayer body in which the gasket is sandwiched between two water-repellent porous fluororesin membranes, sandwiching the multilayer body by two plates at least one of which is infrared transmissive, evacuating in-betweens of the two plates and the multilayer body, and in a state as such, irradiating an infrared ray from a surface of the infrared transmissive plate under an atmospheric pressure, to heat-weld the fluororesin-made gasket and the water-repellent porous fluororesin membranes sandwiching the gasket with each other by near outer circumferential edges thereof.

14. An electrochemical reactor with an electrolysis function, comprising:

a first electrolyte cell and a second electrolyte cell both in a closed state and disposed adjacent to each other;

a multiple isolation membrane disposed between the first and second electrolyte cells and comprising an ion ON/OFF surface switch operating as an ionic conductor, the multiple isolation membrane comprising a frame-shaped gasket disposed between the first and second electrolyte cells, a first water-repellent porous fluororesin membrane disposed on a surface of the gasket on a side of the first electrolyte cell and having a plurality of pores communicating with each other, a second water-repellent porous fluororesin membrane disposed on a surface of the gasket on a side of the second electrolyte cell and having a plurality of pores communicating with each other, and a gas exhaust/introduction pipe with one end in communication with a space surrounded by the gasket and the first and second water-repellent porous fluororesin membranes;

water or sea water contained in the first electrolyte cell;

a sulfuric acid aqueous solution or a sodium hydroxide aqueous solution as an electrolyte aqueous solution contained in the second electrolyte cell;

a third water-repellent porous fluororesin membrane disposed in the second electrolyte cell so as to be in contact with the electrolyte aqueous solution, and having a plurality of pores communicating with each other;

a fourth water-repellent porous fluororesin membrane disposed in the second electrolyte cell so as to be in contact with the electrolyte aqueous solution in the second electrolyte cell and opposite the third water-repellent porous fluororesin membrane, and having a plurality of pores communicating with each other;

a gas-permeable negative electrode plate disposed on a surface of the third water-repellent porous fluororesin membrane, opposite to the surface in contact with the electrolyte aqueous solution;

a gas-permeable positive electrode plate disposed on a surface of the fourth water-repellent porous fluororesin membrane, opposite to the surface in contact with the electrolyte aqueous solution; and a pressurizing device for pressurizing the water or sea water, the ion ON/OFF surface switch being configured such that when the water or the sea water in the first electrolyte cell is pressurized by the pressurizing device at a pressure of two times or more of a water-resistant pressure of either one of the first and second water-repellent porous fluororesin membranes, the water or the sea water in the first electrolyte cell is injected into the plurality of pores in the first water-repellent porous fluororesin membrane to expel a gas in the pores and exhaust the gas through the gas exhaust/introduction pipe outside an electrochemical reaction zone, and the water or the sea water is further injected into the plurality of pores in the second water-repellent porous fluororesin membrane through the space to expel a gas in the pores into the second electrolyte cell such that the first and second water-repellent porous fluororesin membranes function as ionic conductors, wherein when the pressurization on the water or the sea water in the first electrolyte cell is released, the gas is returned into the plurality of pores of the first and second water-repellent porous fluororesin membranes through the space from the gas exhaust/introduction pipe such that the first and second water-repellent porous fluororesin membranes function as insulators, and when the water or the sea water in the first electrolyte cell is pressurized by the pressurizing device, the electrolyte aqueous solution in the second electrolyte cell is pressurized and the electrolyte aqueous solution is injected into the plurality of pores of the third and fourth water-repellent porous fluororesin membranes disposed in the second electrolyte cell and gas is expelled to the gas-permeable positive and negative electrode plates such that the third and fourth water-repellent porous fluororesin membranes function as ionic conductors and electrolysis occurs between the positive electrode plate and the negative electrode plate.

15. The electrochemical reactor of claim 14, wherein the frame-shaped gasket of the multiple isolation membrane formed from fluororesins is manufactured by preparing a multilayer body in which the gasket is sandwiched between two water-repellent porous fluororesin membranes, sandwiching the multilayer body by two plates at least one of which is infrared transmissive, evacuating between the two plates and the multilayer body, and irradiating an infrared ray from a surface of the infrared transmissive plate under an atmospheric pressure to heat-weld the fluororesin-made gasket and the water-repellent porous fluororesin membranes sandwiching the gasket with each other at or near outer circumferential edges thereof.

16. An electrochemical reactor with an electrolysis function, configured to produce metallic sodium, the reactor comprising:
a first electrolyte cell in a closed state and configured to contain an oil;
a second electrolyte cell in a closed state, disposed adjacent to the first electrolyte cell and configured to contain a sodium-based aqueous solution as an electrolyte aqueous solution;
a multiple isolation membrane disposed between the first and second electrolyte cells and comprising an ion ON/OFF surface switch operating as an ionic conductor, the multiple isolation membrane comprising a frame-shaped gasket disposed between the first and second electrolyte cells, a first water-repellent porous fluororesin membrane disposed on a surface of the gasket on a side of the first electrolyte cell and having a plurality of pores communicating with each other, a second water-repellent porous fluororesin membrane disposed on a surface of the gasket on a side of the second electrolyte cell and having a plurality of pores communicating with each other, and a gas exhaust/introduction pipe with one end in communication with a space surrounded by the gasket and the first and second water-repellent porous fluororesin membranes;
a double-layered third water-repellent porous fluororesin membrane disposed in the second electrolyte cell so as to be in contact with the electrolyte aqueous solution in the second electrolyte cell, and having a plurality of pores communicating with each other;
a mesh-texture negative electrode plate disposed on a surface of the first water-repellent porous fluororesin membrane of the multiple isolation membrane located on a side of the first electrolyte cell;
a gas-permeable positive electrode plate disposed on a surface of the double-layered third water-repellent porous fluororesin membrane on an opposite side to the surface in contact with the electrolyte aqueous solution; and
a pressurizing device for pressurizing the electrolyte aqueous solution in the second electrolyte cell,
the ion ON/OFF surface switch being configured such that, when the electrolyte aqueous solution in the second electrolyte cell is pressurized by the pressurizing device at a pressure higher than or equal to a water-resistant pressure of the double-layered third water-repellent porous fluororesin membrane, the electrolyte aqueous solution in the second electrolyte cell is injected into the plurality of pores in the second water-repellent porous fluororesin membrane to expel a gas in the pores and to exhaust the gas through the gas exhaust/instruction pipe outside an electrochemical reaction zone, and the electrolyte aqueous solution is further injected into the plurality of pores in the first water-repellent porous fluororesin membrane through the space to expel a gas in the pores into the first electrolyte cell such that the first and second water-repellent porous fluororesin membranes of the multiple isolation membrane function as ionic conductors and allow a current to flow between the positive electrode plate and the negative electrode plate,
wherein when the pressurization on the electrolyte aqueous solution in the second electrolyte cell is released, the gas is returned into the plurality of pores of the first and second water-repellent porous fluororesin membranes through the space from the gas exhaust/introduction pipe such that the first and second water-repellent porous fluororesin membranes function as insulators, and
when the electrolyte aqueous solution in the second electrolyte cell is pressurized by the pressurizing device, the electrolyte aqueous solution is injected into the plurality of pores of the double-layered third water-repellent porous fluororesin membrane disposed in the second electrolyte cell to expel a gas to the positive electrode plate such that the double-layered third water-repellent porous fluororesin membrane functions as an ionic conductor and an electrolysis occurs between the positive electrode plate and the negative electrode plate.

17. The electrochemical reactor of claim 16, wherein the mesh-texture negative electrode plate disposed on the surface of the first water-repellent porous fluororesin membrane of the multiple isolation membrane is a virtual negative electrode plate, and in the virtual negative electrode plate a solid negative electrode plate is disposed on or apart from an inner wall of the first electrolyte cell which opposes the multiple isolation membrane, and a capacitor is connected between the solid negative electrode plate and the positive electrode plate to migrate a charge to the surface of the first water-repellent porous fluororesin membrane through the oil in the first electrolyte cell such that the charge is produced.

18. The electrochemical reactor of claim 16, wherein the sodium-based aqueous solution as the electrolyte aqueous solution is a sodium hydroxide aqueous solution, and the reactor further comprises a heating device for heating the sodium hydroxide aqueous solution in the second electrolyte cell.

19. The electrochemical reactor of claim 16, wherein the frame-shaped gasket of the multiple isolation membrane formed from fluororesins is manufactured by preparing a multilayer body in which the gasket is sandwiched between two water-repellent porous fluororesin membranes, sandwiching the multilayer body by two plates at least one of which is infrared transmissive, evacuating between the two plates and the multilayer body, and irradiating an infrared ray from a surface of the infrared transmissive plate under an atmospheric pressure, to heat-weld the fluororesin-made gasket and the water-repellent porous fluororesin membranes sandwiching the gasket with each other at or near outer circumferential edges thereof.

* * * * *